United States Patent
Lee

(10) Patent No.: US 12,075,086 B2
(45) Date of Patent: Aug. 27, 2024

(54) METHOD FOR ENCODING/DECODING A VIDEO USING A MERGE MODE WITH PREDICTION UNIT PARTITIONING AND A BITSTREAM STORING INSTRUCTIONS TO TRANSMIT COMPRESSED VIDEO DATA GENERATED BY THE METHOD OF ENCODING THE VIDEO

(71) Applicant: XRIS CORPORATION, Seongnam-si (KR)

(72) Inventor: Bae Keun Lee, Seongnam-si (KR)

(73) Assignee: XRIS CORPORATION, Seongnam-si (KR)

( * ) Notice: Subject to any disclaimer, the term of this patent is extended or adjusted under 35 U.S.C. 154(b) by 0 days.

(21) Appl. No.: 18/130,877

(22) Filed: Apr. 4, 2023

(65) Prior Publication Data
US 2023/0262253 A1    Aug. 17, 2023

Related U.S. Application Data

(63) Continuation of application No. 17/293,847, filed on May 13, 2021, now abandoned, which is a (Continued)

(30) Foreign Application Priority Data

| May 2, 2019 | (KR) | 10-2019-0051234 |
| May 2, 2019 | (KR) | 10-2019-0051890 |
| Jun. 11, 2019 | (KR) | 10-2019-0069017 |

(51) Int. Cl.
  H04N 19/513  (2014.01)
  H04N 19/105  (2014.01)
  (Continued)

(52) U.S. Cl.
  CPC ......... *H04N 19/513* (2014.11); *H04N 19/105* (2014.11); *H04N 19/132* (2014.11); *H04N 19/159* (2014.11); *H04N 19/176* (2014.11)

(58) Field of Classification Search
  None
  See application file for complete search history.

(56) References Cited

U.S. PATENT DOCUMENTS

| 10,375,413 B2 | 8/2019 | Li et al. |
| 10,523,964 B2 | 12/2019 | Chuang et al. |

(Continued)

FOREIGN PATENT DOCUMENTS

| CN | 107925758 A | 4/2018 |
| CN | 109417629 A | 3/2019 |

(Continued)

OTHER PUBLICATIONS

Bross, Benjamin et al. Versatile Video Coding (Draft 5). Joint Video Experts Team (JVET) of ITU-T SG 16 WP 3 and ISO/IEC JTC 1/SC 29/WG 11., 14th Meeting: Geneva, CH. [Document: JVET-N1001-v10]., Mar. 27, 2019, pp. 1-395.

(Continued)

*Primary Examiner* — Chikaodili E Anyikire
(74) *Attorney, Agent, or Firm* — Goldilocks Zone IP Law

(57) ABSTRACT

A video decoding method, according to the present invention, comprises the steps of: deriving an L0 motion vector and an L1 motion vector of a current block; deriving an L0 prediction sample and an L1 prediction sample for a first position inside the current block on the basis of the L0 motion vector and the L1 motion vector; determining whether to apply a bidirectional optical flow to the current block; deriving a refined motion vector for a subblock which comprises the first position, when it is determined to apply the bidirectional optical flow; deriving a refined prediction (Continued)

sample for the first position on the basis of the refined motion vector; and obtaining a prediction sample for the first position by using the L0 prediction sample, the L1 prediction sample, and the refined prediction sample.

11 Claims, 23 Drawing Sheets

Related U.S. Application Data continuation of application No. PCT/KR2020/005902, filed on May 4, 2020.

(51) Int. Cl.
*H04N 19/132* (2014.01)
*H04N 19/159* (2014.01)
*H04N 19/176* (2014.01)

(56) References Cited

U.S. PATENT DOCUMENTS

| | | |
|---|---|---|
| 2018/0262773 A1 | 9/2018 | Chuang et al. |
| 2019/0191178 A1 | 6/2019 | Lee |
| 2019/0200040 A1* | 6/2019 | Lim .................. H04N 19/51 |
| 2020/0252640 A1 | 8/2020 | Zhao et al. |
| 2020/0275112 A1 | 8/2020 | Chiang et al. |
| 2020/0288175 A1* | 9/2020 | Chang ................ H04N 19/119 |
| 2020/0296416 A1 | 9/2020 | Liao et al. |
| 2020/0314445 A1 | 10/2020 | Park et al. |
| 2020/0413082 A1 | 12/2020 | Li et al. |
| 2021/0227250 A1 | 7/2021 | Liu et al. |
| 2021/0266566 A1* | 8/2021 | Chen .................. H04N 19/105 |
| 2021/0409750 A1 | 12/2021 | Xiu et al. |

FOREIGN PATENT DOCUMENTS

| | | |
|---|---|---|
| CN | 110651472 A | 1/2020 |
| KR | 10-2018-0129860 A | 12/2018 |
| KR | 10-1967967 B1 | 4/2019 |
| WO | 2017/195914 A1 | 11/2017 |
| WO | 2018026118 A1 | 2/2018 |
| WO | 2018048265 A1 | 3/2018 |
| WO | 2018212578 A1 | 11/2018 |

OTHER PUBLICATIONS

Luo, Jiancong (Daniel) et al., CE2-related: Prediction refinement with optical flow for affine mode., Joint Video Experts Team (JVET) of ITU-T SG 16 WP 3 and ISO/IEC JTC 1/SC 29/WG 11., 14th Meeting: Geneva, CH., [Document: JVET-N0236-r5], Mar. 27, 2019, pp. 1-7.
Communication of office Action of Indian Patent Application No. 202117044289, issued on Dec. 9, 2023, which corresponds to this application.
Benjamin Bross, et al., Versatile Video Coding (Draft 5), , Joint Video Experts Team(JVET) of ITU-T SG 16 WP 3 and ISO/IEC JTC 1/SC 29/WG 11, 14th Meeting: Geneva, CH, Mar. 19-27, 2019, pp. 1-336, JVET-N1001-v1.
Communication of office Action of Chinese Patent Application No. 202080006956.6, issued on May 8, 2024, which corresponds to this application.

* cited by examiner

【FIG. 1】
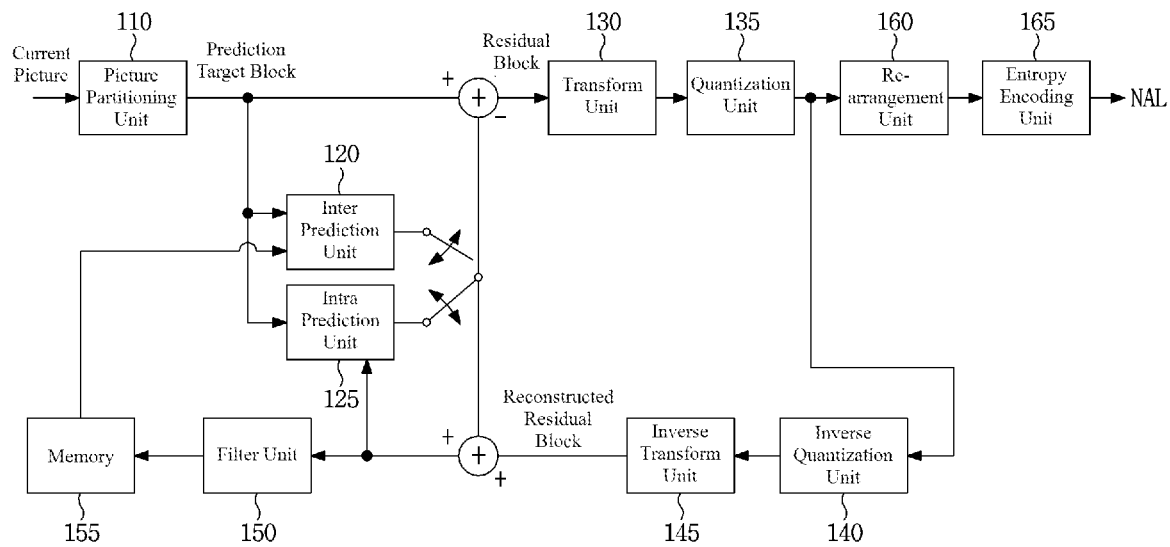
【FIG. 2】
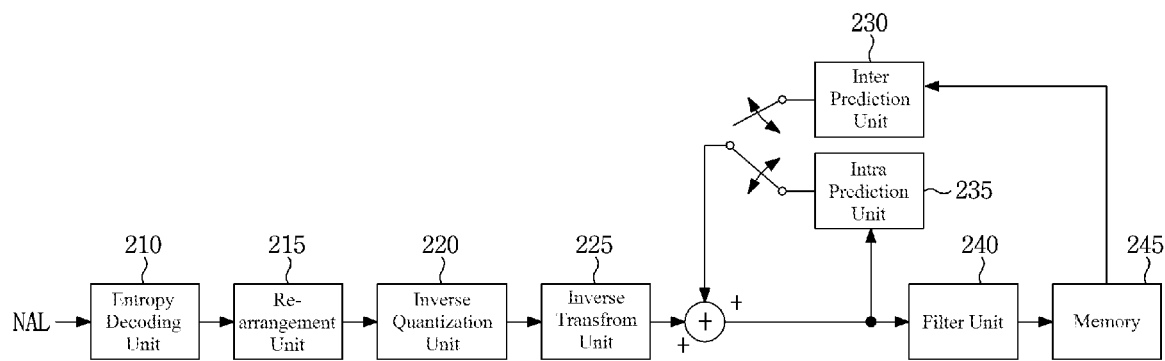

【FIG. 3】
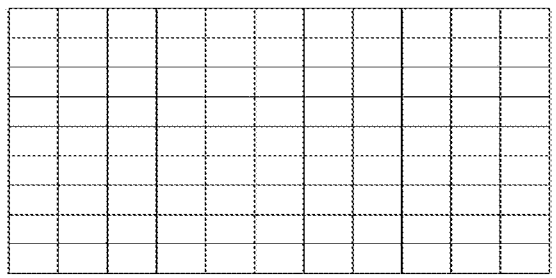
【FIG. 4】
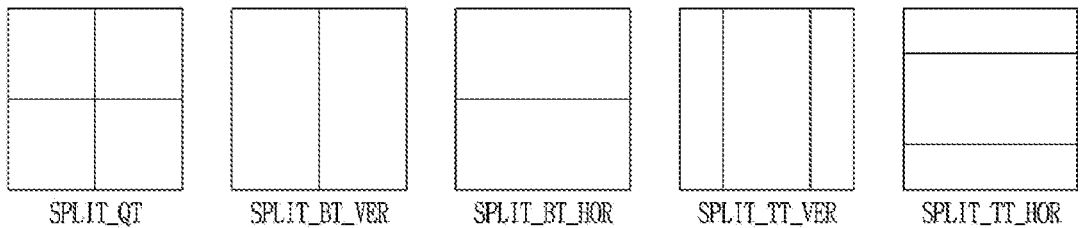
【FIG. 5】
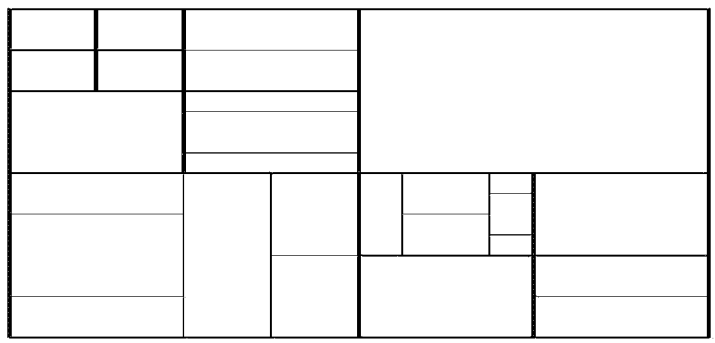

[FIG. 6]
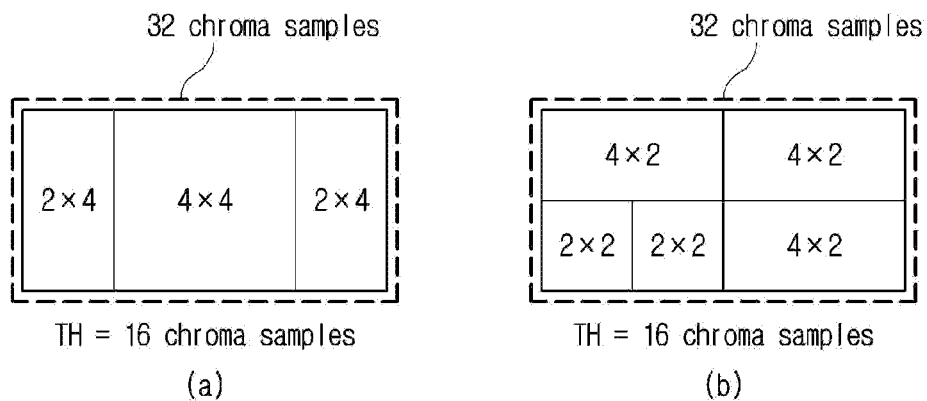
[FIG. 7]
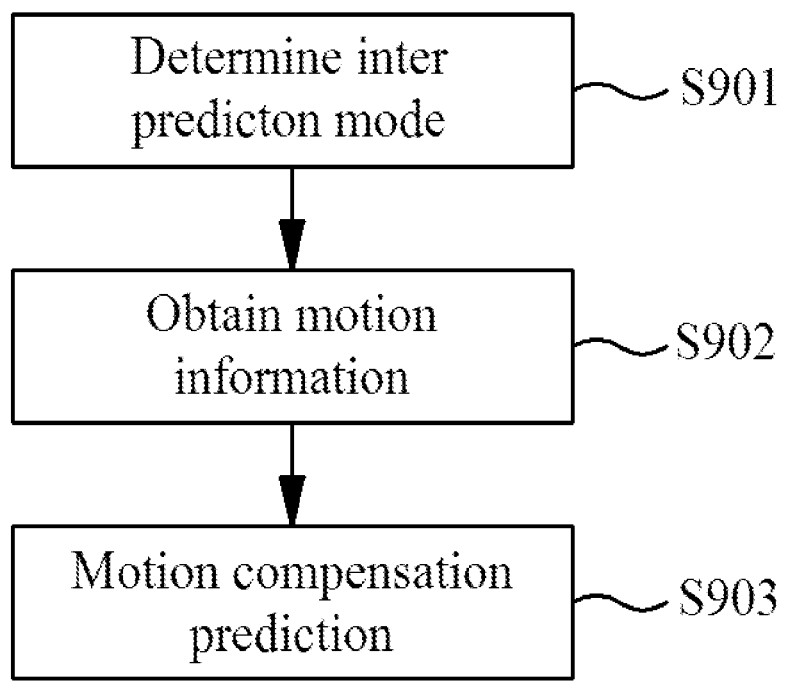

【FIG. 8】
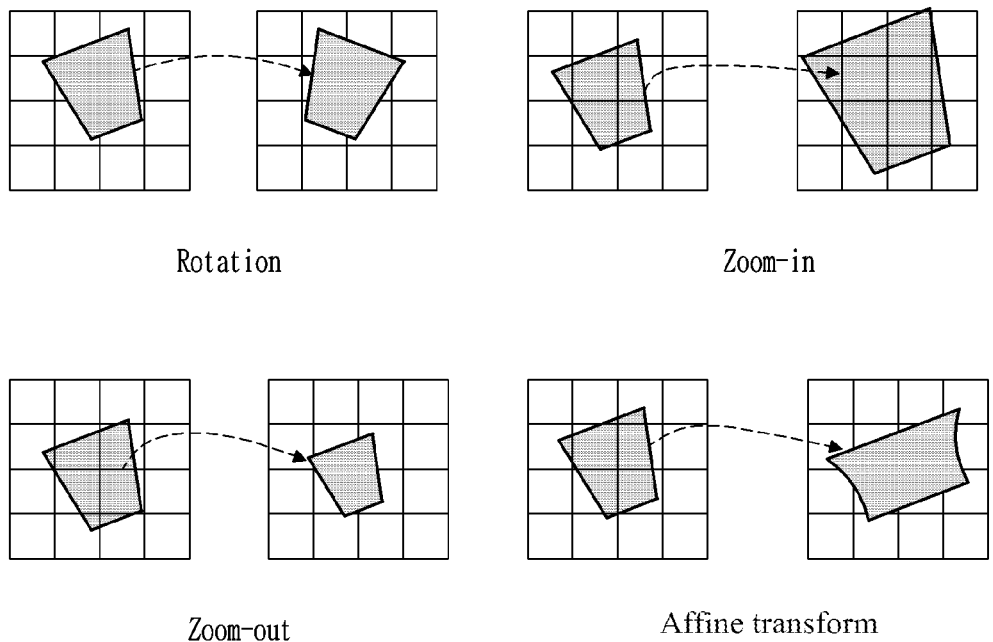
Rotation  Zoom-in
Zoom-out  Affine transform
【FIG. 9】
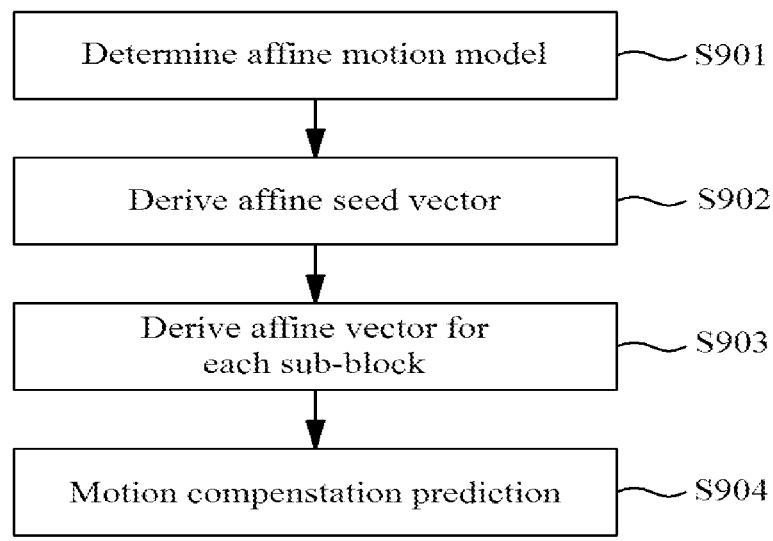

[FIG. 10]
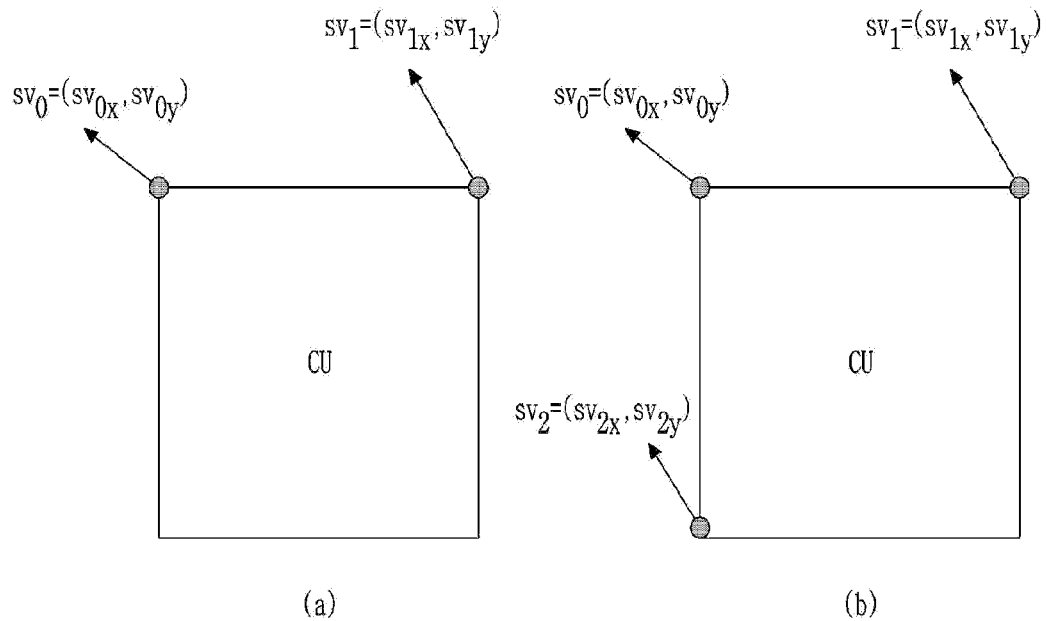
(a)　　　　　　　　　(b)
[FIG. 11]
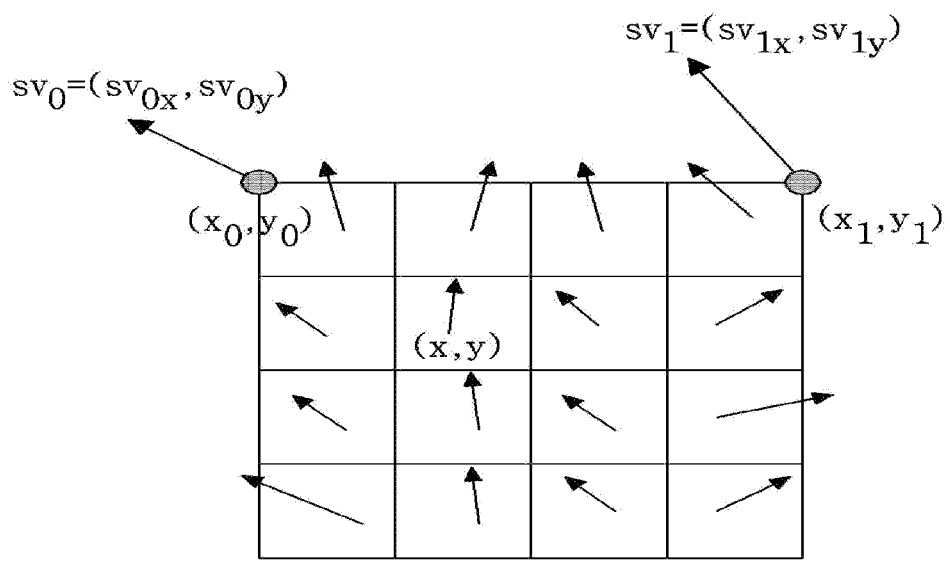

[FIG. 12]
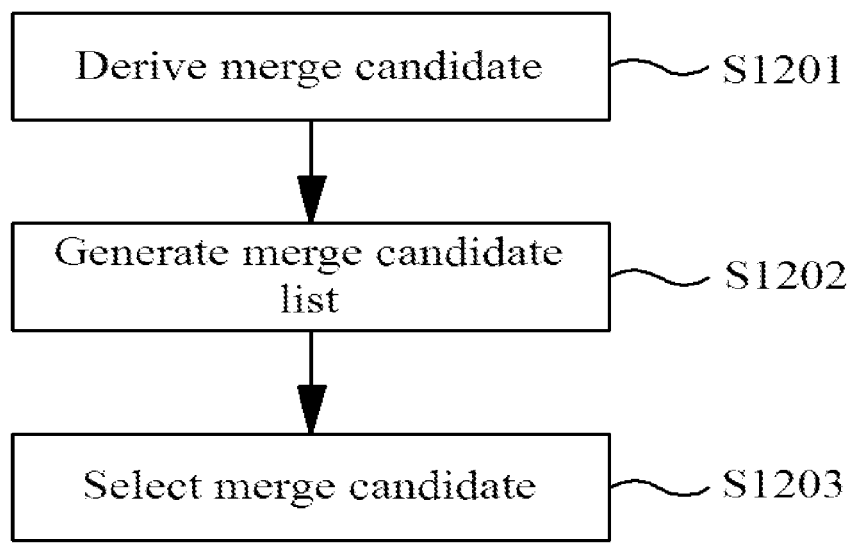

【FIG. 13】
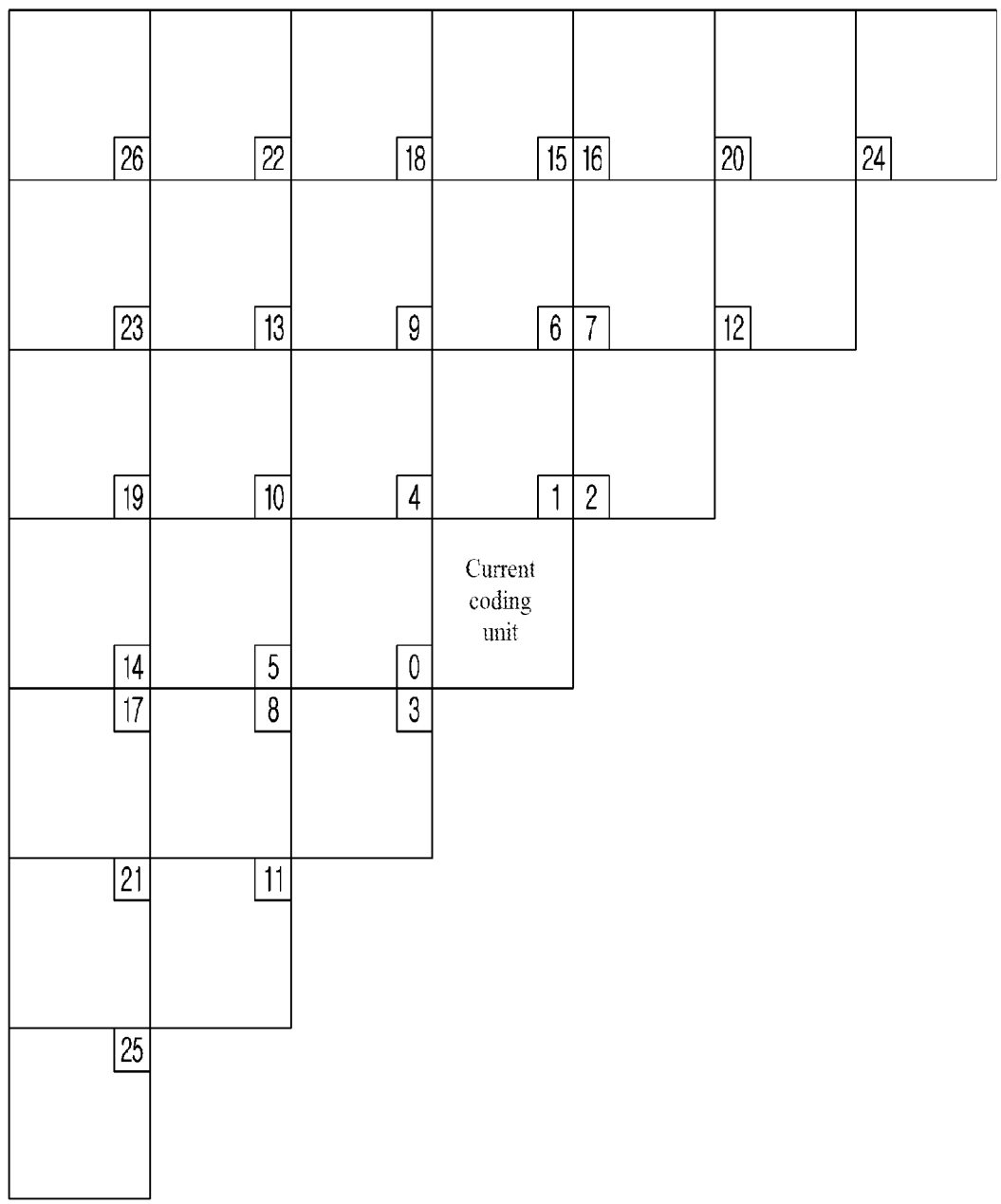

[FIG. 14]
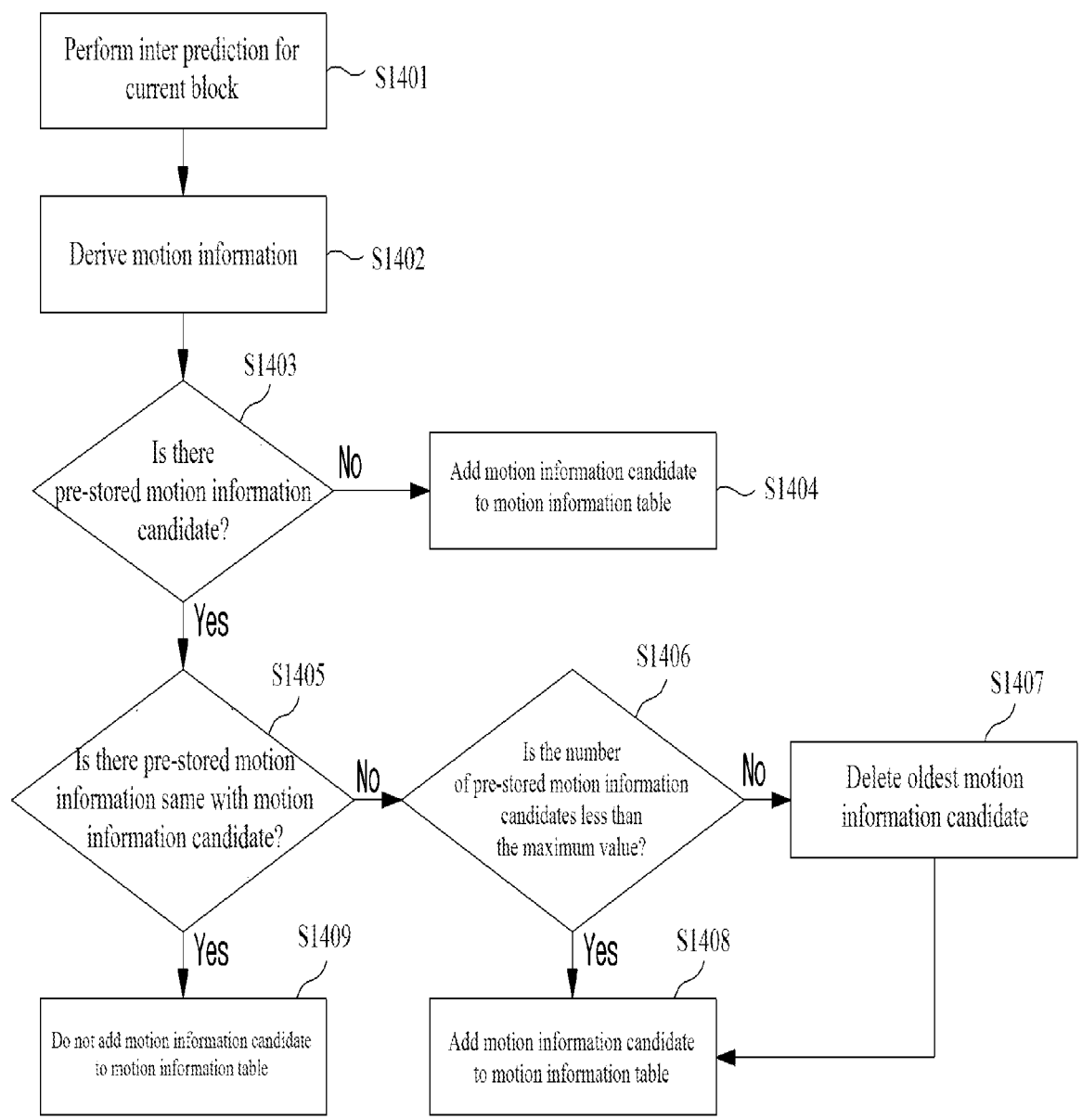

【FIG. 15】
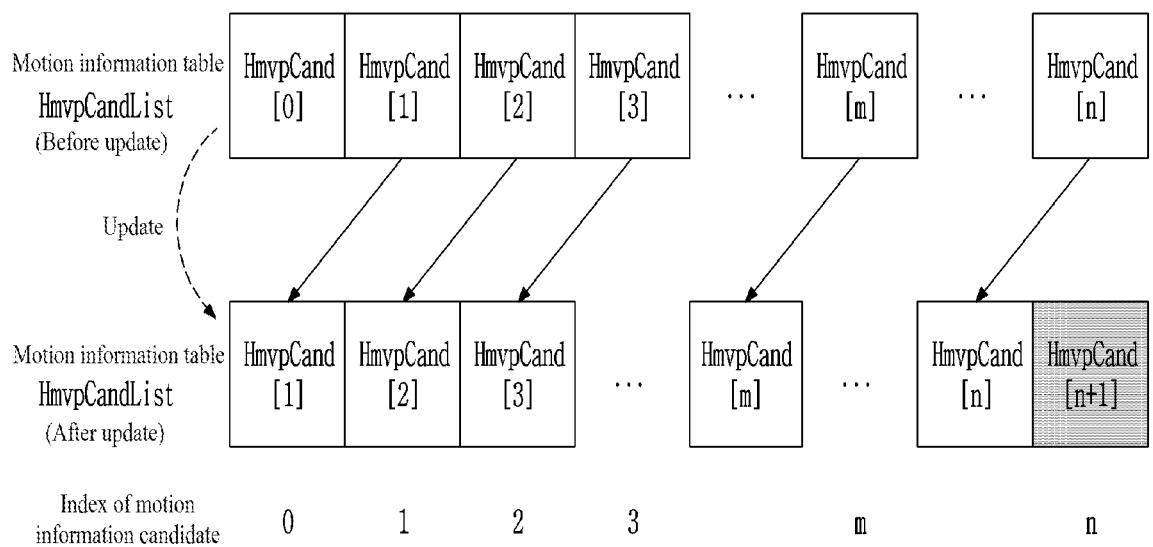
【FIG. 16】
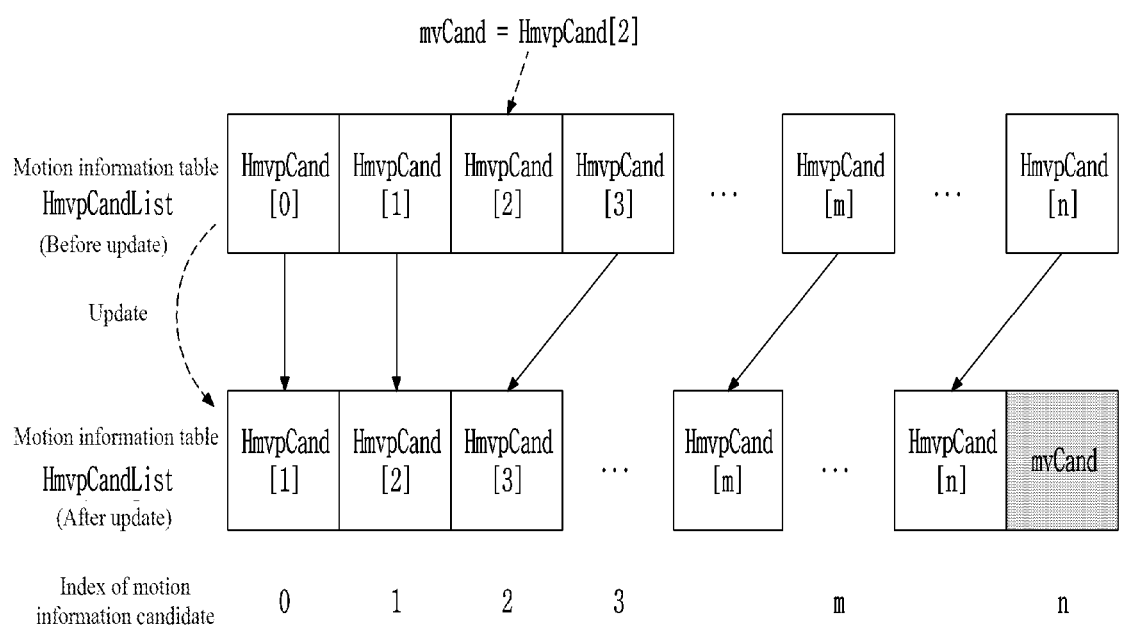

[FIG. 17]
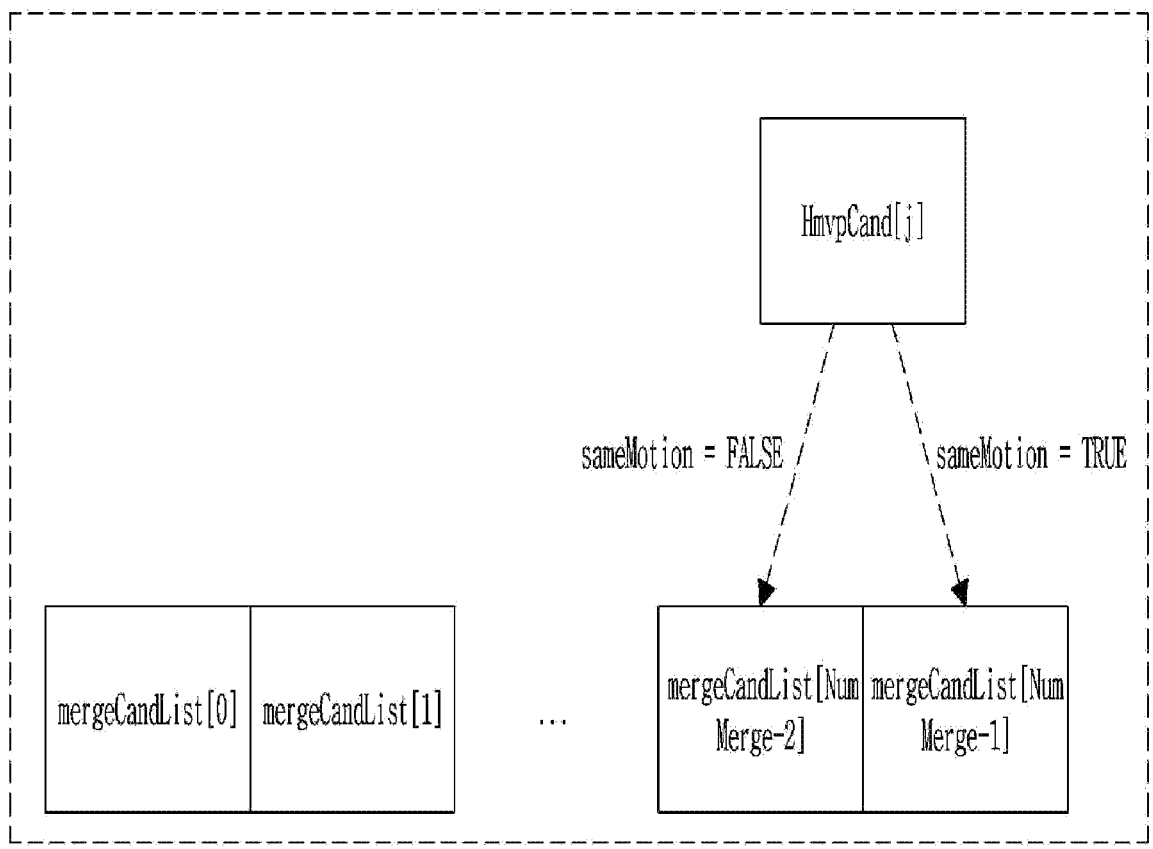

[FIG. 18]
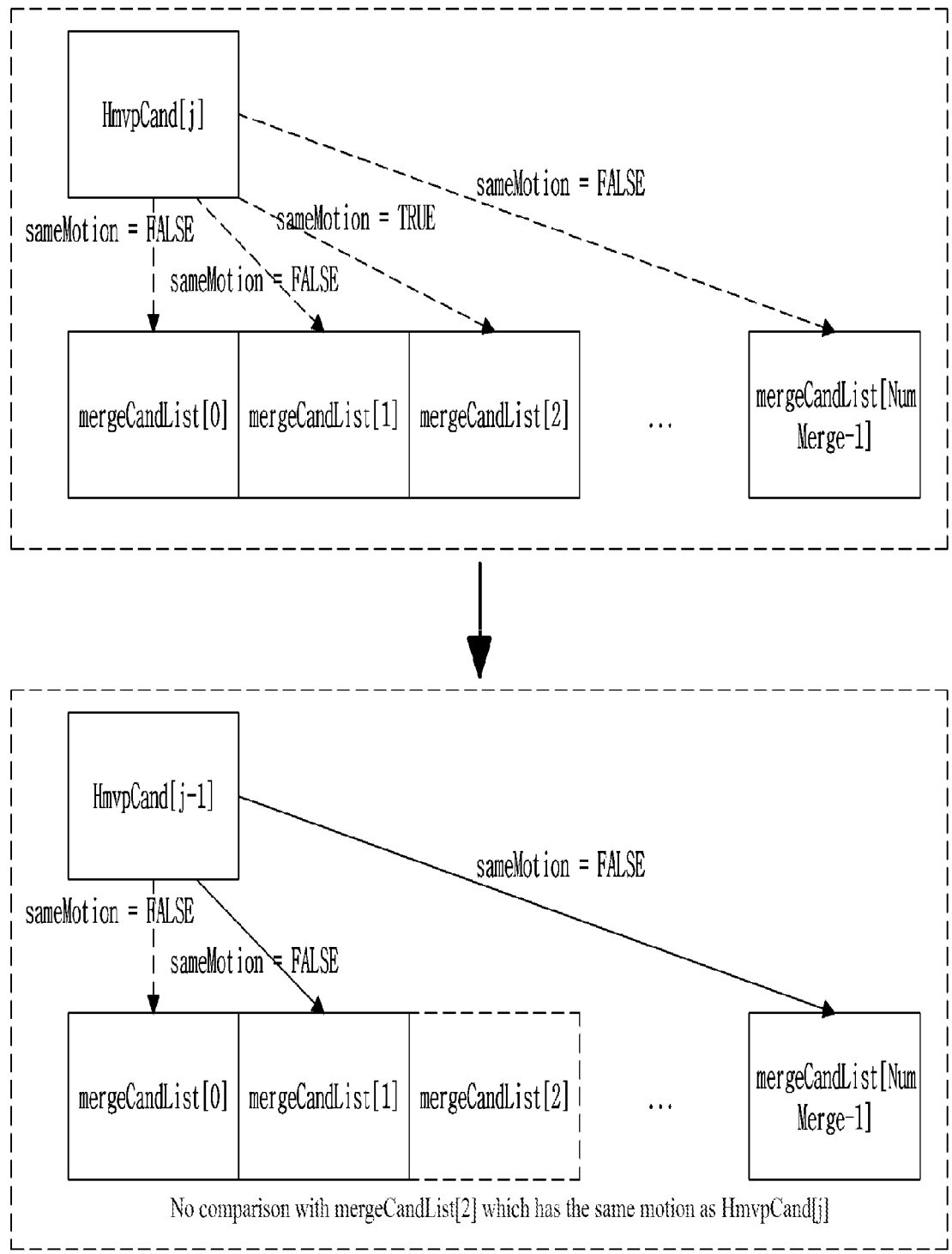

【FIG. 19】
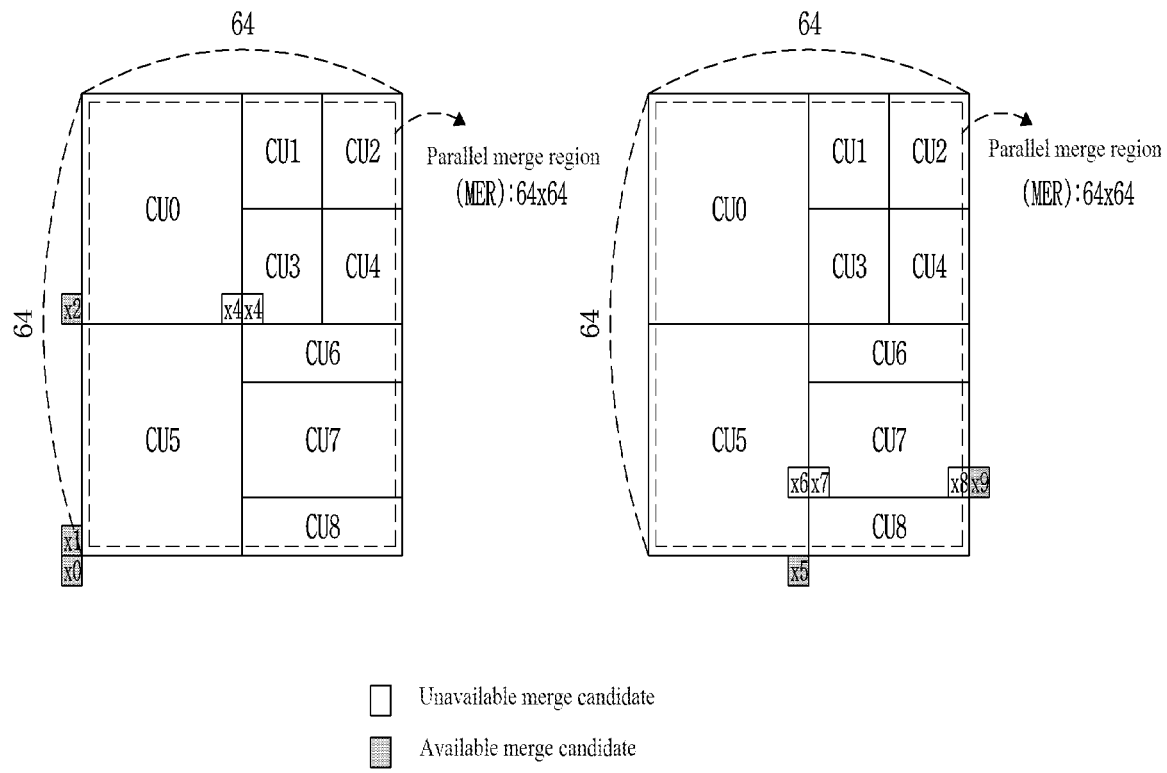
【FIG. 20】
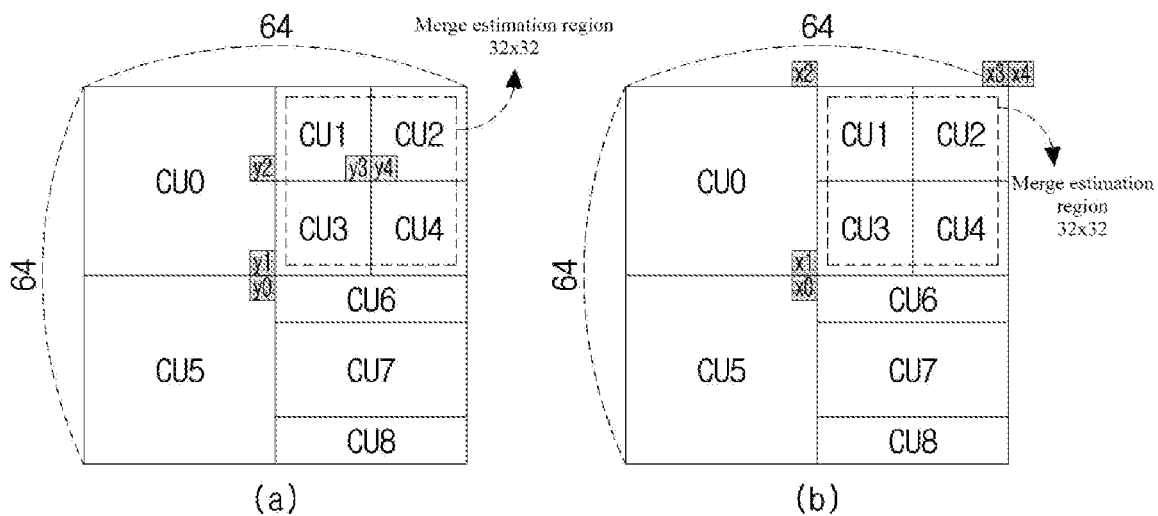

[FIG. 21]
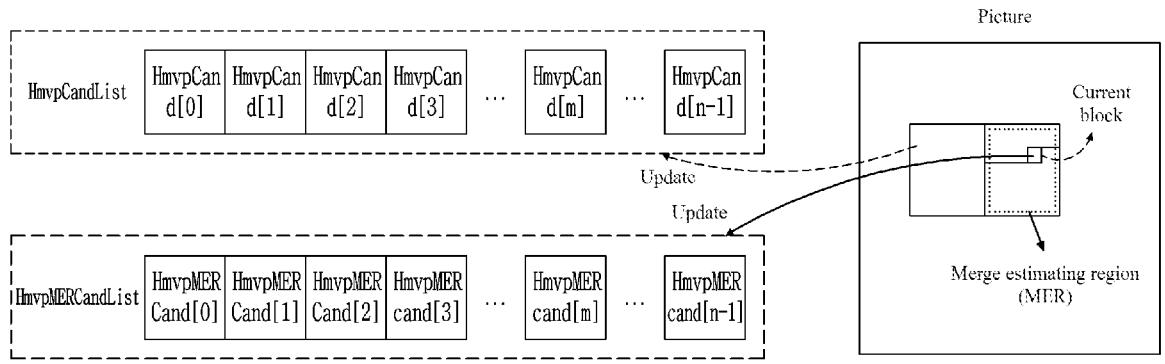
[FIG. 22]
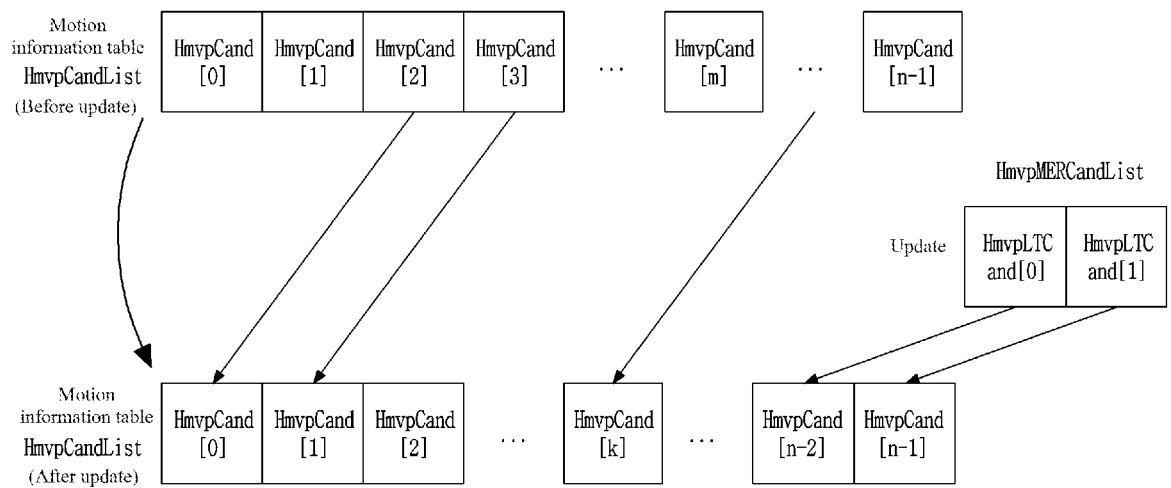
[FIG. 23]
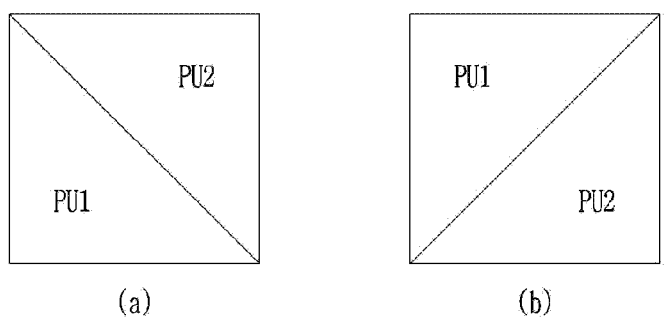
(a)　　　　　　　　(b)

【FIG. 24】
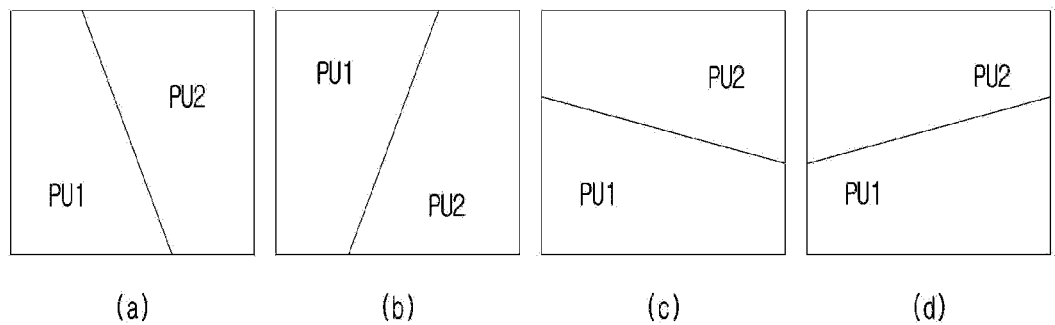
【FIG. 25】
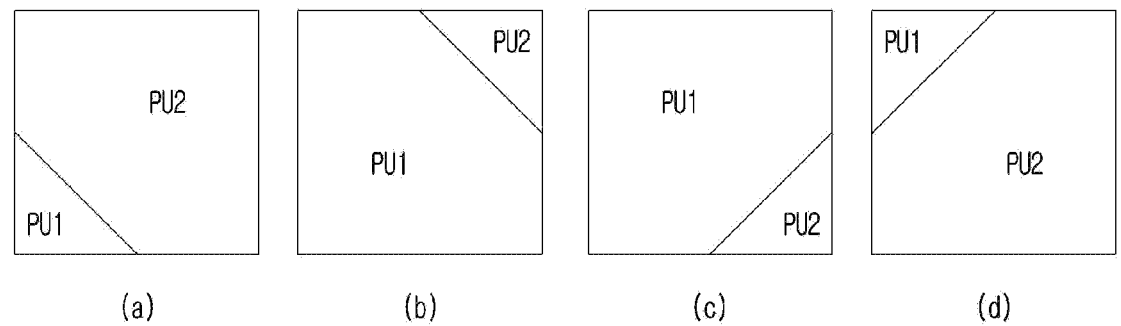
【FIG. 26】
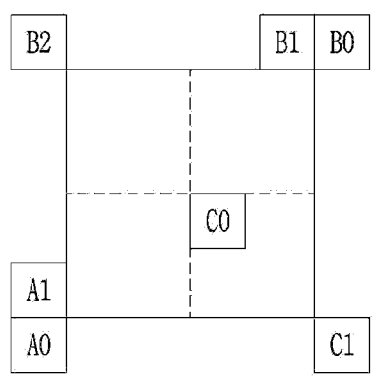

[FIG. 27]
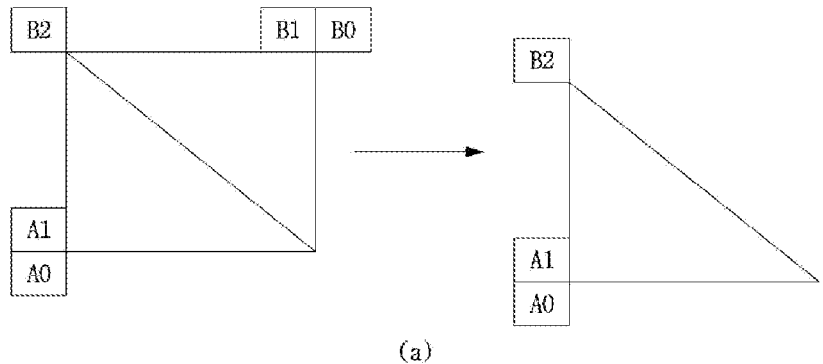
(a)
(b)
[FIG. 28]
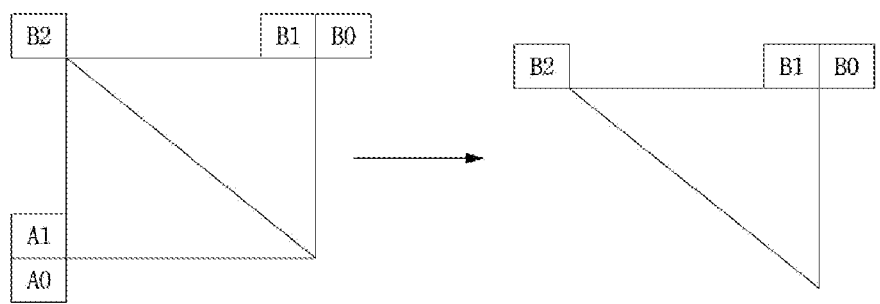
(a)      (b)

【FIG. 29】
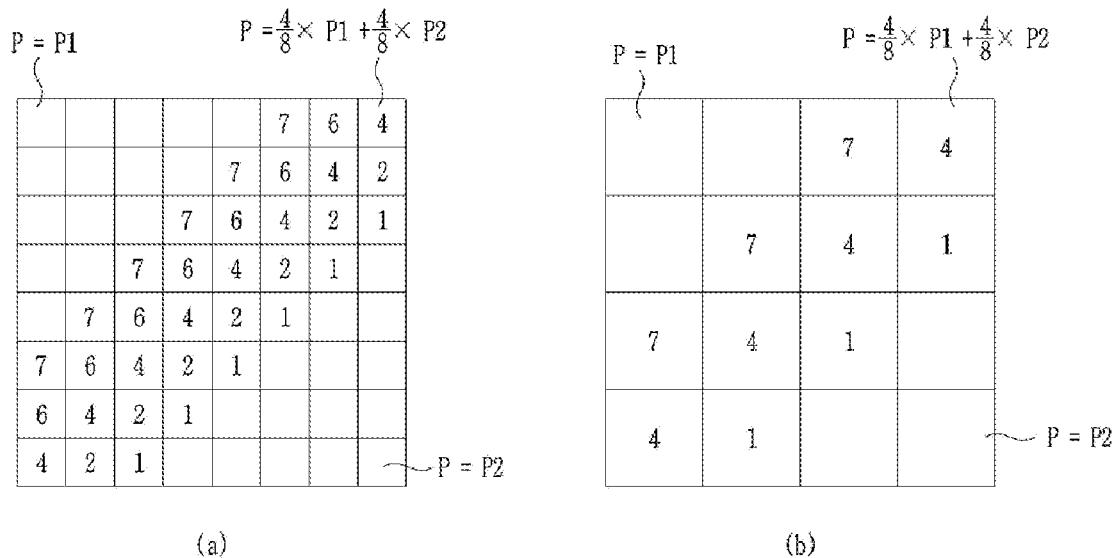
(a)    (b)
【FIG. 30】
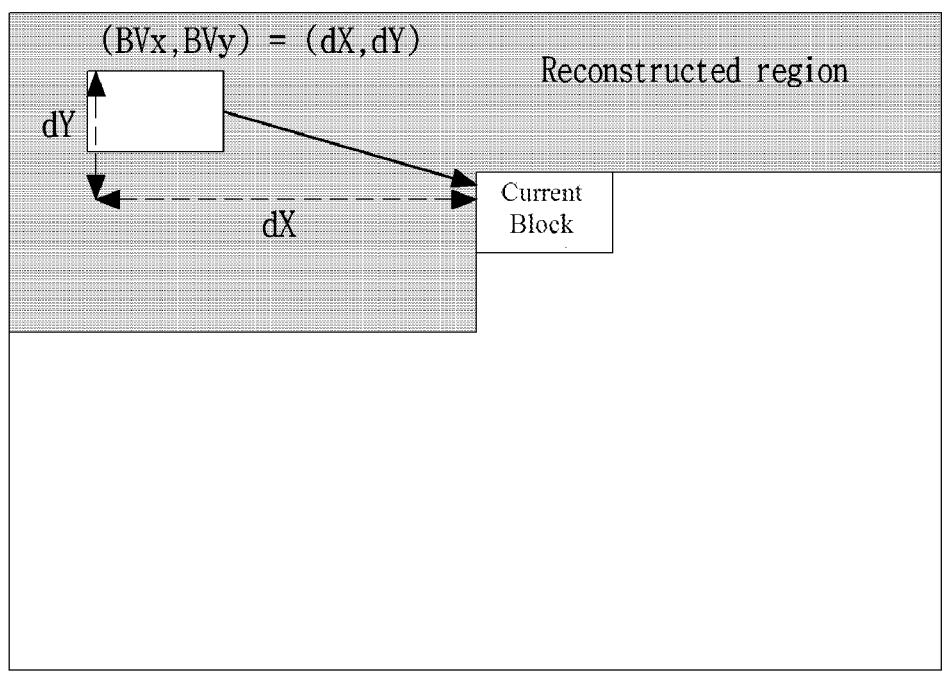

[FIG. 31]
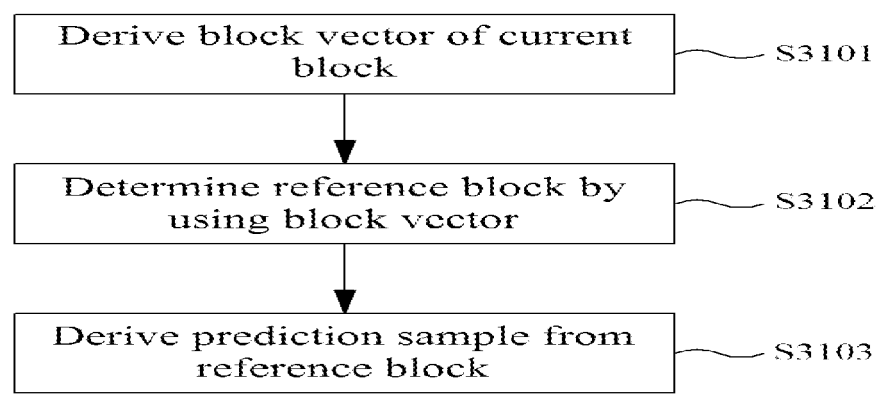
[FIG. 32]
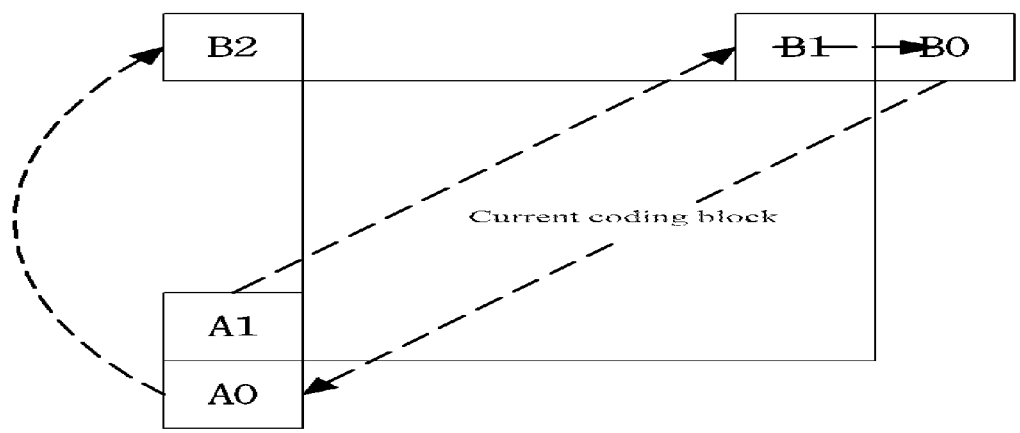

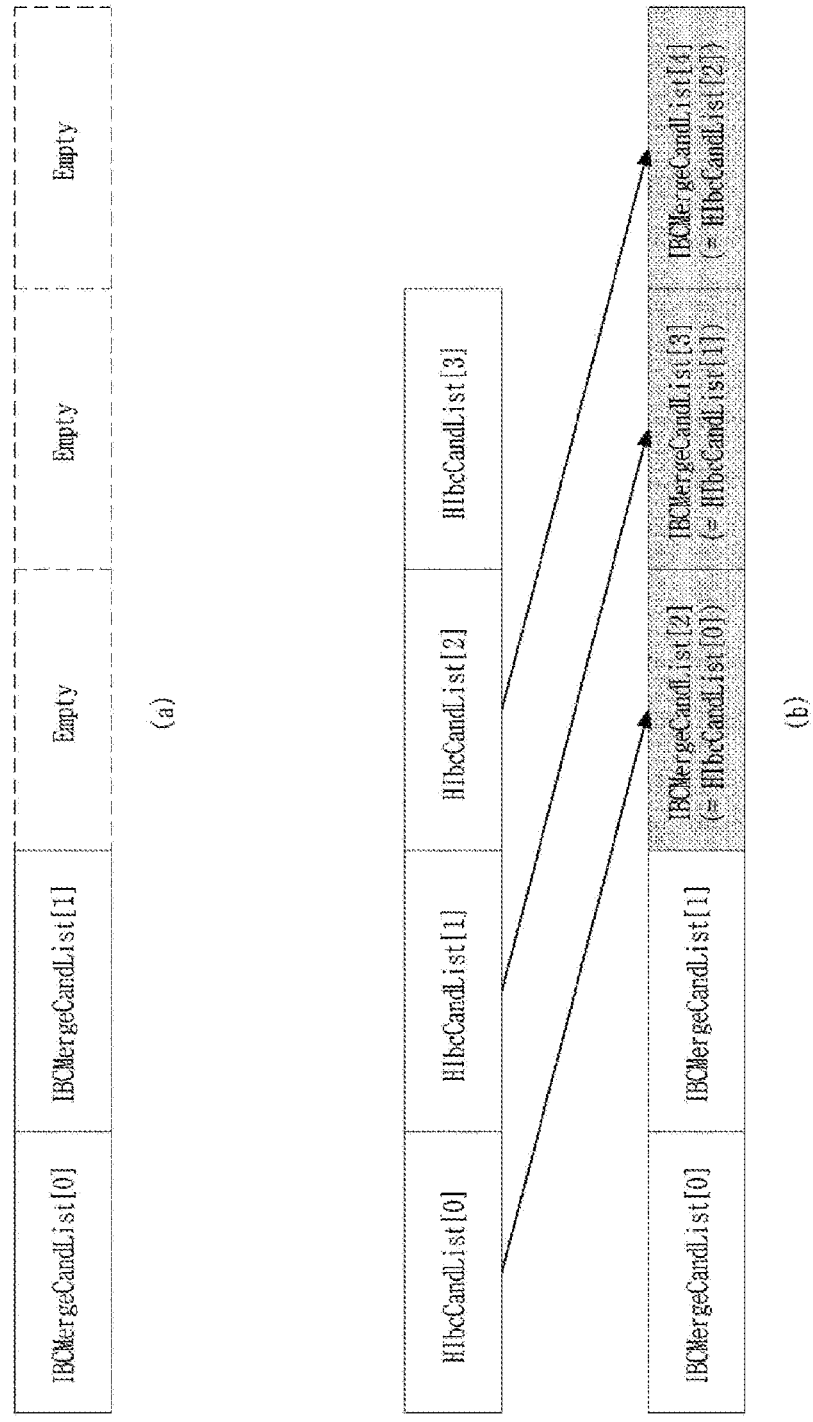
[FIG. 33]

【FIG. 34】
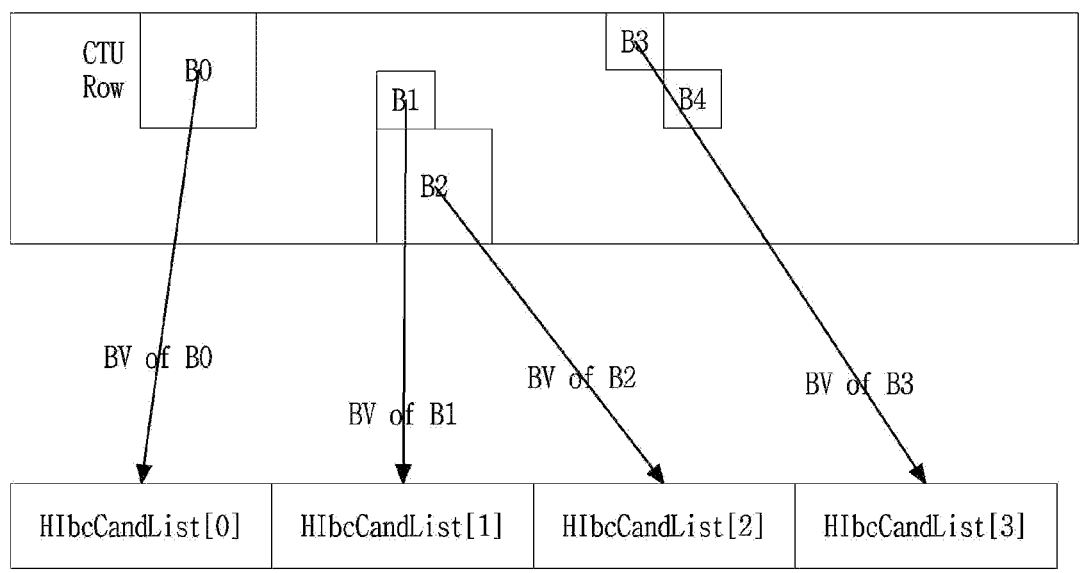
【FIG. 35】
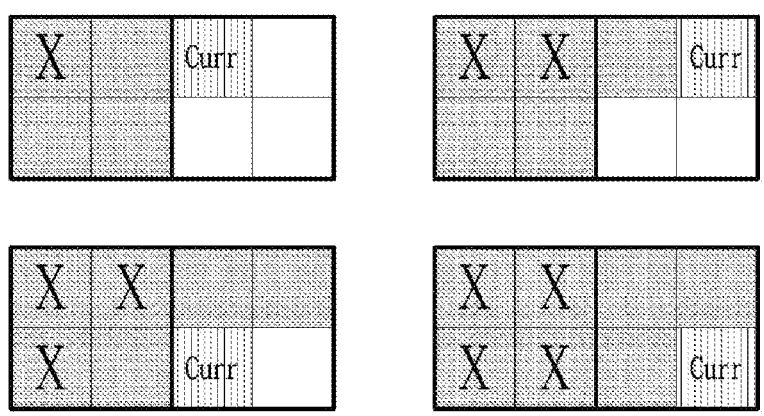

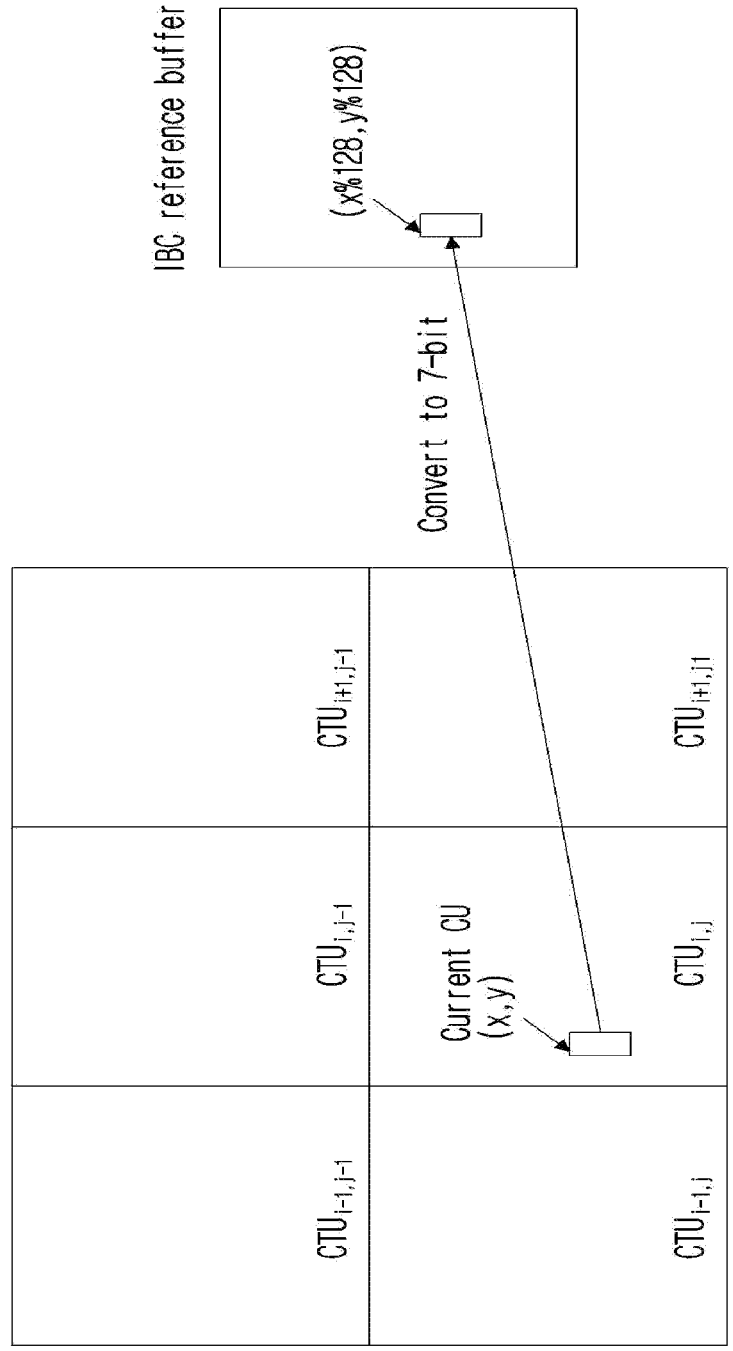
[FIG. 36]

【FIG. 37】
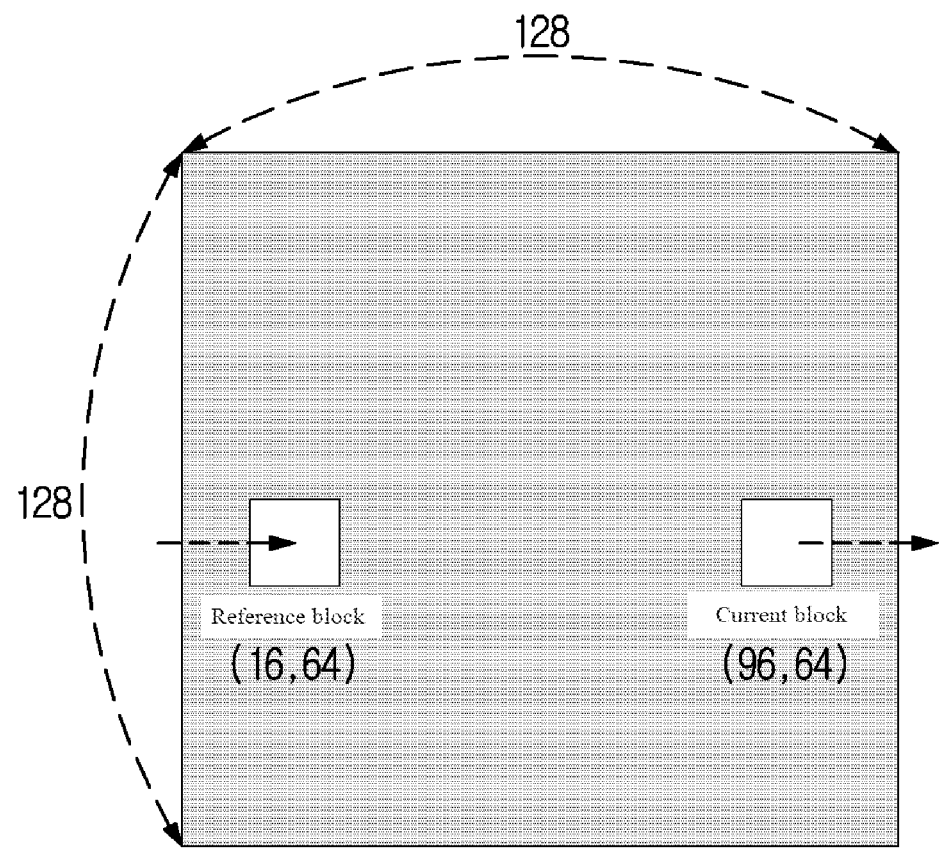
【FIG. 38】
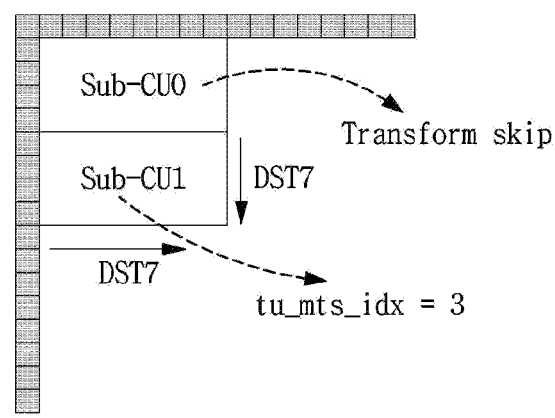

[FIG. 39]
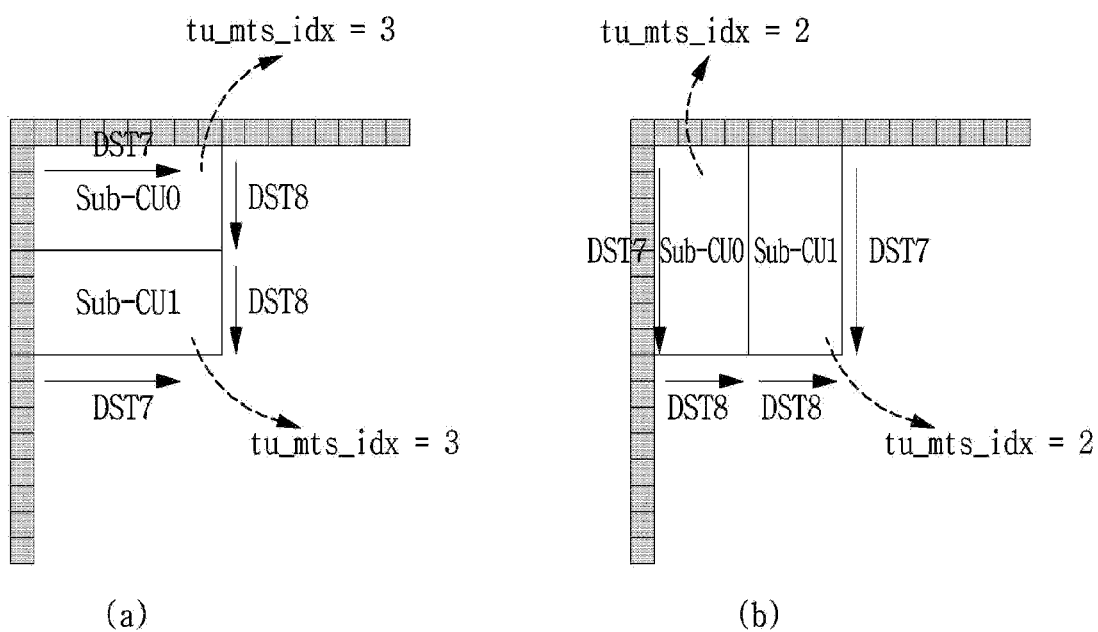
(a)  (b)

【FIG. 40】
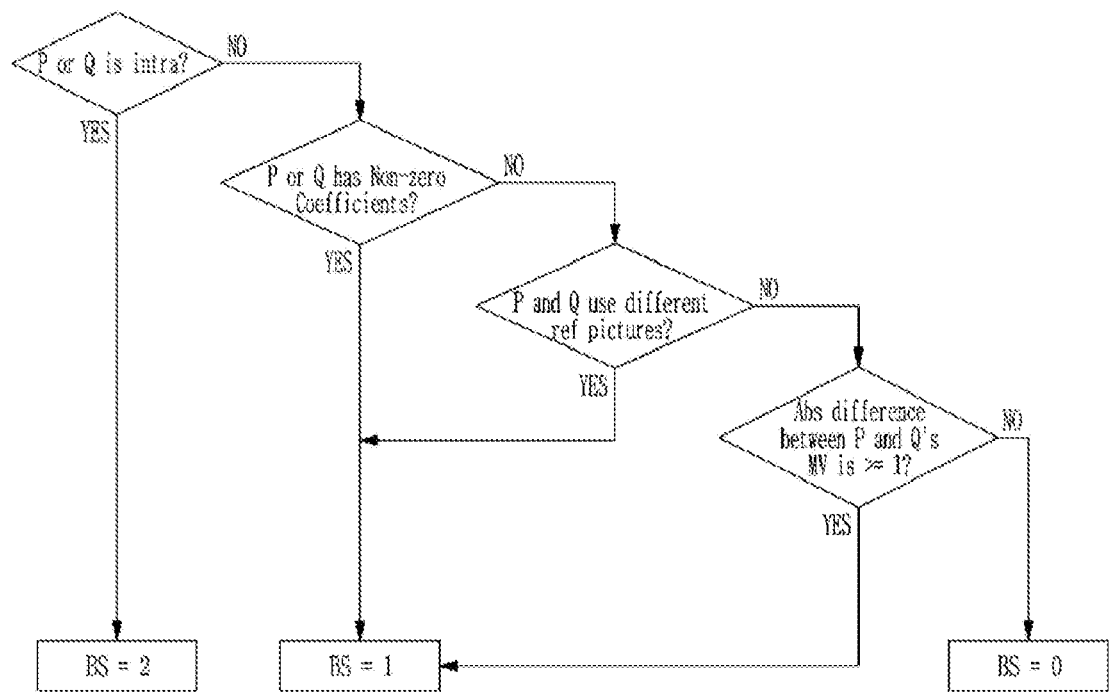
【FIG. 41】
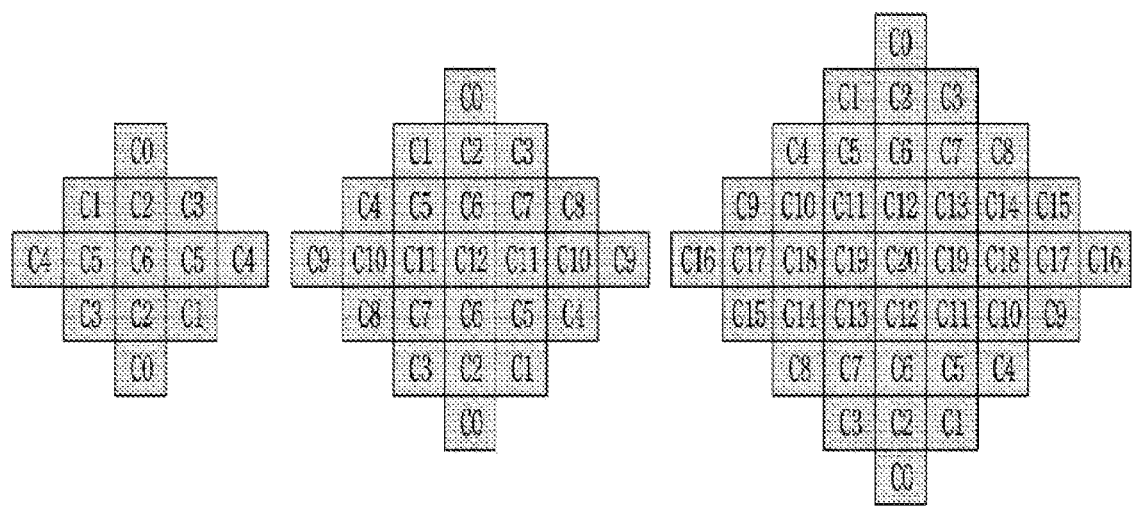

METHOD FOR ENCODING/DECODING A VIDEO USING A MERGE MODE WITH PREDICTION UNIT PARTITIONING AND A BITSTREAM STORING INSTRUCTIONS TO TRANSMIT COMPRESSED VIDEO DATA GENERATED BY THE METHOD OF ENCODING THE VIDEO

CROSS-REFERENCE TO RELATED APPLICATIONS

The present application is a continuation application of application Ser. No. 17/293,847, filed May 13, 2021, which is a continuation of PCT International Application No. PCT/KR2020/005902, filed on May 4, 2020, which claims foreign priority to Korean Patent Application No. 10-2019-0051234, filed on May 2, 2019, Korean Patent Application No.: 10-2019-0051890, filed on May 2, 2019, and Korean Patent Application No.: 10-2019-0069017, filed on Jun. 11, 2019, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method of determining a partitioning type of a coding block by considering a chroma block size in encoding/decoding a video signal, and a device for performing the method.

A purpose of the present disclosure is to provide a prediction method using a block vector in encoding/decoding a video signal, and a device for performing the method.

A purpose of the present disclosure is to provide a method of adaptively determining whether a bidirectional optical flow is applied in encoding/decoding a video signal, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding/encoding method according to the present disclosure may include deriving an L0 motion vector and an L1 motion vector of a current block, deriving an L0 prediction sample and an L1 prediction sample for a first position in the current block based on the L0 motion vector and the L1 motion vector, determining whether a bidirectional optical flow is applied to the current block or not, deriving a refine motion vector for a sub-block including the first position when it is determined to apply the bidirectional optical flow, deriving a refine prediction sample for the first position based on the refine motion vector and obtaining a prediction sample for the first position by using the L0 prediction sample, the L1 prediction sample and the refine prediction sample.

In a video signal decoding/encoding method according to the present disclosure, whether a bidirectional optical flow is applied to the current block or not is determined based on whether a combined prediction method is applied to the current block or not, and the BDOF encoding method is allowed when the combined prediction method is not applied to the current block.

In a video signal decoding/encoding method according to the present disclosure, the refine prediction sample may be derived based on a first difference between an L1 horizontal directional gradient and an L0 horizontal directional gradient and a second difference between an L1 vertical directional gradient and an L0 vertical directional gradient for the first position.

In a video signal decoding/encoding method according to the present disclosure, whether a bidirectional optical flow is applied to the current block or not may be determined based on at least one of a direction or an output order of an L0 reference picture and an L1 reference picture of the current block.

In a video signal decoding/encoding method according to the present disclosure, whether a bidirectional optical flow is applied to the current block or not may be determined based on whether at least one of a width or a height of the current block is equal to or greater than a threshold value.

It is to be understood that the foregoing summarized features are exemplary aspects of the following detailed description of the present disclosure without limiting the scope of the present disclosure.

Technical Effect

According to the present disclosure, encoding/decoding efficiency may be improved by determining a partitioning type of a coding block based on a chroma block size.

According to the present disclosure, encoding/decoding efficiency may be improved by obtaining a prediction sample by using a block vector.

According to the present disclosure, encoding/decoding efficiency may be improved by adaptively determining whether a bidirectional optical flow is applied.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a diagram showing a partitioning aspect of a luma component block and a chroma component block.

FIG. 7 is a flow diagram of an inter prediction method according to an embodiment of the present disclosure.

FIG. 8 is a diagram illustrating the nonlinear motion of an object.

FIG. 9 is a flow diagram of an inter-prediction method based on an affine motion according to an embodiment of the present disclosure.

FIG. 10 is a diagram illustrating affine seed vectors for each affine motion model.

FIG. 11 is a diagram illustrating affine vectors of sub-blocks in a 4-parameter motion model.

FIG. 12 is a flow diagram of a process deriving the current block motion information under a merge mode.

FIG. 13 is a diagram of illustrating candidate blocks used to derive a merge candidate.

FIG. 14 is a diagram to explain the update aspect of a motion information table.

FIG. 15 is a diagram showing the update aspect of a motion information table.

FIG. 16 is a diagram showing an example in which the index of a pre-saved motion information candidate is renewed.

FIG. 17 is a diagram showing an example in which a redundancy check is performed only for a part of merge candidates.

FIG. 18 is a diagram showing an example in which a redundancy check with a specific merge candidate is omitted.

FIG. 19 is a diagram showing an example in which a candidate block included in the same merge processing region as a current block is set to be unavailable as a merge candidate.

FIG. 20 is a diagram showing an example deriving a merge candidate for a current block when a current block is included in a merge processing region.

FIG. 21 is a diagram showing a temporary motion information table.

FIG. 22 is a diagram showing an example in which a motion information table and a temporary motion information table are unified.

FIG. 23 is a diagram showing an example in which a coding block is partitioned into a plurality of prediction units by using a diagonal line.

FIG. 24 is a diagram showing an example in which a coding block is partitioned into two prediction units.

FIG. 25 shows examples in which a coding block is partitioned into a plurality of different-sized prediction units.

FIG. 26 is a diagram showing neighboring blocks used to derive a partitioning mode merge candidate.

FIG. 27 is a diagram for explaining an example in which the availability of a neighboring block is determined per prediction unit.

FIGS. 28 and 29 are diagrams showing an example in which a prediction sample is derived based on a weighted sum operation of the first prediction sample and the second prediction sample.

FIG. 30 is a diagram for explaining a prediction aspect based on an intra block copy mode.

FIG. 31 is a flow chart showing a prediction process of a current block based on an intra block copy mode according to an embodiment of the present disclosure.

FIG. 32 is a diagram illustrating an order that IBC merge candidates are added to an IBC merge candidate list.

FIG. 33 is a diagram showing an example in which an IBC motion information candidate is added to an IBC merge candidate list.

FIG. 34 is a diagram for explaining an update aspect of an IBC motion information table.

FIG. 35 is a diagram illustrating an unavailable region according to a position of a current block.

FIG. 36 is a diagram showing an example in which reconstruction information of a current block which is encoded/decoded is stored in an IBC reference buffer.

FIG. 37 is a diagram for explaining an example which explains an encoding aspect of a block vector difference value.

FIG. 38 is a diagram showing an example in which determination of whether transform skip is performed or not is performed fro each sub-block.

FIG. 39 is a diagram showing an example in which sub-blocks use the same transform type.

FIG. 40 is a flow chart showing a process in which a block strength is determined.

FIG. 41 shows predefined filter candidates.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. Transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (*b*) is a view showing a result of vertical directional binary-tree partitioning, and "SPLIT_BT_HOR" of FIG. 4 (*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

An aspect that at least one of binary tree partitioning, triple tree partitioning or quad tree partitioning is applied to a current block may be referred to as a partitioning type of a current block.

Information representing whether a partitioning type of a luma component block and a partitionint type of a chroma component block are independent each other may be signaled in a bitstream. In an example, a syntax element, dual_tree_flag, may be signaled in a bitstream. When a value of a flag, dual_tree_flag, is 1, it represents that a partitioning type of a luma component block and a partitioning type of a chroma component block are independent each other. When a partitioning type of a luma component block and a partitioning type of a chroma component block are independent, information for determining a partitioning type of a luma component block and information for determining a partitioning type of a chroma component block may be signaled, respectively. When a value of a flag, dual_tree_flag, is 0, it represents that a partitioning type of a chroma component block is dependent on that of a luma component block. In this case, signaling of information representing a partitioning type of a chroma component block may be omitted and only information for determining a partitioning type of a luma component block may be signaled. A partitioning type of a chroma component block may be set the same as that of a luma component block.

When a partitioning type of a luma component block and a partitioning type of a chroma component block are determined to be mutually independent, it may be referred to as a dual tree mode or a separate mode. On the other hand, when a partitioning type of a chroma component block is determined to be dependent on a partitioning type of a luma component block, it may be referred to as a single tree mode or a dependent mode.

A partitioning type which may be applied to a coding block may be determined based on at least one of the number of chroma samples included by a chroma component block or a size or a shape of a chroma component block.

In an example, a partitioning type that the number of chroma samples which will be included in a chroma component block becomes smaller than a threshold value may be determined to be unavailable for a coding block. When the minimum number of chroma samples which should be included by a chroma component block is 16, a partitioning type that the number of chroma samples becomes smaller than 16 may be set to be unavailable for a current block.

In an example, under a single tree mode, in applying a partitioning type of a luma component block to a chroma component block, the partitioning type may be set not to be applied to a luma component block when the number of chroma samples which will be included by a chroma component block becomes smaller than a threshold value.

Alternatively, under a dual tree mode, a partitioning type that the number of chroma samples which will be included by a chroma component block becomes smaller than a threshold value may be set not to be applied to a chroma component block.

Whether a specific partitioning type may be applied to a current block may be determined by considering a prediction mode of a current block. In an example, when a prediction mode of a current block indicates intra prediction, a partitioning type that the number of chroma samples which will be included by a chroma component block becomes smaller than a threshold value may be set to be unavailable for a current block. On the other hand, when a prediction mode of a current block indicates inter prediction, a partitioning type that the number of chroma samples which will be included by a chroma component block becomes smaller than a threshold value may be set to be available for a current block.

Information for determining a threshold value may be signaled in a bitstream. In an example, information for determining a threshold value may be signaled in a level of a sequence, a picture, a slice or a block. A level of a block represents a coding tree unit, a coding block or a prediction unit. The information may be a syntax, smallest_chroma_unit_minus4, that a value derived by subtracting an offset from a value taking $Log_2$ to a threshold value. In an example, when a threshold value is 32, a value of a syntax, smallest_chroma_unit_minus4, may be set to be 1. A threshold value may be derived by the syntax as in the following Equation 1.

$$1<<(\text{smallest\_chroma\_unit\_minus4}+4) \quad \text{[Equation 1]}$$

Alternatively, a threshold value may be predefined in an encoding device and a decoding device.

Alternatively, a threshold value may be adaptively determined based on at least one of a prediction mode, a color format or a bit depth.

A chroma component block including the minimum number of chroma samples may be referred to as a chroma minimum unit block. In an example, when a threshold value is 16, a chroma component coding block including 16 samples may be referred to as a chroma minimum unit coding block.

Alternatively, a partitioning type that a size of a chroma component block becomes smaller than a threshold value may be determined to be unavailable for a coding block. In this case, a size of a block may represent at least one of a width or a height of a block or a value calculated based on multiplication of a width and a height (e.g., a value taking $Log_2$ to multiplication of a width and a height).

In an example, when at least one of a width or a height of a chroma component block is equal to or less than a threshold value, binary tree partitioning may be set to be unallowable. In this case, when a width of a chroma component block is equal to or less than a threshold value, binary tree partitioning in a vertical direction may be set to be unallowable and when a height of a chroma component block is equal to or less than a threshold value, binary tree partitioning in a horizontal direction may be set to be unallowable.

Alternatively, when at least one of a width or a height of a chroma component block is equal to or less than a threshold value, triple tree partitioning may be set to be unallowable. In this case, when a width of a chroma component block is equal to or less than a threshold value, triple tree partitioning in a vertical direction may be set to be unallowable and when a height of a chroma component block is equal to or less than a threshold value, binary tree partitioning in a horizontal direction may be set to be unallowable.

A threshold value for binary tree partitioning and a threshold value for triple tree partitioning may be the same or different. In an example, a threshold value for binary tree partitioning may be 4 and a threshold value for triple tree partitioning may be 8.

In the above-described example, it was explained that under a single tree mode, a partitioning type that the number of chroma samples which will be included by a chroma component block becomes smaller than a threshold value is not applied to a luma component block.

In another example different from description, a partitioning type that the number of chroma samples which will be included by a chroma component block becomes smaller than a threshold value may be set to be valid only for a luma component block and invalid for a chroma component block.

In other words, when a chroma component block corresponding to a luma component block is a chroma minimum unit coding block, additional partitioning may be set to be allowable for the luma component block, but unallowable for the chroma component block.

FIG. 6 is a diagram showing a partitioning aspect of a luma component block and a chroma component block.

In an example of FIG. 6, a thin line represents a partitioning aspect of a luma component block and a thick line represents a partitioning aspect of a chroma component block. In addition, a size of a block shown in a drawing is calculated based on chroma samples. A size of a luma component block corresponding to a size of a shown block may be determined according to a color format.

For convenience of description, it is assumed that a threshold value is 16.

In an example shown in FIG. 1 (*a*), when triple tree partitioning is applied to a luma component block, whether triple tree partitioning will be also applied to a chroma component block may be determined. Concretely, when triple tree partitioning will be applied, whether triple tree partitioning may be applied to a chroma component block may be determined based on whether a chroma component block smaller than a chroma minimum unit coding block is generated.

If triple tree partitioning is applied to a chroma component block including 32 chroma samples, the chroma component block will be partitioned into 2 blocks including 8 chroma samples and 1 block including 16 chroma samples. In other words, if triple tree partitioning is applied to a chroma component block including 32 chroma samples, a chroma component block including chroma samples less than a threshold value (16) will be generated. Accordingly, in an example shown in FIG. 1 (a), triple tree partitioning may be set to be applied only to a luma component block and may be set not to be applied to a chroma component block.

In an example shown in FIG. 1 (b), when binary tree partitioning is applied to a luma component block, whether binary tree partitioning will be also applied to a chroma component block may be determined. Concretely, when binary tree partitioning will be applied, whether binary tree partitioning may be applied to a chroma component block may be determined based on whether a chroma component block smaller than a chroma minimum unit coding block is generated.

If binary tree partitioning is applied to a chroma component block including 32 chroma samples, the chroma component block will be partitioned into 2 blocks including 16 chroma samples. In other words, if binary tree partitioning is applied to a chroma component block including 32 chroma samples, chroma component blocks including the same number of chroma samples as a threshold value (16) will be generated. Accordingly, binary tree partitioning applied to a luma component block may be also applied to a chroma component block.

If binary tree partitioning is applied again to a chroma component block including 16 chroma samples, the chroma component block will be partitioned into 2 blocks including 8 chroma samples. In other words, if binary tree partitioning is applied to a chroma component block including 16 chroma samples, a chroma component block including chroma samples less than a threshold value (16) will be generated. Accordingly, binary tree partitioning may be set to be applied only to a luma component block and may be set not to be applied to a chroma component block.

As a result, in an example shown in FIG. 1 (b), first binary tree partitioning applied both to a luma component block and a chroma component block, but additional binary tree partitioning which is applied again to a block generated by the first binary tree partitioning is applied only to a luma component block and is not applied to a chroma component block.

As in a shown example, whether a partitioning type applied to a luma component block can be applied to a chroma component block may be determined based on whether a partition, which will be generated when the partitioning type is applied to the chroma component block, including chroma samples less than a threshold value. In other words, binary tree partitioning may be applied when the number of chroma samples included by a chroma component block is more than twice a threshold value and triple tree partitioning may be applied when the number of chroma samples included by a chroma component block is more than four times a threshold value. In an example, when a threshold value is 16, binary tree partitioning may be applied when the number of chroma samples included by a chroma component block is equal to or greater than 32 and triple tree partitioning may be applied when the number of chroma samples included by a chroma component block is equal to or greater than 64.

At least one of a sub-partition intra prediction encoding method (ISP), a position-based prediction sample modification method (PDPC) or an encoding method based on a plurality of reference sample lines may be set not to be applied in a chroma minimum unit block. When an encoding method based on a plurality of reference sample lines is not applied, it may mean that it is possible to select only a reference sample line adjacent to a current block and it is impossible to select a reference sample line non-adjacent to a current block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 7 is a flow diagram of an inter-prediction method according to the embodiment of the present disclosure.

In reference to FIG. 7, an inter-prediction method includes determining an inter-prediction mode for a current block S701, obtaining motion information of the current block according to the determined inter-prediction mode S702, and performing motion compensation prediction for a current block on the basis of the obtained motion information S703.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Hereinafter, an inter-prediction method using affine motion information is described in detail.

FIG. 8 is a diagram illustrating a non-linear motion of an object.

In a video, a non-linear motion of an object may occur. In an example, as in an example shown in FIG. 8, a non-linear motion of an object may occur such as camera zoom-in, zoom-out, rotation or affine transform, etc. For the nonlinear motion of the object, a translation motion vector may not effectively express the motion of the object. Accordingly, for a region in which the non-linear motion of the object is occur, encoding efficiency may be improved by using affine motion, instead of translation motion.

FIG. 9 is a flow diagram of an inter-prediction method based on an affine motion according to an embodiment of the present disclosure.

Whether an inter-prediction method based on an affine motion is applied to a current block may be determined based on information parsed from a bitstream. Concretely, based on at least one of a flag indicating whether an affine merge mode is applied to a current block or a flag indicating whether an affine motion vector prediction mode is applied to a current block, whether an inter-prediction method based on an affine motion is applied to a current block will be determined.

When an inter-prediction method based on an affine motion is applied to a current block, an affine motion model for the current block may be determined S901. An affine motion model may be determined as at least one of a 6-parameter affine motion model or a 4-parameter affine motion model. The 6-parameter affine motion model expresses an affine motion by using 6 parameters and the 4-parameter affine motion model expresses an affine motion by using 4 parameters.

Equation 2 expresses an affine motion by using 6 parameters. An affine motion represents translation motion for a predetermined region determined by affine seed vectors.

$$v_x = ax - by + e$$

$$v_y = cx + dy + j \quad \text{[Equation 2]}$$

In case of expressing an affine motion by using 6 parameters, complicated motion may be expressed, but encoding efficiency may be reduced as more bits are needed to encode each parameter. Accordingly, an affine motion may be expressed by using 4 parameters. Equation 3 expresses an affine motion by using 4 parameters.

$$v_x = ax - by + e$$

$$v_y = bx + ay + j \quad \text{[Equation 3]}$$

Information for determining an affine motion model of a current block may be encoded and signaled in a bitstream. In an example, the information may be a 1-bit flag, 'affine_type_flag'. If the value of the flag is 0, it may represent that a 4-parameter affine motion model is applied and if the value of the flag is 1, it may represent that a 6-parameter affine motion model is applied. The flag may be encoded in a unit of a slice, a tile, or a block (e.g. a coding block or a coding tree unit). When a flag is signaled at a slice level, an affine motion model determined at the slice level may be applied to all blocks belonging to the slice.

Alternatively, based on an affine inter-prediction mode of a current block, an affine motion model of the current block may be determined. In an example, when an affine merge mode is applied, an affine motion model of a current block may be determined as a 4-parameter motion model. On the other hand, when an affine motion vector prediction mode is applied, information for determining an affine motion model of a current block may be encoded and signaled in a bitstream. In an example, when an affine motion vector prediction mode is applied to a current block, an affine motion model of the current block may be determined based on a 1-bit flag, 'affine_type_flag'.

Next, affine seed vectors of a current block may be derived S902. When a 4-parameter affine motion model is selected, motion vectors at two control points for a current block may be derived. On the other hand, when a 6-parameter affine motion model is selected, motion vectors at three control points for a current block may be derived. A motion vector at a control point may be referred to as an affine seed vector. A control point may include at least one of a left-top corner, a right-top corner or a left-bottom corner of a current block.

FIG. 10 is a diagram illustrating affine seed vectors for each affine motion model.

In a 4-parameter affine motion model, affine seed vectors for two among a left-top corner, a right-top corner or a left-bottom corner may be derived. In an example, as in an example shown in FIG. 10 (a), when a 4-parameter affine motion model is selected, an affine vector may be derived by using an affine seed vector sv0 for a left-top corner of a current block (e.g. a left-top sample (x1, y1)) and an affine seed vector sv1 for a right-top corner of the current block (e.g. a right-top sample (x1, y1)). It is possible to use an affine seed vector for a left-bottom corner instead of the affine seed vector for the left-top corner or use an affine seed vector for a left-bottom corner instead of the affine seed vector for the right-top corner.

In a 6-parameter affine motion model, affine seed vectors for a left-top corner, a right-top corner and a left-bottom corner may be derived. In an example, as in an example shown in the FIG. 10 (b), when a 6-parameter affine motion model is selected, an affine vector may be derived by using an affine seed vector sv0 for a left-top corner of a current block (e.g. a left-top sample (x1, y1)), an affine seed vector sv1 for a right-top corner of the current block (e.g. a right-top sample (x1, y1)) and an affine seed vector sv2 for a left-top corner of the current block (e.g. a left-top sample (x2, y2)).

In an embodiment described later, under a 4-parameter affine motion model, affine seed vectors at a left-top control point and a right-top control point are referred to as a first affine seed vector and a second affine seed vector, respectively. In embodiments described later which use the first affine seed vector and the second affine seed vector, at least one of the first affine seed vector and the second affine seed vector may be replaced with an affine seed vector at a left-bottom control point (a third affine seed vector) or an affine seed vector at a right-bottom control point (a fourth affine seed vector).

In addition, under a 6-parameter affine motion model, affine seed vectors at a left-top control point, a right-top control point and a left-bottom control point are referred to as a first affine seed vector, a second affine seed vector and a third affine seed vector, respectively. In embodiments described later which use the first affine seed vector, the second affine seed vector and the third affine seed vector, at least one of the first affine seed vector, the second affine seed vector and the third affine seed vector may be replaced with an affine seed vector at a right-bottom control point (a fourth affine seed vector).

An affine vector may be derived per sub-block by using affine seed vectors S903. In this connection, the affine vector represents a translation motion vector derived based on the affine seed vectors. An affine vector of a sub-block can be referred to as an affine sub-block motion vector or a sub-block motion vector.

FIG. 11 is a diagram illustrating affine vectors of sub-blocks under a 4-parameter motion model.

An affine vector of a sub-block may be derived based on a position of a control point, a position of the sub-block and an affine seed vector. In an example, Equation 4 represents an example of deriving an affine sub-block motion vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$

$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

[Equation 4]

In the Equation 4, (x, y) represents a position of a sub-block. In this connection, the position of the sub-block represents a position of a base sample included in the sub-block. The base sample may be a sample positioned at a left-top corner of the sub-block or a sample that at least one of an x-axis or y-axis coordinate is at a central position. $(x_0, y_0)$ represents a position of a first control point and $(sv_{0x}, sv_{0y})$ represents a first affine seed vector. In addition, $(x_1, y_1)$ represents a position of a second control point and $(sv_{1x}, sv_{1y})$ represents a second affine seed vector.

When the first control point and the second control point correspond to a left-top corner and a right-top corner of a current block, respectively, x1-x0 may be set as a value identical to a width of the current block.

After that, motion compensation prediction for each sub-block may be performed by using an affine vector of each sub-block S904. As a result of performing motion compensation prediction, a prediction block for each sub-block may be generated. The prediction blocks of sub-blocks may be set as a prediction block of a current block.

An affine seed vector of a current block may be derived based on an affine seed vector of a neighboring block neighboring the current block. When an inter-prediction mode of a current block is an affine merge mode, an affine seed vector of a merge candidate included in a merge candidate list may be determined as an affine seed vector of the current block. In addition, when the inter-prediction mode of the current block is the affine merge mode, motion information including at least one of the reference picture index, a specific directional prediction flag or a bidirectional weight of the current block may be also set the same as the merge candidate.

Next, an inter-prediction method using translation motion information is described in detail.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 12 is a flow diagram of a process deriving the motion information of a current block under a merge mode.

The merge candidate of a current block may be derived S1201. The merge candidate of a current block may be derived from a block encoded/decoded by inter-prediction prior to a current block.

FIG. 13 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical, horizontal or diagonal line as a neighboring base sample may be set as a non-neighboring base sample.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S1202.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S1203. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 14 is a diagram to explain the update aspect of a motion information table.

For a current block, when inter-prediction is performed S1401, a motion information candidate may be derived based on a current block S1402. The motion information of a motion information candidate may be set the same as that of a current block.

When a motion information table is empty S1403, a motion information candidate derived based on a current block may be added to a motion information table S1404.

When a motion information table already includes a motion information candidate S1403, a redundancy check for the motion information of a current block (or, a motion information candidate derived based on it) may be performed S1405. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1408. Whether motion information candidates are identical may be determined based on whether the motion information (e.g. a motion vector/a reference picture index, etc.) of motion information candidates is identical.

In this connection, when the maximum number of motion information candidates are already stored in a motion information table S1406, the oldest motion information candidate may be deleted S1407 and a motion information candidate derived based on a current block may be added to a motion information table S1408. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 15 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 15, n).

When a motion information candidate identical to a motion information candidate derived based on a current block is prestored S1405, a motion information candidate derived based on a current block may not be added to a motion information table S1409.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 16 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 16 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated.

For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index equal to or greater than the threshold, or with an index equal to or less than the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is equal to or greater than the threshold or equal to or less than the threshold, or a merge candidate derived from a block at a specific position. In this connection, a specific position may include at least one of the left neighboring block, the top neighboring block, the right-top neighboring block or the left-bottom neighboring block of a current zblock.

FIG. 17 is a diagram showing an example in which a redundancy check is performed only for a part of merge candidates.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether merge-CandList[0] and mergeCandList[1] are identical to Hmvp-Cand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 18 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i-1] whose index is i-1 and merge candidates may be performed without adding the motion information candidate HmvpCand[i] to a merge candidate list. In this connection, a redundancy check between the motion information candidate HmvpCand[i-1] and the merge candidate mergeCandList[j] may be omitted.

In an example, in an example shown in FIG. 18, it was determined that HmvpCand[i] and mergeCandList[2] are identical. Accordingly, a redundancy check for HmvpCand [i-1] may be performed without adding HmvpCand[i] to a merge candidate list. In this connection, a redundancy check between HmvpCand[i-1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate-Temporal merge candidate-Motion information candidate-(Affine motion information candidate)-Pairwise merge candidate-Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate-Temporal motion vector prediction candidate-Motion information candidate-(Affine motion information candidate)-Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. However, when a current block is included in a merge processing region larger than the current block, a candidate block included in the same merge processing region as the current block may be set to be unavailable as a merge candidate.

FIG. 19 is a diagram showing an example in which a candidate block included in the same merge processing region as a current block is set to be unavailable as a merge candidate.

In an example shown in left in FIG. 20, in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in right in FIG. 20, in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. However, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 20 is a diagram showing an example which derives a merge candidate for a current block when a current block is included in a merge processing region.

As in an example shown in FIG. 20 (*a*), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 20 (*b*). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, a motion information table may be updated by using only a block at a predefined position in a merge processing region. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be updated in a motion information table and the motion information of other blocks may not be updated in a motion information table.

Alternatively, after all blocks included in a merge processing region are decoded, a motion information candidate derived from the blocks may be added to a motion information table. In other words, while blocks included in a merge processing region are encoded/decoded, a motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on each block's motion information or the number of blocks with the same motion information.

Alternatively, a motion information candidate including a unidirectional motion information may be added to motion information table before a motion information candidate including bidirectional motion information. On the contrary, motion information candidate including bidirectional motion information may be added to a motion information table before a motion information candidate including unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 21 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only the motion information of some blocks among blocks included in a merge processing region may be added to a temporary motion information table. In an example, only blocks at a predefined position in a merge processing region may be used to update a motion information table. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be added to a temporary motion information table and the motion information of other blocks may not be added to a temporary motion information table.

The maximum number of temporary motion information candidates which may be included by a temporary motion information table may be set the same as the maximum number of motion information candidates. Alternatively, the maximum number of temporary motion information candidates which may be included by a temporary motion information table may be determined according to a size of a coding tree unit or a merge processing region. Alternatively, the maximum number of temporary motion information candidates which may be included in a temporary motion information table may be set to be smaller than the maximum number of motion information candidates which may be included in a motion information table.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 22 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 22.

In this connection, temporary motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

A coding block may be partitioned into a plurality of prediction units and prediction may be performed for each of partitioned prediction units. In this case, a prediction unit represents a base unit for performing prediction.

A coding block may be partitioned by using at least one of a vertical line, a horizontal line, an oblique line or a diagonal line. Prediction units partitioned by a partitioning line may have a shape such as a triangle, a quadrangle, a trapezoid or a pentagon. In an example, a coding block may be partitioned into two triangular prediction units, two trapezoidal prediction units, two quadrangular prediction units or one triangular prediction unit and one pentagonal prediction unit.

Information for determining at least one of the number, an angle or a position of a line partitioning a coding block may be signaled in a bitstream. In an example, information representing one of partition type candidates of a coding block may be signaled in a bitstream or information specifying one of a plurality of line candidates partitioning a coding block may be signaled in a bitstream. In an example, index information indicating one of a plurality of line candidates may be signaled in a bitstream.

For each of a plurality of line candidates, at least one of an angle or a position may be different. The number of line candidates which is available for a current block may be determined based on a size or a shape of a current block, the number of available merge candidates or whether a neighboring block at a specific position is available as a merge candidate.

Alternatively, information for determining the number or a type of line candidates may be signaled in a bitstream. In an example, whether an oblique line with an angle greater than a diagonal line and/or an oblique line with an angle smaller than a diagonal line is available as a line candidate may be determined by using a 1-bit flag. The information may be signaled at a sequence, a picture or a sequence level.

Alternatively, based on at least one of an intra prediction mode or an inter prediction mode of a coding block, a position of an available merge candidate or a partitioning type of a neighboring block, at least one of the number, an angle or a position of a line partitioning a coding block may be adaptively determined.

When a coding block is partitioned into a plurality of prediction units, intra prediction or inter prediction may be performed for each partitioned prediction unit.

FIG. 23 is a diagram showing an example in which a coding block is partitioned into a plurality of prediction units by using a diagonal line.

As in an example shown in FIGS. 23 (a) and (b), a coding block may be partitioned into two triangular prediction units by using a diagonal line.

FIGS. 24 (a) and (b) showed that a coding block is partitioned into two prediction units by using a diagonal line connecting two vertexes of a coding block. But, a coding block may be partitioned into two prediction units by using an oblique line that at least one end of a line does not pass a vertex of a coding block.

FIG. 24 is a diagram showing an example in which a coding block is partitioned into two prediction units.

As in an example shown in FIGS. 24 (a) and (b), a coding block may be partitioned into two prediction units by using an oblique line that both ends adjoin the upper and lower boundary of a coding block, respectively.

Alternatively, as in an example shown in FIGS. 24 (c) and (d), a coding block may be partitioned into two prediction units by using an oblique line that both ends adjoin the left and right boundary of a coding block, respectively.

Alternatively, a coding block may be partitioned into two prediction units with a different size. In an example, a coding block may be partitioned into two prediction units with a different size by setting an oblique line partitioning a coding block to meet two boundaries forming one vertex.

FIG. 25 shows examples in which a coding block is partitioned into a plurality of different-sized prediction blocks.

As in an example shown in FIGS. 25 (a) and (b), a coding block may be partitioned into two prediction units with a different size by setting a diagonal line connecting the top-left and bottom-right of a coding block to pass the left boundary, the right boundary, the upper boundary or the lower boundary instead of a top-left corner or a bottom-right corner of a coding block.

Alternatively, as in an example shown in FIGS. 25 (c) and (d), a coding block may be partitioned into two prediction units with a different size by setting a diagonal line connecting the top-right and the bottom-left of a coding block to pass the left boundary, the right boundary, the upper boundary or the lower boundary instead of a top-left corner or a bottom-right corner of a coding block.

Each of prediction units generated by partitioning a coding block is referred to as 'the N-th prediction unit'. In an example, in an example shown in FIG. 23 to FIG. 25, PU1 may be defined as the first prediction unit and PU2 may be defined as the second prediction unit. The first prediction unit may mean a prediction unit which includes a sample at a bottom-left position or a sample at a top-left position in a coding block and the second prediction unit may mean a prediction unit which includes a sample at a top-right position or a sample at a bottom-right position in a coding block.

Conversely, a prediction unit which includes a sample at a top-right position or a sample at a bottom-right position in a coding block may be defined as the first prediction unit and a prediction unit which includes a sample at a bottom-left position or a sample at a top-left position in a coding block may be defined as the second prediction unit.

When a coding block is partitioned by using a horizontal line, a vertical line, a diagonal line or an oblique line, it may be referred to as prediction unit partitioning. A prediction unit generated by applying the prediction unit partitioning may be referred to as a triangular prediction unit, a quadrangular prediction unit or a pentagonal prediction unit according to its shape.

In the embodiments in below, it will be assumed that a coding block is partitioned by using a diagonal line. In particular, when a coding block is partitioned into two prediction units by using a diagonal line, it is referred to as diagonal partitioning or triangular partitioning. But, even when a coding block is partitioned by using an oblique line with an angle different from a vertical line, a horizontal line or a diagonal line, prediction units may be encoded/decoded according to the below-described embodiments. In other words, matters related to the encoding/decoding of the below-described triangular prediction unit may be also applied to the encoding/decoding of a quadrangular prediction unit or a pentagonal prediction unit.

Whether prediction unit partitioning will be applied to a coding block may be determined based on at least one of a slice type, the maximum number of merge candidates which may be included in a merge candidate list, a size of a coding block, a shape of a coding block, a prediction encoding mode of a coding block or a partitioning aspect of a parent node.

In an example, whether prediction unit partitioning will be applied to a coding block may be determined based on whether a current slice is a B type. Prediction unit partitioning may be allowed only when a current slice is a B type.

Alternatively, whether prediction unit partitioning will be applied to a coding block may be determined based on whether the maximum number of merge candidates included in a merge candidate list is equal to or greater than 2. Prediction unit partitioning may be allowed only when the maximum number of merge candidates included in a merge candidate list is equal to or greater than 2.

Alternatively, when at least one of a width or a height is greater than 64, a disadvantage may be occurred during implementation of a hardware that a 64×64-sized data processing unit is redundantly accessed. Accordingly, when at least one of a width or a height of a coding block is greater than a threshold value, it may not be allowed to partition a coding block into a plurality of prediction units. In an example, when at least one of a width or a height of a coding block is greater than 64 (e.g., when at least one of a width or a height is 128), prediction unit partitioning may not be used.

Alternatively, by considering the maximum number of samples which may be simultaneously processed by implemented hardware, prediction unit partitioning may not be allowed for a coding block that the number of samples is greater than a threshold value. In an example, prediction unit partitioning may not be allowed for a coding tree block that the number of samples is greater than 4096.

Alternatively, prediction unit partitioning may not be allowed for a coding block that the number of samples included in a coding block is smaller than a threshold value. In an example, when the number of samples included in a coding block is smaller than 64, prediction unit partitioning may be set not to be applied to a coding block.

Alternatively, whether prediction unit partitioning will be applied to a coding block may be determined based on at least one of whether a width and height ratio of a coding block is smaller than the first threshold value or whether a width and height ratio of a coding block is greater than the second threshold value. In this case, a width and height ratio of a coding block, whRatio, may be determined as a ratio of a width CbW and a height CbH of a coding block as in the following Equation 5.

$$whRatio = abs(Log_2(CbW/CbH))$$ [Equation 5]

Alternatively, when a width and height ratio of a coding block is smaller than the first threshold value or greater than the second threshold value, prediction unit partitioning may be applied to a coding block. In an example, when the first threshold value is 4, prediction unit partitioning may not be allowed for a 64×4 or 4×64-sized coding block.

Alternatively, based on a partitioning type of a parent node, whether prediction unit partitioning is allowed may be determined. In an example, when a coding block, a parent node, is partitioned based on quad tree partitioning, prediction unit partitioning may be applied to a coding block, a leaf node. On the other hand, when a coding block, a parent node, is partitioned based on binary tree or triple tree partitioning, prediction unit partitioning may be set to be unallowable for a coding block, a leaf node.

Alternatively, based on a prediction encoding mode of a coding block, whether prediction unit partitioning is allowed may be determined. In an example, prediction unit partitioning may be allowed only when a coding block is encoded by intra prediction, when a coding block is encoded by inter prediction or when a coding block is encoded by a predefined inter prediction mode. In this case, a predefined inter prediction mode may include at least one of a merge mode, a motion vector prediction mode, an affine merge mode or an affine motion vector prediction mode.

Alternatively, based on a size of a parallel processing region, whether prediction unit partitioning is allowed may be determined. In an example, when a size of a coding block is greater than that of a parallel processing region, prediction unit partitioning may not be used.

By considering two or more of the above-enumerated conditions, whether prediction unit partitioning will be applied to a coding block may be determined.

In another example, information representing whether prediction unit partitioning will be applied to a coding block may be signaled in a bitstream. The information may be signaled at a sequence, a picture, a slice or a block level. For example, a flag, triangle_partition_flag, representing whether prediction unit partitioning is applied to a coding block, may be signaled at a coding block level.

When it is determined to apply prediction unit partitioning to a coding block, information representing the number of lines partitioning a coding block or a position of a line may be signaled in a bitstream.

In an example, when a coding block is partitioned by a diagonal line, information representing a direction of a diagonal line partitioning a coding block may be signaled in a bitstream. In an example, a flag, triangle_partition_type_flag, representing a direction of a diagonal line, may be signaled in a bitstream. The flag represents whether a coding block is partitioned by a diagonal line connecting a top-left and a bottom-right or whether a coding block is partitioned by a diagonal line connecting a top-right and a bottom-left. When a coding block is partitioned by a diagonal line connecting a top-left and a bottom-right, it may be referred to as a left triangular partition type and when a coding block is partitioned by a diagonal line connecting a top-right and a bottom-left, it may be referred to as a right triangular partition type. In an example, when a value of the flag is 0, it may represent that a partition type of a coding block is a left triangular partition type and when a value of the flag is 1, it may represent that a partition type of a coding block is a right triangular partition type.

In addition, information representing whether sizes of prediction units are the same or information representing a position of a diagonal line partitioning a coding block may be signaled in a bitstream. In an example, when information representing sizes of prediction units represents that sizes of prediction units are the same, the encoding of information representing a position of a diagonal line may be omitted and a coding block may be partitioned into two prediction units by using a diagonal line which passes two vertexes of a coding block. On the other hand, when information representing sizes of prediction units represents that sizes of prediction units are not the same, a position of a diagonal line partitioning a coding block may be determined based on information representing a position of a diagonal line. In an example, when a left triangular partition type is applied to a coding block, the position information may represent whether a diagonal line meets the left boundary and the lower boundary of a coding block or whether a diagonal line meets the upper boundary and the right boundary. Alternatively, when a right triangular partition type is applied to a coding block, the position information may represent whether a diagonal line meets the right boundary and the lower boundary of a coding block or whether a diagonal line meets the upper boundary and the left boundary.

Information representing a partition type of a coding block may be signaled at a coding block level. Accordingly, a partition type may be determined per coding block to which prediction unit partitioning is applied.

In another example, information representing a partition type for a sequence, a picture, a slice, a tile or a coding tree unit may be signaled. In this case, partition types of coding blocks to which diagonal partitioning is applied in a sequence, a picture, a slice, a tile or a coding tree unit may be set the same.

Alternatively, information for determining a partition type for the first coding unit to which prediction unit partitioning is applied in a coding tree unit may be encoded and signaled, and coding units to which prediction unit partitioning is applied for the second or later may be set to use the same partition type as the first coding unit.

In another example, a partition type of a coding block may be determined based on a partition type of a neighboring block. In this case, a neighboring block may include at least one of a neighboring block adjacent to the top-left corner of a coding block, a neighboring block adjacent to the top-right corner, a neighboring block adjacent to the bottom-left corner, a neighboring block positioned at the top or a neighboring block positioned at the left. In an example, a partition type of a current block may be set the same as a partition type of a neighboring block. Alternatively, a partition type of a current block may be determined based on whether a left triangular partition type is applied to a top-left neighboring block or whether a right triangular partition type is applied to a top-right neighboring block or a bottom-left neighboring block.

To perform motion prediction compensation for the first prediction unit and the second prediction unit, the motion information of each of the first prediction unit and the second prediction unit may be derived. In this case, the motion information of the first prediction unit and the second prediction unit may be derived from merge candidates included in a merge candidate list. To distinguish between a general merge candidate list and a merge candidate list used to derive the motion information of prediction units, a merge candidate list for deriving the motion information of prediction units is referred to as a partitioning mode merge candidate list or a triangular merge candidate list. In addition, a merge candidate included in a partitioning mode merge candidate list is referred to as a partitioning mode merge candidate or a triangular merge candidate. But, applying the above-described method of deriving a merge candidate and the above-described method of constituting a merge candidate list to derive a partitioning mode merge candidate and to constitute a partitioning mode merge candidate list is also included in a scope of the preset disclosure.

Information for determining the maximum number of partitioning mode merge candidates which may be included in a partitioning mode merge candidate list may be signaled in a bitstream. The information may represent a difference between the maximum number of merge candidates which may be included in a merge candidate list and the maximum number of partitioning mode merge candidates which may be included in a partitioning mode merge candidate list.

A partitioning mode merge candidate may be derived from a spatial neighboring block and a temporal neighboring block of a coding block.

FIG. 26 is a diagram showing neighboring blocks used to derive a partitioning mode merge candidate.

A partitioning mode merge candidate may be derived by using at least one of a neighboring block positioned at the top of a coding block, a neighboring block positioned at the left of a coding block or a collocated block included in a picture different from a coding block. A top neighboring block may include at least one of a block including a sample (xCb+CbW−1, yCb−1) positioned at the top of a coding block, a block including a sample (xCb+CbW, yCb−1) positioned at the top of a coding block or a block including a sample (xCb−1, yCb−1) positioned at the top of a coding block. A left neighboring block may include at least one of a block including a sample (xCb−1, yCb+CbH−1) positioned at the left of a coding block or a block including a sample (xCb−1, yCb+CbH) positioned at the left of a coding block. A collocated block may be determined as one of a block including a sample (xCb+CbW, yCb+CbH) adjacent to the top-right corner of a coding block or a block including a sample (xCb/2, yCb/2) positioned at the center of a coding block in a collocated picture.

Neighboring blocks may be searched in a predefined order, and a partitioning mode merge candidate list may be configured with partitioning mode merge candidates according to the predefined order. In an example, a partitioning mode merge candidate may be searched in the order of B1, A1, B0, A0, C0, B2 and C1 to configure a partitioning mode merge candidate list.

The motion information of prediction units may be derived based on the partitioning mode merge candidate list. In other words, prediction units may share a single partitioning mode merge candidate list.

To derive the motion information of a prediction unit, information for specifying at least one of partitioning mode merge candidates included in a partitioning mode merge candidate list may be signaled in a bitstream. In an example, index information, merge_triangle_idx, for specifying at least one of partitioning mode merge candidates may be signaled in a bitstream.

Index information may specify a combination of a merge candidate of the first prediction unit and a merge candidate of the second prediction unit. In an example, the following table 1 is an example representing a combination of merge candidates according to index information, merge_triangle_idx.

TABLE 1

| merge_triangle_idx | 0 | 1 | 2 | 3 | 4 | 5 | 6 | 7 | 8 |
|---|---|---|---|---|---|---|---|---|---|
| First Prediction Unit | 1 | 0 | 0 | 0 | 2 | 0 | 0 | 1 | 3 |
| Second Prediction Unit | 0 | 1 | 2 | 1 | 0 | 3 | 4 | 0 | 0 |

| merge_triangle_idx | 9 | 10 | 11 | 12 | 13 | 14 | 15 | 16 | 17 |
|---|---|---|---|---|---|---|---|---|---|
| First Prediction Unit | 4 | 0 | 1 | 1 | 0 | 0 | 1 | 1 | 1 |
| Second Prediction Unit | 0 | 2 | 2 | 2 | 4 | 3 | 3 | 4 | 4 |

| merge_triangle_idx | 18 | 19 | 20 | 21 | 22 | 23 | 24 | 25 | 26 |
|---|---|---|---|---|---|---|---|---|---|
| First Prediction Unit | 1 | 2 | 2 | 2 | 4 | 3 | 3 | 3 | 4 |
| Second Prediction Unit | 3 | 1 | 0 | 1 | 3 | 0 | 2 | 4 | 0 |

| merge_triangle_idx | 27 | 28 | 29 | 30 | 31 | 32 | 33 | 34 | 35 |
|---|---|---|---|---|---|---|---|---|---|
| First Prediction Unit | 3 | 2 | 4 | 4 | 2 | 4 | 3 | 4 | 3 |
| Second Prediction Unit | 1 | 3 | 1 | 1 | 3 | 2 | 2 | 3 | 1 |

| merge_triangle_idx | 36 | 37 | 38 | 39 | | | | | |
|---|---|---|---|---|---|---|---|---|---|
| First Prediction Unit | 2 | 2 | 4 | 3 | | | | | |
| Second Prediction Unit | 4 | 4 | 2 | 4 | | | | | |

When a value of index information, merge_triangle_idx, is 1, it represents that the motion information of the first prediction unit is derived from a merge candidate whose index is 1 and the motion information of the second prediction unit is derived from a merge candidate whose index is 0. A partitioning mode merge candidate for deriving the motion information of the first prediction unit and a partitioning mode merge candidate for deriving the motion information of the second prediction unit may be determined by index information, merge_triangle_idx. It is also possible to determine based on the index information a partition type of a coding block to which diagonal partitioning is applied. In other words, index information may specify a combination of a merge candidate of the first prediction unit, a merge candidate of the second prediction unit and a partitioning direction of a coding block. When a partition type of a coding block is determined by index information, information, triangle_partition_type_flag, representing a direction of a diagonal line partitioning a coding block may not be encoded. Table 2 represents a partition type of a coding block for index information, merge_triangle_idx.

TABLE 2

| merge_triangle_idx | 0 | 1 | 2 | 3 | 4 | 5 | 6 | 7 | 8 |
|---|---|---|---|---|---|---|---|---|---|
| TriangleDir | 0 | 1 | 1 | 0 | 0 | 1 | 1 | 1 | 0 |

| merge_triangle_idx | 9 | 10 | 11 | 12 | 13 | 14 | 15 | 16 | 17 |
|---|---|---|---|---|---|---|---|---|---|
| TriangleDir | 0 | 0 | 0 | 1 | 0 | 0 | 0 | 0 | 1 |

TABLE 2-continued

| merge_triangle_idx | 18 | 19 | 20 | 21 | 22 | 23 | 24 | 25 | 26 |
|---|---|---|---|---|---|---|---|---|---|
| TriangleDir | 1 | 1 | 1 | 0 | 0 | 1 | 1 | 1 | 1 |
| merge_triangle_idx | 27 | 28 | 29 | 30 | 31 | 32 | 33 | 34 | 35 |
| TriangleDir | 1 | 1 | 1 | 0 | 0 | 1 | 0 | 1 | 0 |
| merge_triangle_idx | 36 | 37 | 38 | 39 | | | | | |
| TriangleDir | 0 | 1 | 0 | 0 | | | | | |

When a variable, TriangleDir, is 0, it represents that a left triangular partition type is applied to a coding block and when a variable, TriangleDir, is 1, it represents that a right triangular partition type is applied to a coding block. By combining Table 1 and Table 2, index information, merge_triangle_idx, may be set to specify a combination of a merge candidate of the first prediction unit, a merge candidate of the second prediction unit and a partitioning direction of a coding block. In another example, index information only for one of the first prediction unit and the second prediction unit may be signaled and an index of a merge candidate for the other of the first prediction unit and the second prediction unit may be determined based on the index information. In an example, a merge candidate of the first prediction unit may be determined based on index information, merge_triangle_idx, representing an index of one of partitioning mode merge candidates. And, a merge candidate of the second prediction unit may be specified based on the merge_triangle_idx. In an example, a merge candidate of the second prediction unit may be derived by adding or subtracting an offset to or from the index information, merge_triangle_idx. An offset may be an integer such as 1 or 2. In an example, a merge candidate of the second prediction unit may be determined as a partitioning mode merge candidate having a value obtained by adding 1 to merge_triangle_idx as an index. When merge_triangle_idx indicates a partitioning mode merge candidate with the largest index value among partitioning mode merge candidates, the motion information of the second prediction unit may be derived from a partitioning mode merge candidate whose index is 0 or a partitioning mode merge candidate having a value subtracting 1 from merge_triangle_idx as an index. Alternatively, the motion information of the second prediction unit may be derived from a partitioning mode merge candidate with the same reference picture as a partitioning mode merge candidate of the first prediction unit specified by index information. In this case, a partitioning mode merge candidate with the same reference picture as a partitioning mode merge candidate of the first prediction unit may represent a partitioning mode merge candidate that at least one of a L0 reference picture or a L1 reference picture is the same as a partitioning mode merge candidate of the first prediction unit. When there are a plurality of partitioning mode merge candidates with the same reference picture as a partitioning mode merge candidate of the first prediction unit, any one may be selected based on at least one of whether a merge candidate includes bi-directional motion information or a difference value between an index of a merge candidate and index information.

In another example, index information may be signaled for each of the first prediction unit and the second prediction unit. In an example, the first index information, 1st_merge_idx, for determining a partitioning mode merge candidate of the first prediction unit, and the second index information, 2nd_merge_idx, for determining a partitioning mode merge candidate of the second prediction unit, may be signaled in a bitstream. The motion information of the first prediction unit may be derived from a partitioning mode merge candidate determined based on the first index information, 1st_merge_idx, and the motion information of the second prediction unit may be derived from a partitioning mode merge candidate determined based on the second index information, 2nd_merge_idx.

The first index information, 1st_merge_idx, may represent an index of one of partitioning mode merge candidates included in a partitioning mode merge candidate list. A partitioning mode merge candidate of the first prediction unit may be determined as a partitioning mode merge candidate indicated by the first index information, 1st_merge_idx.

A partitioning mode merge candidate indicated by the first index information, 1st_merge_idx, may be set to be unavailable as a partitioning mode merge candidate of the second prediction unit. Accordingly, the second index information of the second prediction unit, 2nd_merge_idx, may represent an index of any one of remaining partitioning mode merge candidates except for a partitioning mode merge candidate indicated by the first index information. When a value of the second index information, 2nd_merge_idx, is smaller than that of the first index information, 1st_merge_idx, a partitioning mode merge candidate of the second prediction unit may be determined as a partitioning mode merge candidate having index information represented by the second index information, 2nd_merge_idx. On the other hand, when a value of the second index information, 2nd_merge_idx, is the same as or greater than that of the first index information, 1st_merge_idx, a partitioning mode merge candidate of the second prediction unit may be determined as a partitioning mode merge candidate having a value obtained by adding 1 to a value of the second index information, 2nd_merge_idx, as an index.

Alternatively, according to the number of partitioning mode merge candidates included in a partitioning mode merge candidate list, whether the second index information is signaled or not may be determined. In an example, when the maximum number of partitioning mode merge candidates which may be included in a partitioning mode merge candidate list does not exceed 2, the signaling of the second index information may be omitted. When the signaling of the second index information is omitted, the second partitioning mode merge candidate may be derived by adding or subtracting an offset to or from the first index information. In an example, when the maximum number of partitioning mode merge candidates which may be included in a partitioning mode merge candidate list is 2 and the first index information indicates an index of 0, the second partitioning mode merge candidate may be derived by adding 1 to the first index information. Alternatively, when the maximum number of partitioning mode merge candidates which may be included in a partitioning mode merge candidate list is 2 and the first index information indicates 1, the second partitioning mode merge candidate may be derived by subtracting 1 from the first index information.

Alternatively, when the signaling of the second index information is omitted, the second index information may be inferred as a default value. In this case, a default value may be 0. The second partitioning mode merge candidate may be derived by comparing the first index information with the second index information. In an example, when the second index information is smaller than the first index information, a merge candidate whose index is 0 may be set as the second partitioning mode merge candidate and when the second index information is the same as or greater than the first index information, a merge candidate whose index is 1 may be set as the second partitioning mode merge candidate.

When a partitioning mode merge candidate has unidirectional motion information, the unidirectional motion information of a partitioning mode merge candidate may be set as the motion information of a prediction unit. On the other hand, when a partitioning mode merge candidate has bidirectional motion information, only one of L0 motion information or L1 motion information may be set as the motion information of a prediction unit. Which of L0 motion information or L1 motion information will be taken may be determined based on an index of a partitioning mode merge candidate or the motion information of the other prediction unit.

In an example, when an index of a partitioning mode merge candidate is an even number, the L0 motion information of a prediction unit may be set to be 0 and the L1 motion information of a partitioning mode merge candidate may be set as the L1 motion information of a prediction unit. On the other hand, when an index of a partitioning mode merge candidate is an odd number, the L1 motion information of a prediction unit may be set to be 0 and the L0 motion information of a partitioning mode merge candidate may be set to be 0. Conversely, when an index of a partitioning mode merge candidate is an even number, the L0 motion information of a partitioning mode merge candidate may be set as the L0 motion information of a prediction unit and when an index of a partitioning mode merge candidate is an odd number, the L1 motion information of a partitioning mode merge candidate may be set as the L1 motion information of a prediction unit. Alternatively, for a first prediction unit, the L0 motion information of a partitioning mode merge candidate may be set as the L0 motion information of the first prediction unit when a partitioning mode merge candidate for the first prediction unit is an even number, but, for a second prediction unit, the L1 motion information of a partitioning mode merge candidate may be set as the L1 motion information of the second prediction unit when a partitioning mode merge candidate for the second prediction unit is an odd number.

Alternatively, when the first prediction unit has L0 motion information, the L0 motion information of the second prediction unit may be set to be 0 and the L1 motion information of a partitioning mode merge candidate may be set as the L1 information of the second prediction unit. On the other hand, when the first prediction unit has L1 motion information, the L1 motion information of the second prediction unit may be set to be 0 and the L0 motion information of a partitioning mode merge candidate may be set as the L0 motion information of the second prediction unit.

A partitioning mode merge candidate list for deriving the motion information of the first prediction unit may be set to be different from a partitioning mode merge candidate list for deriving the motion information of the second prediction unit.

In an example, when a partitioning mode merge candidate for deriving the motion information of the first prediction unit in a partitioning mode merge candidate list is specified based on index information for the first prediction unit, the motion information of the second prediction unit may be derived by using a partitioning mode merge list including remaining partitioning mode merge candidates except for the partitioning mode merge candidate indicated by the index information. Concretely, the motion information of the second prediction unit may be derived from one of remaining partitioning mode merge candidates.

Accordingly, the maximum number of partitioning mode merge candidates included in a partitioning mode merge candidate list of the first prediction unit may be different from the maximum number of partitioning mode merge candidates included in a partitioning mode merge candidate list of the second prediction unit. In an example, when a partitioning mode merge candidate list of the first prediction unit includes M merge candidates, a partitioning mode merge candidate list of the second prediction unit may include M−1 merge candidates except for the partitioning mode merge candidate indicated by the index information of the first prediction unit.

In another example, the availability of a neighboring block may be determined by deriving a merge candidate of each prediction unit based on neighboring blocks adjacent to a coding block, but by considering a shape or a position of a prediction unit.

FIG. 27 is a diagram for explaining an example in which the availability of a neighboring block is determined per prediction unit.

A neighboring block which is not adjacent to the first prediction unit may be set to be unavailable for the first prediction unit and a neighboring block which is not adjacent to the second prediction unit may be set to be unavailable for the second prediction unit.

In an example, as in an example shown in FIG. 27 (a), when a left triangular partition type is applied to a coding block, blocks A1, A0 and A2 adjacent to the first prediction unit among neighboring blocks adjacent to a coding block may be determined to be available for the first prediction unit, but blocks B0 and B1 may be determined to be unavailable for the first prediction unit. Accordingly, a partitioning mode merge candidate list for the first prediction unit may include partitioning mode merge candidates derived from blocks A1, A0 and A2, but it may not include partitioning mode merge candidates derived from blocks B0 and B1.

As in an example shown in FIG. 27 (b), when a left triangular partition type is applied to a coding block, blocks B0 and B1 adjacent to the second prediction unit may be determined to be available for the second prediction unit, but blocks A1, A0 and A2 may be determined to be unavailable for the second prediction unit. Accordingly, a partitioning mode merge candidate list for the second prediction unit may include partitioning mode merge candidates derived from blocks B0 and B1, but it may not include partitioning mode merge candidates derived from blocks A1, A0 and A2.

Accordingly, the number of partitioning mode merge candidates which may be used by a prediction unit or a range of partitioning mode merge candidates may be determined based on at least one of a position of a prediction unit or a partition type of a coding block.

A motion prediction compensation prediction for a coding block may be performed based on each of the motion information of the first prediction unit and the motion information of the second prediction unit. In this case, quality degradation may be generated on the boundary of the first prediction unit and the second prediction unit. In an example, quality continuity may deteriorate around an edge on the boundary of the first prediction unit and the second prediction unit. To reduce quality degradation on the boundary, a prediction sample may be derived by a smoothing filter or a weighted prediction.

A prediction sample in a coding block to which diagonal partitioning is applied may be derived based on a weighted sum operation of the first prediction sample obtained based on the motion information of the first prediction unit and the second prediction sample obtained based on the motion information of the second prediction unit. Alternatively, a prediction sample of the first prediction unit may be derived from the first prediction block determined based on the motion information of the first prediction unit and a prediction sample of the second prediction unit may be derived from the second prediction block determined based on the motion information of the second prediction unit, but a prediction sample on the boundary region of the first prediction unit and the second prediction unit may be derived based on a weighted sum operation of the first prediction sample included in the first prediction block and the second prediction sample included in the second prediction block. In an example, the following Equation 6 represents an example of deriving a prediction sample of the first prediction unit and the second prediction unit.

$$P(x,y) = w1 * P1(x,y) + (1-w1) * P2(x,y)$$ [Equation 6]

In the Equation 6, P1 represents the first prediction sample and P2 represents the second prediction sample. w1 represents a weight which is applied to the first prediction sample and (1−w1) represents a weight which is applied to the second prediction sample. As in an example shown in Equation 6, a weight which is applied to the second prediction sample may be derived by subtracting a weight which is applied to the first prediction sample from a constant value.

When a left triangular partition type is applied to a coding block, a boundary region may include prediction samples with the same x-axis coordinate and y-axis coordinate. On the other hand, when a right triangular partition type is applied to a coding block, a boundary region may include prediction samples that a sum of an x-axis coordinate and a y-axis coordinate is equal to or greater than the first threshold value and is equal to or less than the second threshold value.

A size of a boundary region may be determined based on at least one of a size of a coding block, a shape of a coding block, the motion information of prediction units, a motion vector difference value of prediction units, a picture order count of a reference picture or a difference value between the first prediction sample and the second prediction sample on a diagonal boundary.

FIGS. 28 and 29 are diagrams showing an example in which a prediction sample is derived based on a weighted sum operation of the first prediction sample and the second prediction sample. FIG. 28 illustrates a case in which a left triangular partition type is applied to a coding block and FIG. 29 illustrates a case in which a right triangular partition type is applied to a coding block. In addition, FIG. 28 (a) and FIG. 29 (a) are diagrams representing a prediction aspect for a luma component and FIG. 28 (b) and the FIG. 29 (b) are diagrams representing a prediction aspect for a chroma component.

In shown diagrams, a number marked on a prediction sample around the boundary of the first prediction unit and the second prediction unit represents a weight which is applied to the first prediction sample. In an example, when a number marked on a prediction sample is N, the prediction sample may be derived by applying a weight of N/8 to the first prediction sample and applying a weight of (1−(N/8)) to the second prediction sample.

In a non-boundary region, the first prediction sample or the second prediction sample may be determined as a prediction sample. Looking at an example in FIG. 28, the first prediction sample derived based on the motion information of the first prediction unit may be determined as a prediction sample in a region belonging to the first prediction unit. On the other hand, the second prediction sample derived based on the motion information of the second prediction unit may be determined as a prediction sample in a region belonging to the second prediction unit.

Looking at an example in FIG. 29, the first prediction sample derived based on the motion information of the first prediction unit may be determined as a prediction sample in a region where a sum of an x-axis coordinate and a y-axis coordinate is smaller than the first threshold value. On the other hand, the second prediction sample derived based on the motion information of the second prediction unit may be determined as a prediction sample in a region where a sum of an x-axis coordinate and a y-axis coordinate is greater than the second threshold value.

A threshold value determining a non-boundary region may be determined based on at least one of a size of a coding block, a shape of a coding block or a color component. In an example, when a threshold value for a luma component is set to be N, a threshold value for a chroma component may be set to be N/2.

Prediction samples included in a boundary region may be derived based on a weighted sum operation of the first prediction sample and the second prediction sample. In this case, weights applied to the first prediction sample and the second prediction sample may be determined based on at least one of a position of a prediction sample, a size of a coding block, a shape of a coding block or a color component.

In an example, as in an example shown in FIG. 28 (a), prediction samples with the same x-axis coordinate and y-axis coordinate may be derived by applying the same weight to the first prediction sample and the second prediction sample. Prediction samples that an absolute value of a difference between an x-axis coordinate and a y-axis coordinate is 1 may be derived by setting a weight ratio applied to the first prediction sample and the second prediction sample as (7:1) or (1:7).

Alternatively, as in an example shown in FIG. 28 (b), prediction samples with the same x-axis coordinate and y-axis coordinate may be derived by applying the same weight to the first prediction sample and the second prediction sample and prediction samples that an absolute value of a difference between an x-axis coordinate and a y-axis coordinate is 1 may be derived by setting a weight ratio applied to the first prediction sample and the second prediction sample as (7:1) or (1:7).

In an example, as in an example shown in FIG. 29 (a), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (3:1) or (1:3). Prediction samples that a sum of an x-axis coordinate and a y-axis coordinate is greater than a width or a height of a coding block by 1 or smaller than a width or a height of a coding block by 3 may be derived by setting a weight ratio applied to the first prediction sample and the second prediction sample as (7:1) or (1:7).

Alternatively, as in an example shown in FIG. 29 (b), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (7:1) or (1:7).

In another example, a weight may be determined by considering a position of a prediction sample or a shape of a coding block. Equation 7 to Equation 9 represent an example in which a weight is derived when a left triangular partition type is applied to a coding block. Equation 7 represents an example of deriving a weight applied to the first prediction sample when a coding block is square.

$$w1=(x-y+4)/8 \qquad \text{[Equation 7]}$$

In Equation 7, x and y represent a position of a prediction sample. When a coding block is non-square, a weight applied to a first prediction sample may be derived as in the following Equation 8 or Equation 9. Equation 8 represents that a width of a coding block is greater than a height and Equation 9 represents that a width of a coding block is smaller than a height.

$$w1=((x/whRatio)-y+4)/8 \qquad \text{[Equation 8]}$$

$$w1=(x-(y*whRatio)+4)/8 \qquad \text{[Equation 9]}$$

When a right triangular partition type is applied to a coding block, a weight applied to a first prediction sample may be determined as in Equation 10 to Equation 12. Equation 10 represents an example in which a weight applied to a first prediction sample is derived when a coding block is square.

$$w1=(CbW-1-x-y)+4)/8 \qquad \text{[Equation 10]}$$

In Equation 10, CbW represents a width of a coding block. When a coding block is non-square, a weight applied to a first prediction sample may be derived as in the following Equation 11 or Equation 12. Equation 11 represents that a width of a coding block is greater than a height and Equation 12 represents that a width of a coding block is smaller than a height.

$$w1=(CbH-1-(x/whRatio)-y)+4)/8 \qquad \text{[Equation 11]}$$

$$w1=(CbW-1-x-(y*whRatio)+4)/8 \qquad \text{[Equation 12]}$$

In Equation 11, CbH represents a height of a coding block.

When diagonal partitioning is applied to a coding block, a combined prediction mode that an intra prediction mode and a merge mode are combined may be set not to be applied to a coding block.

When encoding/decoding of a coding block is completed, the motion information of a coding block that encoding/decoding is completed may be stored for the encoding/decoding of a subsequent coding block. Motion information may be stored in a unit of a sub-block with a preset size. In an example, a sub-block with a preset size may have a 4×4 size. Alternatively, according to a size or a shape of a coding block, a size or a shape of a sub-block may be differently determined.

When a sub-block belongs to the first prediction unit, the motion information of the first prediction unit may be stored as the motion information of a sub-block. On the other hand, when a sub-block belongs to the second prediction unit, the motion information of the second prediction unit may be stored as the motion information of a sub-block.

When a sub-block is on the boundary of the first prediction unit and the second prediction unit, any one of the motion information of the first prediction unit and the motion information of the second prediction unit may be set as the motion information of a sub-block. In an example, the motion information of the first prediction unit may be set as the motion information of a sub-block or the motion information of the second prediction unit may be set as the motion information of a sub-block.

In another example, when a sub-block is on the boundary of the first prediction unit and the second prediction unit, any one of L0 motion information and L1 motion information of a sub-block may be derived from the first prediction unit and the other of L0 motion information and L1 motion information of a sub-block may be derived from the second prediction unit. In an example, the L0 motion information of the first prediction unit may be set as the L0 motion information of a sub-block and the L1 motion information of the second prediction unit may be set as the L1 motion information of a sub-block. But, when the first prediction unit and the second prediction unit have only L0 motion information or only L1 motion information, the motion information of a sub-block may be determined by selecting any one of the first prediction unit or the second prediction unit. Alternatively, a motion vector average value of the first prediction unit and the second prediction unit may be set as a motion vector of a sub-block.

The motion information of a coding block that encoding/decoding is completed may be updated in a motion information table. In this case, the motion information of a coding block to which prediction unit partitioning is applied may be set not to be added to a motion information table.

Alternatively, only the motion information of any one of a plurality of prediction units generated by partitioning a coding block may be added to a motion information table. In an example, while the motion information of the first prediction unit may be added to a motion information table, the motion information of the second prediction unit may not be added to a motion information table. In this case, a prediction unit which will be added to a motion information table may be selected based on at least one of a size of a coding block, a shape of a coding block, a size of a prediction unit, a shape of a prediction unit or whether a bidirectional prediction is performed for a prediction unit.

Alternatively, the motion information of each of a plurality of prediction units generated by partitioning a coding block may be added to a motion information table. In this case, the adding order for a motion information table may be predefined in an encoding device and a decoding device. In an example, the motion information of a prediction unit including a top-left sample or a bottom-left corner sample may be added to a motion information table before the motion information of the other prediction unit. Alternatively, the adding order for a motion information table may be determined based on at least one of a merge index or a reference picture index of each prediction unit or a magnitude of a motion vector.

Alternatively, motion information combining the motion information of the first prediction unit and the motion information of the second prediction unit may be added to a motion information table. Any one of L0 motion information and L1 motion information of combined motion information may be derived from the first prediction unit and the other of L0 motion information and L1 motion information may be derived from the second prediction unit.

Alternatively, based on whether a reference picture of the first prediction unit is the same as a reference picture of the second prediction unit, motion information which will be added to a motion information table may be determined. In an example, when a reference picture of the first prediction unit is different from a reference picture of the second prediction unit, the motion information of any one of the first prediction unit and the second prediction unit or motion information combining the first prediction unit and the second prediction unit may be added to a motion information table. On the other hand, when a reference picture of the first prediction unit is the same as a reference picture of the second prediction unit, an average of a motion vector of the first prediction unit and a motion vector of the second prediction unit may be added to a motion information table.

Alternatively, based on a size of a coding block, a shape of a coding block or a partitioning shape of a coding block, a motion vector which will be added to a motion information table may be determined. In an example, when right triangular partitioning is applied to a coding block, the motion information of the first prediction unit may be added to a motion information table. On the other hand, when left triangular partitioning is applied to a coding block, the motion information of the second prediction unit may be added to a motion information table or motion information combining the motion information of the first prediction unit and the motion information of the second prediction unit may be added to a motion information table.

A motion information table for storing the motion information of a coding block to which prediction unit partitioning is applied may be separately defined. In an example, the motion information of a coding block to which prediction unit partitioning is applied may be stored in a partitioning mode motion information table. A partitioning mode motion information table may be referred to as a triangular motion information table. In other words, the motion information of a coding block to which prediction unit partitioning is not applied may be stored in a general motion information table and the motion information of a coding block to which prediction unit partitioning is applied may be stored in a partitioning mode motion information table. Embodiments that motion information of a coding block to which prediction unit partitioning described above is applied is added to a motion information table may be applied for updating a partitioning mode motion information table. In an example, the motion information of the first prediction unit, the motion information of the second prediction unit, motion information combining the motion information of the first prediction unit and the motion information of the second prediction unit and motion information averaging a motion vector of the first prediction unit and a motion vector of the second prediction unit may be added to a partitioning mode motion information table.

When prediction mode partitioning is not applied to a coding block, a merge candidate may be derived by using a general motion information table. On the other hand, when prediction mode partitioning is applied to a coding block, a merge candidate may be derived by using a partitioning mode motion information table.

When a bidirectional motion vector is applied to a current block, a motion vector for a current block may be derived and a refine motion vector may be derived per sub-block based on a derived motion vector. When a refine motion vector is derived, a refine prediction sample may be obtained by using a refine motion vector.

A prediction sample in a current block may be derived based on an L0 prediction sample, an L1 prediction sample and a refine prediction sample. Equation 13 represents an example in which a prediction sample in a current block is derived.

$$\mathrm{pred}_{BDOF} = (I^{(o)}(x,y) + I^{(l)}(x,y) + b(x,y) + \mathrm{Offset}) >> \mathrm{shift} \quad \text{[Equation 13]}$$

In the Equation 13, $\mathrm{pred}_{BDOF}$ represents a prediction sample at a position of (x,y) in a current block. $I^{(0)}$ (x,y) represents an L0 prediction sample at a position of (x,y) and $I^{(1)}$ (x,y) represents an L1 prediction sample at a position of (x,y). b(x,y) represents a refine prediction sample at a position of (x,y). A refine prediction sample may be derived based on a refine motion vector. An offset may be set as a fixed value or may be derived based on a bit depth of a current picture or a size/a shape of a block. A shifting parameter, shift, may be set as a fixed value or may be derived based on a bit depth of a current picture or a size/a shape of a block.

A refine prediction sample may be derived by applying a bidirectional optical flow to a current block. In an example, Equation 14 represents an example in which a refine prediction sample for a position of (x,y) in a current block is derived.

$$b(x, y) = v_x \left( \frac{\partial^{(1)}(x, y)}{\partial y} - \frac{\partial^{(0)}(x, y)}{\partial y} \right) \Big/ 2 + \quad \text{[Equation 14]}$$

$$v_y \left( \frac{\partial^{(1)}(x, y)}{\partial y} - \frac{\partial^{(0)}(x, y)}{\partial y} \right) \Big/ 2$$

In the Equation 14, $(v_x, v_y)$ represents a refine motion vector.

$$\frac{\partial^{(1)}(x, y)}{\partial y}$$

represents an L1 gradient in a horizontal direction and $$\frac{\partial^{(0)}(x, y)}{\partial y}$$

represents an L0 gradient in a horizontal direction.

$$\frac{\partial^{(1)}(x, y)}{\partial y}$$

represents an L1 gradient in a vertical direction and $$\frac{\partial^{(0)}(x, y)}{\partial y}$$

represents an L0 gradient in a vertical direction.

A refine motion vector may be derived based on a horizontal directional gradient and a vertical directional gradient. Concretely, a refine motion vector may be derived based on an auto-correlation value derived based on a horizontal directional gradient and a vertical directional gradient. In an example, Equation 15 represents an example in which a refine motion vector is derived.

$$v_x = S_1 > 0 ? -S_3 \cdot 2^{nb-na} >> \lfloor \log_2 S_1 \rfloor : 0$$

$$v_y = S_5 > 0 ? -S_6 \cdot 2^{nb-na} - ((V_x S_{2,m} << n_{s2} + v_x S_{2,s})/2) >> \lfloor \log_2 S_5 \rfloor : 0 \quad \text{[Equation 15]}$$

In the Equation 15, S1 to S6 represents an auto-correlation value.

A refine motion vector may be determined in a unit of a sub-block. In other words, samples in a sub-block may share one refine motion vector. Accordingly, a refine prediction sample of each samples in a sub-block may be derived based on a gradient for each sample and a refine motion vector determined at a level of a sub-block.

A size and/or shape of a sub-block may be predefined in an encoding device and a decoding device. Alternatively, a size and/or a shape of a sub-block may be adaptively determined according to a size and/or a shape of a current block.

Equation 16 and Equation 17 respectively represent an example in which a horizontal directional gradient and a vertical directional gradient are derived.

$$\frac{\partial I^{(k)}}{\partial x}(i, j) = (I^{(k)}(i+1, j) - I^{(k)}(i-1, j)) \gg \text{shift1} \quad \text{[Equation 16]}$$

$$\frac{\partial I^{(k)}}{\partial y}(i, j) = (I^{(k)}(i, j+1) - I^{(k)}(i, j-1)) \gg \text{shift1} \quad \text{[Equation 17]}$$

In the Equation 16 and Equation 17, k indicates 0 or 1. When k is 0, it represents an L0 direction and when k is 1, it represents an L1 direction.

A horizontal directional gradient may be derived by a difference between neighboring samples adjacent to a prediction sample at a position of (i,j). Concretely, a horizontal directional gradient may be derived based on a difference between $I^{(k)}$ (i+1,j), a prediction sample adjacent to the right of a position of (i,j), and $I^{(k)}$ (i−1,j), a prediction sample adjacent to the left of a position of (i,j).

A vertical directional gradient may be derived by a difference between neighboring samples adjacent to a prediction sample at a position of (i,j). Concretely, a vertical directional gradient may be derived based on a difference between $I^{(k)}$ (i,j+1), a prediction sample adjacent to the top of a position of (i,j), and $I^{(k)}$ (i,j−1), a prediction sample adjacent to the bottom of a position of (i,j).

In Equation 16 and Equation 17, it was shown that a gradient is derived by a difference between two samples, but a gradient may be derived by using more samples. In an example, a horizontal directional gradient may be derived based on N samples at a left position of a prediction sample and N samples at a right position and a vertical directional gradient may be derived based on N samples at a top position of a prediction sample and N samples at a bottom position. In this case, N may be a real number such as 1, 2, 3, or 4. The number of samples used to derive a gradient may be differently determined according to a size/a shape of a current block.

A shifting parameter, shift1, may be set as a fixed value or may be derived based on a bit depth of a current picture or a size/a shape of a block.

An auto-correlation value shown in Equation 15 may be derived as in the following Equation 18.

$$S_1 = \sum_{(i,j) \in \Omega} \psi_x(i, j) \cdot \psi_x(i, j) \quad \text{[Equation 18]}$$

$$S_2 = \sum_{(i,j) \in \Omega} \psi_x(i, j) \cdot \psi_y(i, j)$$

$$S_3 = \sum_{(i,j) \in \Omega} \theta(i, j) \cdot \psi_x(i, j)$$

$$S_5 = \sum_{(i,j) \in \Omega} \psi_y(i, j) \cdot \psi_y(i, j)$$

$$S_6 = \sum_{(i,j) \in \Omega} \theta(i, j) \cdot \psi_y(i, j)$$

A parameter shown in the Equation 18 may be derived as in the following Equation 19.

$$\psi_x(i, j) = \left(\frac{\partial I^{(1)}}{\partial x}(x, y) + \frac{\partial I^{(0)}}{\partial x}(x, y)\right) \gg 5 \quad \text{[Equation 19]}$$

$$\psi_y(i, j) = \left(\frac{\partial I^{(1)}}{\partial y}(x, y) + \frac{\partial I^{(0)}}{\partial y}(x, y)\right) \gg 5$$

As in the above-described example, based on a refine prediction sample derived by a refine motion vector, deriving a prediction sample may be referred to as a bidirectional optical flow (BDOF) encoding method.

Whether a BDOF encoding method is used or not may be determined based on at least one of a size/a shape of a current block, an output order/type of an L0 reference picture, an output order/type of an L1 reference picture, whether motion compensation in a unit of a sub-block (e.g., ATMVP or STMVP) is performed, whether an affine motion model is applied, whether a symmetric MVD is applied, whether bidirectional weights (e.g., an L0 weight and an L1 weight) are the same, or whether prediction mode with partitioning is applied.

In an example, whether a BDOF encoding method is used may be determined by considering whether a difference between a current picture and an L0 reference picture is the same as a difference between a current picture and an L1 reference picture or a temporal direction of an L0 reference picture and an L1 reference picture. In an example, a BDOF encoding method may be allowed only when a difference between a current picture and an L0 reference picture is the same as a difference between a current picture and an L1 reference picture, or when a temporal direction of an L0 reference picture is different from a temporal direction of an L1 reference picture. In this case, a temporal direction represents whether a reference picture is in a forward direction or in a backward direction. A forward reference picture indicates a reference picture that POC is greater than a current picture and a backward reference picture indicates a reference picture that POC is smaller than a current picture.

Alternatively, when an affine motion model is applied to a current block, a BDOF encoding method may be set to be unallowable.

Alternatively, only when a value of a flag, regular_merge_flag, representing whether a general merge mode is applied to a current block or not, is 1, a BDOF encoding method can be applied. When a value of a flag, regular_merge_flag, is 1, it represents that an encoding method such as motion compensation in a unit of a sub-block, prediction mode partitioning or CIIP, etc. is not applied to a current block.

Alternatively, only when motion compensation in a unit of a sub-block (e.g., ATMVP or STMVP) is not applied to a current block, a BDOF encoding method can be applied.

Alternatively, only when a symmetric MVD encoding method is not applied to a current block, a BDOF encoding method can be applied.

Alternatively, only when an L0 weight is the same as an L1 weight, a BDOF encoding method can be applied.

Alternatively, only when both an L0 reference picture and an L1 reference picture are short-term reference pictures, a BDOF encoding method can be applied.

Alternatively, only when at least one of a width, a height or a size of a current block is equal to or greater than a threshold value, it may be allowed. A size of a current block represents a value derived by multiplication of a width and a height. In an example, a value taking $Log_2$ to multiplication of a width and a height may be set as a size value of a current block. Alternatively, the number of samples included in a current block may be set as a size value of a current block. A threshold value may be an integer such as 4, 8, 16, or 32, etc.

Alternatively, a BDOF encoding method may be set to be unallowable for a block to which prediction mode with partitioning is applied. In an example, when a current block is partitioned into two triangular prediction units, it may be set no to apply a BDOF encoding method.

Alternatively, when a prediction method that intra prediction and inter prediction are combined (Combined Intra Inter Prediction, CIIP) is applied, a BDOF encoding method may be set to be unallowable. In other words, when a prediction method that intra prediction and inter prediction are combined (Combined Intra Inter Prediction, CIIP) is not applied, a BDOF encoding method may be set to be allowable.

Alternatively, whether a BDOF encoding method is allowed may be determined by combining a plurality of the above-enumerated conditions.

An intra block copy (IBC) is to predict a current block from a region which is reconstructed before a current block in a current picture. Concretely, a prediction sample of a current block may be obtained by using a reference block in a pre-reconstructed region in a current picture.

Information representing whether an intra block copy mode is used or not may be signaled in a bitstream. In an example, a flag, pred_mode_ibc_flag, representing whether an intra block copy mode is applied to a current block or not may be signaled in a bitstream.

The flag may be signaled when information representing an encoding mode of a current block indicates inter prediction. In an example, when a value of pred_mode_ibc_flag is 0, it represents that prediction for a current block is performed by using a pre-decoded picture different from a current picture as a reference picture. On the other hand, when a value of pred_mode_ibc_flag is 1, it represents that prediction for a current block is performed by using a current picture as a reference picture.

Alternatively, when signaling of a flag, pred_mode_ibc_flag, is omitted, whether an intra block copy mode is used or not may be determined based on at least one of a size or a shape of a current block, an encoding mode or a slice type. In an example, when a size of a current block is 4×4 or when an encoding mode of a current block is an intra mode, whether an IBC mode is applied or not may be determined based on whether a skip mode is applied to a current block. Concretely, when a size of a current block is 4×4 or when an encoding mode of a current block is an intra mode, a current block may be predicted by replacing a skip mode with an IBC mode. In other words, when a size of a current block is 4×4 or when an encoding mode of a current block is an intra mode, a reconstructed block for a current block may be derived by using a current picture as a reference picture. A flag, cu_skip_flag, representing whether a skip mode is applied or not may be signaled in a bitstream. When a skip mode is applied, a prediction sample of a current block may be set as a reconstructed sample.

When a size of a current block is greater than a threshold value, an IBC mode may be set to be unavailable. The threshold value may be 64×64 or 128×128. Alternatively, whether an intra block copy mode is used or not may be determined according to a size of a current picture, a temporal ID or a color component.

FIG. 30 is a diagram for explaining a prediction aspect based on an intra block copy mode.

A coordinate difference between a current block and a reference block may be defined as a motion vector. In particular, a motion vector under an intra block mode may be referred to as a block vector (BV). For example, dX, a difference between an x-coordinate of a top-left sample of a current block and an x-coordinate of a top-left sample of a reference block, may be defined as a block vector in a horizontal direction (or an x-axis block vector) and a difference between a y-coordinate of a top-left sample of a current block and a y-coordinate of a top-left sample of a reference block may be defined as a block vector in a vertical direction (or a y-axis block vector).

Hereinafter, an intra block copy mode will be described in detail by referring to a drawing.

FIG. 31 is a flow chart representing a prediction process of a current block based on an intra block copy mode according to an embodiment of the present disclosure.

First, a block vector for a current block may be derived (S3101). A block vector of a current block may be derived based on neighboring blocks adjacent to a current block. Concretely, a block vector of a current block may be derived by setting a block vector of a neighboring block to be the same as that of a current block, or adding a difference vector to a block vector of a neighboring block.

Derivation Methods of a motion vector defined under an inter prediction mode may also be applied to derive a block vector under an intra block copy mode. In an example, a block vector of a neighboring block may be set as a block vector of a current block by applying a merge mode to a current block. Alternatively, a block vector of a current block may be derived by adding a difference vector to a block vector of a neighboring block by applying a motion vector prediction mode to a current block.

For convenience of description, 'IBC' is prefixed to elements which are used to derive a block vector under an intra block copy mode. In an example, a merge mode and a motion vector prediction mode under an intra block copy mode are referred to as an IBC merge mode and an IBC motion vector prediction mode, respectively. Unless otherwise described, embodiments for the inter prediction mode may be also applied to an intra block copy mode. In an example, a method of deriving a merge candidate and a method of updating a motion information table under an inter prediction mode may be applied for deriving an IBC merge candidate and updating an IBC motion information table.

In addition, when it is needed to classify an inter prediction mode and an intra block copy mode, 'general' is prefixed to elements which are used to derive a motion vector under an inter prediction mode.

Information representing whether an IBC merge mode is applied to a current block may be signaled in a bitstream. In an example, a flag, IBC_merge_flag, may be signaled in a bitstream. When a value of IBC_merge_flag is 1, it represents that an IBC merge mode is applied to a current block and when a value of IBC_merge_flag is 0, it represents that an IBC merge mode is not applied to a current block. IBC_merge_flag may be signaled when the number of available IBC merge candidates is at least one or more.

When a value of IBC_merge_flag is 0, an IBC motion vector prediction mode may be applied to a current block.

Under a merge mode, a block vector of a current block may be derived from at least one of neighboring blocks adjacent to a current block. In this case, neighboring blocks may include at least one of a top neighboring block adjacent to a top of a current block, a left neighboring block adjacent to a left of a current block, a bottom-left neighboring block adjacent to a bottom-left corner of a current block, a top-right neighboring block adjacent to a top-right corner of a current block or a top-left neighboring block adjacent to a top-left corner of a current block.

Concretely, a block vector of a current block may be derived from a neighboring block encoded by an intra block copy mode among neighboring blocks adjacent to a current block. A block vector of an available neighboring block which is searched firstly among neighboring blocks adjacent to a current block may be derived as a block vector of a current block.

Alternatively, IBC merge candidates may be derived from neighboring blocks encoded by an intra block copy mode around a current block and a block vector of a current block may be derived from one of IBC merge candidates. It is also possible to derive an IBC merge candidate by using a collocated block of a current block. It is also possible to derive an IBC merge candidate by using blocks non-adjacent to a current block.

IBC merge candidates may be added to an IBC merge candidate list according to a predefined order.

FIG. 32 is a diagram illustrating an order that IBC merge candidates are added to an IBC merge candidate list.

When a coordinate of a top-left sample of a current block is (0,0), a block A1 may mean a block including a base sample at a position of (−1, H−1), a block B1 may mean a block including a base sample at a position of (W−1, −1), a block B0 may mean a block including a base sample at a position of (W, −1), a block A0 may mean a block including a base sample at a position of (−1, H) an a block B2 may mean a block including a base sample at a position of (−1, −1). According to an order of A1, B1, B0, A0 and B2, IBC merge candidates may be added to an IBC merge candidate list.

Alternatively, according to an order different from what is shown, an IBC merge candidate list may be configured. In an example, an IBC merge candidate list may be configured according to an order of B1, B0, A1, A0 and B2 or according to an order of B1, A1, B0, A1 and B2.

Alternatively, an IBC merge candidate may be derived by using only one of candidate blocks at a top position of a current block and one of candidate blocks at a left position of a current block. In an example, an IBC merge candidate may be derived by using only A1 and B1 blocks.

Alternatively, according to a size or a shape of a current block, the number or a position of neighboring blocks used to derive an IBC merge candidate may be differently set. In an example, the number of available neighboring blocks may be 0, 1, 2, 3, 4 or 5 according to a size of a current block.

When an IBC merge candidate list includes a plurality of IBC merge candidates, index information for specifying one of a plurality of IBC merge candidates may be signaled in a bitstream. In an example, a block vector of a current block may be derived from an IBC merge candidate specified by a syntax element, IBC_merge_idx.

A block encoded by inter prediction may be set to be unavailable as an IBC merge candidate. Alternatively, an IBC merge candidate may be derived from a block encoded by inter prediction. In this case, a block vector of an IBC merge candidate may be derived by scaling a motion vector of a block encoded by inter prediction. The scaling may be performed based on a difference between an output order (e.g., POC) of a current picture and an output order of a reference picture of the block encoded by inter prediction.

A block vector of a chroma (chrominance) component may be derived by scaling a block vector of a luma (Luminance) component. Scaling may be performed by performing bit shifting for a block vector of a luma component to the right by a shifting variable. The shifting variable may be determined according to a chroma format.

The maximum number of IBC merge candidates which may be included by an IBC merge candidate list may be predefined in an encoding device and a decoding device. In an example, the maximum number of merge candidates which may be included by an IBC merge candidate list may be set to be 4, 5, or 6.

Alternatively, the maximum number of IBC merge candidates which may be included by an IBC merge candidate list may be set the same as the maximum number of merge candidates which may be included by a general merge candidate list. In an example, a syntax element, six_minus_max_num_merge_cand, representing the maximum number of merge candidates which may be included by a general merge candidate list may be signaled in a bitstream. The maximum number of merge candidates which may be included by a general merge candidate list and the maximum number of IBC merge candidates which may be included by an IBC merge candidate list may be derived by subtracting a value indicated by six_minus_max_num_merge_cand from 6.

Alternatively, a syntax element representing the maximum number of IBC merge candidates which may be included by an IBC merge candidate list and a syntax element representing the maximum number of merge candidates which may be included by a general merge candidate list may be individually defined. In an example, the maximum number of IBC merge candidates which may be included by an IBC merge candidate list may be determined by a syntax element, six_minus_max_IBC_num_merge_cand, and the maximum number of merge candidates which may be included by a general merge candidate list may be determined by a syntax element, six_minus_max_num_merge_cand.

Alternatively, when information representing the maximum number of IBC merge candidates is not signaled, the maximum number of IBC merge candidates may be set as a predefined value.

When the number of IBC merge candidates derived from at least one neighboring block is smaller than a threshold value, an IBC motion information candidate included in an IBC motion information table may be added to an IBC merge candidate list as an IBC merge candidate. In this case, a threshold value may be a value subtracting an offset from the maximum number of IBC merge candidates which may be included by an IBC merge candidate list or the maximum number of IBC merge candidates. An offset may be a natural number such as 1 or 2, etc.

Alternatively, information representing whether it is allowed to configure an IBC merge candidate list by using an IBC motion information table may be signaled in a bitstream. In an example, a syntax, isUsedHibcCandList_flag, represents whether an IBC motion information table may be referred to when an IBC merge candidate list is generated. The flag may be signaled at a level of a sequence, a picture, a slice or a block.

FIG. 33 is a diagram showing an example in which an IBC motion information candidate is added to an IBC merge candidate list.

In a shown example, IBCMergeCandList[i] represents an IBC merge candidate whose index is i and HIbcCandList[j] represents an IBC motion information candidate whose index is j.

When the number of IBC merge candidates included by an IBC merge candidate list is smaller than a threshold value, an IBC motion information candidate included by an IBC motion information table may be added to an IBC merge candidate list. In an example, when it is assumed that a threshold value is 5, the number of IBC merge candidates included by an IBC merge candidate list is 2 in FIG. 33 (a), so the number of IBC merge candidates is smaller than a threshold value.

Accordingly, IBC motion information candidates included by an IBC motion information table may be added to an IBC merge candidate list as an IBC merge candidate. In an example, it was shown in FIG. 33 (b) that 3 IBC motion information candidates are added to an IBC merge candidate list.

When there is an IBC merge candidate having the same block vector as an IBC motion information candidate, the corresponding IBC motion information candidate may not be added to an IBC merge candidate list. A target for a redundance check is the same as an example described through a redundance check method between a general motion information candidate and a general merge candidate.

When the number of IBC merge candidates included by an IBC merge candidate list is smaller than a threshold value although an IBC motion information candidate is added to an IBC merge candidate list, an IBC merge candidate may be derived from a general merge candidate or a general motion information candidate. Concretely, a block vector may be derived based on a motion vector of a general merge candidate or a motion vector of a general motion information candidate and an IBC merge candidate having the derived block vector as motion information may be added to an IBC merge candidate list. A block vector may be derived by scaling a motion vector. Scaling may be performed based on an output order difference between a reference picture of a general merge candidate or a general motion information candidate, and a current picture. When general motion information has a bidirectional motion vector, one of L0 motion information or L1 motion information may be randomly selected or one with a smaller output order difference with a current picture among L0 motion information and L1 motion information may be selected.

Alternatively, when the number of IBC merge candidates included by an IBC merge candidate list is smaller than a threshold value although an IBC motion information candidate is added to an IBC merge candidate list, a zero block vector may be added to an IBC merge candidate list. A zero block vector means a block vector that a horizontal direction component and a vertical directional component are 0.

An IBC motion information table includes an IBC motion information candidate derived from blocks encoded/decoded by an intra block copy mode. In an example, motion information of an IBC motion information candidate included in an IBC motion information table may be set the same as motion information of a block encoded/decoded based on an intra block copy mode. In this case, motion information may include at least one of a block vector, a motion vector resolution or whether an IBC merge mode is applied or not(e.g., a value of IBC_merge_flag)

FIG. 34 is a diagram for explaining an update aspect of an IBC motion information table.

An IBC motion information candidate may be derived from a block encoded/decoded by an intra block copy mode or an IBC merge mode and a derived IBC motion information candidate may be added to an IBC motion information table, HIbcCandList. In an example, a block vector may be added to an IBC motion information table according to an encoding/decoding order of blocks.

When the number of IBC motion information candidates included by an IBC motion information table is smaller than the maximum number, a block vector of an encoded/decoded block may be added to an IBC motion information table as a new IBC motion information candidate. On the other hand, when the number of IBC motion information candidates included by an IBC motion information table is the maximum number, one of IBC motion information candidates included by an IBC motion information table may be deleted and a block vector of an encoded/decoded block may be added to an IBC motion information table. In an example, as shown in FIG. 34, when a block vector of a block B4 is added to an IBC motion information table, an IBC motion information candidate with the lowest index may be removed from an IBC motion information table.

The maximum number of IBC motion information candidates which may be included by an IBC motion information table may be predefined in an encoding device and a decoding device. In an example, the maximum number of IBC motion information candidates which may be included by an IBC motion information table may be set as 1, 2, 3, 4, 5, or 6, etc.

Alternatively, information representing the maximum number of IBC motion information candidates which may be included by an IBC motion information table may be signaled in a bitstream. The information may represent the maximum number of IBC motion information candidates which may be included by an IBC motion information table or a difference between the maximum number of IBC motion information candidates which may be included by an IBC motion information table and the maximum number of general motion information candidates which may be included by a general motion information table. The information may be signaled at a level of a picture, a slice or a sequence.

When a current block is encoded/decoded, a block vector of a current block may be added to an IBC motion information table. In this case, when the same IBC motion information candidate as a block vector of a current block pre-exists, a block vector of a current block may not be added to an IBC motion information table.

Alternatively, when the same IBC motion information candidate as a block vector of a current block exists, the same IBC motion information candidate as a block vector of a current block may be omitted and a block vector of a current block may be added to an IBC motion information table. It causes the same effect as updating an index of the same IBC motion information candidate as a block vector of a current block.

When a size of a current block is smaller than a threshold value, a block vector of a current block may not be added to an IBC motion information table. A threshold value may represent at least one of a width, a height or the number of samples. In an example, when the number of samples included by a current block is equal to or less than 16, an IBC motion information candidate derived from a current block may not be added to an IBC motion information table.

Although an intra block copy mode is applied to a current block, an embodiment related to a merge processing region may be applied. In other words, when a neighboring block adjacent to a current block is included in the same merge processing region as a current block, a block vector of the neighboring block may be set to be unavailable as an IBC merge candidate of a current block.

A size and a shape of a merge processing region for an intra block copy mode may be set the same as a size and a shape of a merge processing region for an inter prediction mode.

Alternatively, information for determining a size and/or a shape of a merge processing region for an intra block copy mode may be signaled in a bitstream. In an example, information representing a difference between a size of a merge processing region for an inter prediction mode and a size of a merge processing region for an intra block copy mode may be signaled in a bitstream.

When a current block is included in a merge processing region, a block vector of an encoded/decoded block may not be added to an IBC motion information table although a block included in a merge processing region is encoded/decoded.

Alternatively, an IBC motion information table may be updated by using only a block at a predefined position in a merge processing region. A predefined position may include at least one of a block at a top-left position, a block at a top-right position, a block at a bottom-left position, a block at a bottom-right position, a block at a central position, a block adjacent to a right boundary or a block adjacent to a lower boundary in a merge processing region.

An IBC motion information table may be initialized per preset unit. The preset unit may be a coding tree unit, a plurality of coding tree units, a tile or a slice. In an example, an IBC motion information table may be initialized per N coding tree unit(s) or one coding tree unit row. In this case, N may be a natural number including 1.

When an IBC motion information table is initialized per coding tree unit row, it represents that an IBC motion information table is initialized whenever encoding/decoding of a coding tree unit adjoining a left boundary of a picture starts.

When an IBC motion information table is empty or when an IBC motion information table is initialized, an initial IBC motion information candidate may be added to an IBC motion information table. The initial IBC motion information candidate may have a predefined block vector in an encoding device and a decoding device.

Alternatively, an initial IBC motion information candidate may be derived from a block encoded/decoded by an intra block copy mode in a coding tree unit adjacent to a current coding tree unit. In an example, an initial IBC motion information candidate may be derived from a block included in a coding tree unit neighboring a left or a top of a current coding tree unit.

A block vector of a current block may be derived by combining a block vector prediction value and a block vector difference value under an IBC motion vector prediction mode. A block vector prediction value may be derived from neighboring blocks adjacent to a current block. In an example, a first block vector prediction candidate may be derived from a block at a top position of a current block and a second block vector prediction candidate may be derived from a block at a left position of a current block.

When a plurality of block vector prediction candidates are available, information specifying at least one of a plurality of block vector prediction candidates may be signaled in a bitstream. In an example, a flag, IBC_mvp_flag, specifying one of two block vector prediction candidates may be signaled in a bitstream.

A block vector difference value may be determined based on information signaled in a bitstream. The information may include information for determining a size of a block vector and information for determining a direction of a block vector.

In an example, a block vector of a current block may be derived as in the following Equation 20.

$$BV[0]=BVp[0]+BVd[0]$$

$$BV[1]=BVp[1]+BVd[1] \quad \text{[Equation 20]}$$

BV represents a block vector of a current block, BVp represents a block vector prediction value and BVd represents a block vector difference value. [0] represents a vector component in a horizontal direction (i.e., an x-axis vector component) and [1] represents a vector component in a vertical direction (i.e., a y-axis vector component).

A reference block may be specified by a block vector (S2802) and samples in a reference block specified by a block vector may be set as prediction samples of a current block (S2803).

Search of a reference block may be performed in a predetermined region. Accordingly, the maximum value of a block vector of a current block may be determined as a difference between a boundary of a current block and a boundary of a predetermined region. In an example, the maximum value of a block vector in a horizontal direction may be set as a difference value between a left boundary of a current block and a left boundary of a predetermined region and the maximum value of a block vector in a vertical direction may be set as a difference value between a top boundary of a current block and a top boundary of a predetermined region.

Under an IBC merge mode, when the maximum value of a block vector of an IBC merge candidate is greater than the maximum value of a block vector of a current block, an IBC merge candidate may be set to be unavailable. Alternatively, when the maximum value of a block vector of an IBC merge candidate is greater than a block vector of a current block, a block vector of an IBC merge candidate may be changed into the maximum value of a block vector of a current block.

A predetermined region may include at least one of a coding tree unit in which a current block is included, a neighboring coding tree unit adjacent to a current coding tree unit, a current slice in which a current block is included or a current tile in which a current block is included.

In an example, a reference block may be searched from a current coding tree unit and a neighboring coding tree unit. In other words, a block which is not included in a current coding tree unit or a neighboring coding tree unit can not be set as a reference block. In this case, a neighboring coding tree unit may include at least one of a left coding tree unit adjacent to the left of a current coding tree unit, a top coding tree unit adjacent to the top, a top-left coding tree unit adjacent to a top-left corner, a top-right coding tree unit adjacent to a top-right corner or a bottom-left coding tree unit adjacent to a bottom-left corner.

Some regions of a neighboring coding tree unit may be set as an unavailable region. It may be set that a block included in an unavailable region cannot set as a reference block of a current block. An unavailable region may be determined based on a position of a current block in a current coding tree unit. Concretely, at least one of a size or the number of unavailable regions may be determined based on a position of a current block.

FIG. 35 is a diagram illustrating an unavailable region according to a position of a current block.

After a current coding tree unit and a neighboring coding tree unit are partitioned into a plurality of regions with the same size and shape, an unavailable region may be differently determined according to a region to which a current block in a current coding tree unit belongs. In FIG. 35, it was shown that a current coding tree unit and a neighboring coding tree unit are partitioned into 4 regions, but it is possible to partition coding tree units into more or less than that.

A decision of a region to which a current block belongs may be performed based on a position of a predetermined sample in a current block. A predetermined sample may include at least one of a top-left sample, a top-right sample, a bottom-left sample, a bottom-right sample or a central sample.

In an example, when a current block belongs to a top-left region in a current coding tree unit, a top-left region of a left coding tree unit may be set as an unavailable region.

When a current block belongs to a top-right region in a current coding tree unit, a top-left region and a top-right region of a left coding tree unit may be set as an unavailable region.

When a current block belongs to a bottom-left region in a current coding tree unit, a top-left region, a top-right region and a bottom-left region of a left coding tree unit may be set as an unavailable region.

When a current block belongs to a bottom-right region in a current coding tree unit, whole region of a left coding tree unit may be set as an unavailable region.

As in an example shown in FIG. 35, prediction for a current block may be performed by referring to at least one of three coding tree units which are encoded/decoded before a current coding tree unit. For it, a memory for storing information on three coding tree units should be reserved. In an example, when a size of a coding tree unit is 64×64, a 192×192 sized memory is necessary.

But, as in an example shown in FIG. 35, when a position of referenceable coding tree units varies according to a position of a current coding tree unit, a problem is caused that a process of determining a position of referenceable coding tree units per coding unit should be additionally performed.

To solve such a problem, a block encoded/decoded in a current picture may be stored in a predetermined-sized buffer after separately setting a predetermined-sized referenceable buffer under an intra block copy mode. The buffer may be referred to as an IBC reference buffer.

A size of an IBC reference buffer may be predefined in an encoding device and a decoding device. An IBC reference buffer may have a square shape whose width and height are the same. In an example, a size of an IBC reference buffer may be defined as a 128×128 or 256×256 size. Alternatively, an IBC reference buffer may have a non-square shape whose width and height are different. In an example, a size of an IBC reference buffer may be defined as a 96×128 or 192×256 size.

In another example, a size of an IBC reference buffer may be determined according to a size of a coding tree unit. In an example, an IBC reference buffer may be set as 256*N and N may be derived as a value dividing 128 or 64 by a size of a coding tree unit.

In another example, information representing a size of an IBC reference buffer may be signaled in a bitstream. The information may be signaled at a level of a sequence, a picture or a slice.

An IBC reference buffer includes reconstruction information of a block in which encoding/decoding is completed. Concretely, when a current block is encoded/decoded, reconstructed samples of a current block may be added to a buffer. In this case, a reconstructed sample may be one before or after an in-loop filter is applied.

A reconstructed sample may be stored in an IBC reference buffer according to a predetermined bit depth. In this case, a bit depth of an IBC reference buffer may be the same as or different from that of a current picture.

Information for determining a bit depth of an IBC reference buffer may be signaled in a bitstream. In an example, at least one of information representing whether a bit depth of an IBC reference buffer is the same as that of a current picture or information representing a bit depth of an IBC reference buffer may be signaled in a bitstream. Information representing a bit depth of an IBC reference buffer may also represent a difference between a bit depth of an IBC reference buffer and a bit depth of a current picture.

In another example, a bit depth of an IBC reference buffer may be predefined in an encoding device and a decoding device. In an example, a bit depth of an IBC reference buffer may be set as 7, 8, 9, or 10.

Alternatively, a bit depth of an IBC reference buffer may be determined based on at least one of a color component, a color format, a picture type or whether it is a HDR picture.

FIG. 36 is a diagram showing an example in which reconstruction information of a current block which is encoded/decoded is stored in an IBC reference buffer.

A storage position of a current block in an IBC reference buffer may be determined based on a position of a current block in a current picture. In this case, a position of a current block represents a position of a predefined sample in a current block. A predefined sample may include at least one of a top-left sample, a top-right sample, a bottom-left sample, a bottom-right sample or a central sample.

In an example, an x-axis storage position of a current block may be determined based on an x-axis position of a top-left sample of a current block in a current picture and a width of an IBC reference buffer and a y-axis storage position of a current block may be determined based on a y-axis position of a top-left sample of a current block in a current picture and a height of an IBC reference buffer.

Equation 21 represents an example in which a storage position of a reconstructed sample in a current block is determined.

$$IBC\_Buff[x\%M][y\%N]=RecCu[x][y] \qquad \text{[Equation 21]}$$

In the Equation 21, RecCU[x][y] represents a position of a (x,y) sample in a reconstructed current block. IBC_Buff [x][y] represents a position of a (x,y) sample in an IBC reference buffer and M and N represent a width and a height of an IBC reference buffer, respectively.

As a result, a storage position of a reconstructed current block may be determined as a coordinate having a value derived by a modular operation with M at an x-axis position and a value derived by a modular operation with N at a y-axis position.

When there is a pre-stored reconstructed sample at a storage position of a current reconstructed sample in an IBC reference buffer, a pre-stored reconstructed sample may be substituted with a current reconstructed sample.

When an IBC reference buffer is used, a block vector may represent a difference between a storage position of a current block in an IBC reference buffer and a position of a reference block. The maximum size of a block vector may be determined based on a storage position of a current block in a buffer. In an example, a horizontal directional component of a block vector may be determined as the maximum value of a difference between a storage position of a current block in a buffer and a left boundary of a buffer or a difference between a storage position of a current block in a buffer and a right boundary of a buffer. A vertical directional component of a block vector may be determined as a difference between a storage position of a current block in a buffer and a top boundary of a buffer.

As in the above-described example, a block vector of a current block may be derived from an IBC merge candidate or may be derived by combining a block vector prediction value and a block vector difference value.

In this case, a modified block vector difference value may be encoded/decoded based on a size of an IBC reference buffer to effectively encode/decode a block vector difference value.

FIG. 37 is a diagram for explaining an example which explains an encoding aspect of a block vector difference value.

A block vector prediction value may be subtracted from a block vector of a current block to derive BVd[0], a block vector difference value in a horizontal direction, and BVd[1], a block vector difference value in a vertical direction.

Based on a size of an ISP reference buffer, BVd'[0], a modified block vector difference value in a horizontal direction, and BVd'[1], a modified block vector difference value in a vertical direction, may be derived, and a target to be encoded may be selected by comparing a block vector difference value before modification with a block vector difference value after modification.

In an example, one with a smaller absolute value among BVd[0], a block vector difference value in a horizontal direction, and BVd'[0], a modified block vector difference value in a horizontal direction derived by adding a width M of an IBC reference buffer to the BVd[0], the block vector difference value in a horizontal direction, may be encoded as a block vector difference value in a horizontal direction. In addition, one with a smaller absolute value among BVd[1], a block vector difference value in a vertical direction, and BVd'[1], a modified block vector difference value in a vertical direction derived by adding a height N of an IBC reference buffer to the BVd[1], the block vector difference value in a vertical direction, may be encoded as a block vector difference value in a vertical direction.

In an example, in an example shown in FIG. 37, it is assumed that a storage position of a current block in an IBC reference buffer is (96, 94), a position of a reference block is (16, 64) and a block vector prediction value is (−10, 0). A block vector representing a difference between a storage position of a current block and a reference block may be derived as (−80, 0) and a block vector difference value representing a difference between a block vector and a block vector prediction value may be derived as (−70, 0).

A modified block vector difference value in a horizontal direction may be derived as 58 by adding 128, a width of an IBC buffer, to −70, a block vector difference value in a horizontal direction, and a modified block vector difference value in a vertical direction may be derived as 128 by adding 128, a height of an IBC buffer, to 0, a block vector difference value in a vertical direction. As an absolute value of a modified block vector difference value in a horizontal direction is smaller than a block vector difference value in a horizontal direction, a modified block vector difference value in a horizontal direction may be encoded as a block vector difference value. In addition, an absolute value of a modified block vector difference value in a vertical direction is greater than a block vector difference value in a vertical direction, a modified block vector in a vertical direction may be encoded as a modified block vector in a vertical direction as it is.

In other words, a block vector difference value set as (58, 0) may be encoded.

As one with a smaller absolute value among a block vector difference value and a modified block vector difference value is encoded, a size of a block vector difference value in a horizontal direction and a block vector difference value in a vertical direction may not exceed M/2 and N/2, respectively. Accordingly, the number of bits needed to encode a block vector difference value may be reduced.

In a decoding device, a reference block of a current block may be specified by using a size of an IBC reference buffer and a block vector. In this case, a block vector may be derived by combining a block vector prediction value and a block vector difference value.

Concretely, an x-axis position of a reference block may be specified by performing a modular operation which uses a value derived by adding an x-axis position of a current block and a block vector in a horizontal direction and a width M of an IBC reference buffer. In addition, a y-axis position of a reference block may be specified by performing a modular operation which uses a value derived by adding a y-axis position of a current block and a block vector in a vertical direction and a height N of an IBC reference buffer. Equation 22 represents an example in which a position of a reference block is determined based on a block vector.

$$RefX = x + (BVd[0] + BVp[0])\%M$$

$$RefY = y + (BVd[1] + BVp[1])\%N \qquad \text{[Equation 22]}$$

In Equation 22, (x, y) represents a position of a current block and (RefX, RefY) represents a position of a reference block. In an example, in an example shown in FIG. 37, a block vector of a current block may be derived as (48,0) by adding a block vector prediction value (−10,0) and a block vector difference value (58,0).

As a coordinate of a top-left sample of a current block is (96,46), a value adding a block vector to a coordinate of a top-left sample of a current block is derived as (144,46). An x-axis position of a reference block may be derived as 16(144% 128) and a y-axis position of a reference block may be derived as 46 (46% 128) by a modular operation which uses a width 128 and a height 128 of an IBC reference buffer.

As a result, when a value adding a block vector to a position of a top-left sample of a current block is out of a boundary of an IBC reference buffer, a reference block may be derived by applying a vector out of a boundary of an IBC reference buffer to an opposite boundary.

In the above-described example, it was described that a horizontal directional component of a block vector difference value is derived based on a width M of an IBC reference buffer and a vertical directional component of a block vector difference value is derived based on a height N of an IBC reference buffer.

Contrary to a described example, a horizontal directional component of a block vector difference value is derived based on a width M of an IBC reference buffer, but a vertical directional component of a block vector difference value may be derived based on a height of a coding tree unit or half of a height of an IBC reference buffer.

In an example, one with a smaller absolute value among a block vector difference value in a vertical direction and a value adding a height of a coding tree unit to a block vector difference value in a vertical direction may be encoded as a block vector difference value in a vertical direction. In a decoding device, a y-axis position of a reference block may be determined by performing a modular operation of a value derived by adding a block vector in a vertical direction to a y-axis position of a current block and a height of a coding tree unit.

An IBC motion information table may be initialized per preset unit. A preset unit may be a coding tree unit, a plurality of coding tree units, a tile or a slice. In an example, a buffer may be initialized per N coding tree unit(s) or one/a plurality of coding tree unit rows. In this case, N may be a natural number including 1.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra prediction is a method in which a prediction block for a current block is obtained based on a non-directional intra prediction mode or a directional intra prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is to decompose (or transform) a residual image into a two-dimensional frequency component by using cosine transform and DST is to compose (or transform) a residual image into a two-dimensional frequency component by using sine transform. As a result of transforming a residual image, frequency components may be represented as a base image. In an example, when DCT transform is performed for a N×N sized block, $N^2$ basic pattern components may be obtained. A size of each of basic pattern components included in a N×N sized block may be obtained through transform. According to a used transform method, a size of a basic pattern component may be referred to as a DCT coefficient or a DST coefficient.

A transform method DCT is mainly used to transform an image that a lot of non-zero low frequency components are distributed. A transform method DST is mainly used for an image that a lot of high frequency components are distributed.

It is also possible to transform a residual image by using a transform method other than DCT or DST.

Hereinafter, transforming a residual image into two-dimensional frequency components is referred to as two-dimensional image transform. In addition, a size of basic pattern components obtained by transform is referred to as a transform coefficient. In an example, a transform coefficient may mean a DCT coefficient or a DST coefficient. When both the after-described first transform and second transform are applied, a transform coefficient may mean a basic pattern component generated by a result of the second transform. In addition, a residual sample to which transform skip is applied is also referred to as a transform coefficient.

A transform method may be determined in a unit of a block. A transform method may be determined based on at least one of a prediction encoding mode of a current block, a size of a current block or a shape of a current block. In an example, when a current block is encoded by an intra-prediction mode and a size of a current block is smaller than N×N, transform may be performed by using a DST transform method. On the other hand, when the condition is not satisfied, transform may be performed by using a DCT transform method.

Two-dimensional image transform may not be performed for some blocks of a residual image. Not performing two-dimensional image transform may be referred to as transform skip. The transform skip may represent that none of the first transform and the second transform are performed for the current block. When transform skip is applied, quantization may be applied to residual values for which transform is not performed.

Whether transform skip is allowed for a current block may be determined based on at least one of a size or a shape of a current block. In an example, only when a size of a current block is smaller than a threshold value, transform skip may be applied. The threshold value is related to at least one of a width, a height or the number of samples of a current block, and may be defined as 32×32, etc. Alternatively, transform skip may be allowed only for a square block. In an example, transform skip may be allowed for a 32×32, 16×16, 8×8 or 4×4 sized square block. Alternatively, only when a sub-partition intra encoding method is not used, transform skip may be allowed.

Alternatively, when a sub-partition intra encoding method is applied to a current block, it may be determined for each of sub-partitions whether transform skip is applied or not.

FIG. 38 is a diagram showing an example in which determination of whether transform skip is performed or not is performed fro each sub-block.

Transform skip may be applied only for part of a plurality of sub-blocks. In an example, as in an example shown in FIG. 38, it may be set to apply transform skip to a sub-block at a top position of a current block and may be set not to apply transform skip to a sub-block at a bottom position.

A transform type of a sub-block that transform skip is not allowed may be determined based on information signaled in a bitstream. In an example, a transform type may be determined based on tu_mts_idx which will be described after.

Alternatively, a transform type of a sub-block may be determined based on a size of a sub-block. In an example, a horizontal directional transform type may be determined based on whether a width of a sub-block is equal to or greater than and/or equal to or less than a threshold value and a vertical directional transform type may be determined based on whether a height of a sub-block is equal to or greater than and/or equal to or less than a threshold value.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DST7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. Alternatively, the second transform may be performed for transform coefficients which belong to three 4×4 sized sub-blocks. The three sub-blocks may include a sub-block positioned at the top-left of a current block, a sub-block neighboring the right of the sub-block and a sub-block neighboring the bottom of the sub-block. Alternatively, the second transform may be performed for an 8×8 sized block.

It is also possible that transform coefficients in a remaining region on which the second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream. In an example, a flag representing whether the second transform is performed or not, or index information specifying whether the second transform is performed or not and a transform kernel used for the second transform may be signaled. In an example, when the index information is 0, it represents that the second transform is not performed for a current block. On the other hand, when the index information is greater than 0, a transform kernel for the second transform may be determined by the index information.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for in the horizontal directional transform and the vertical directional transform, the second transform may be allowed. Alternatively, when a sub-partition intra encoding method is applied to a current block, the second transform may be allowed only when a DCT2 transform core is used for a horizontal directional transform and a vertical directional transform.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

Alternatively, whether the second transform is performed or not may be determined based on a position of the last non-zero transform coefficient of a current block. In an example, when at least one of an x-axis coordinate or a y-axis coordinate of the last non-zero transform coefficient of a current block is greater than a threshold value, or when at least one of an x-axis coordinate or a y-axis coordinate of a sub-block to which the last non-zero transform coefficient of a current block belongs is greater than a threshold value, the second transform may not be performed. In this case, a threshold value may be predefined in an encoding device and a decoding device. Alternatively, a threshold value may be determined based on a size or a shape of a current block.

Alternatively, when only a transform coefficient of a DC component exists in a current block, it may be set not to perform the second transform. In this case, a DC component represents a transform coefficient at a top-left position in a current block.

Alternatively, when matrix-based intra-prediction is applied to a current block, it may be set not to perform the second transform.

Information representing a transform type of a current block may be signaled in a bitstream. The information may be index information, tu_mts_idx, representing one of combinations of a transform type for a horizontal direction and a transform type for a vertical direction.

Based on transform type candidates specified by index information, tu_mts_idx, a transform core for a vertical direction and a transform core for a horizontal direction may be determined. Table 3 represents transform type combinations according to tu_mts_idx.

TABLE 3

| tu_mts_idx | transform type | |
|---|---|---|
| | horizontal | vertical |
| 0 | DCT-II | DCT-II |
| 1 | DST-VII | DST-VII |
| 2 | DCT-VIII | DST-VII |
| 3 | DST-VII | DCT-VIII |
| 4 | DCT-VIII | DCT-VIII |

A transform type may be determined as one of DCT2, DST7 or DCT8. Alternatively, transform skip may be inserted as a transform type candidate.

When Table 3 is used, DCT2 may be applied in a horizontal direction and in a vertical direction when tu_mts_idx is 0. When tu_mts_idx is 2, DCT8 may be applied in a horizontal direction and DCT7 may be applied in a vertical direction.

When a sub-partition intra encoding method is applied, a transform core of a sub-block may be independently determined. In an example, information for specifying a transform type combination candidate may be encoded and signaled per sub-block. Accordingly, a transform core between sub-blocks may be different.

Alternatively, sub-blocks may use the same transform type. In this case, tu_mts_idx specifying a transform type combination candidate may be signaled only for a first sub-block. Alternatively, tu_mts_idx may be signaled in a level of a coding block and a transform type of sub-blocks may be determined by referring to tu_mts_idx signaled in a level of a coding block. Alternatively, a transform type may be determined based on at least one of a size, a shape or an intra prediction mode of one of sub-blocks and a determined transform type may be set to be used for all sub-blocks.

FIG. 39 is a diagram showing an example in which sub-blocks use the same transform type.

When a coding block is partitioned in a horizontal direction, a transform type of a sub-block at a top position of a coding block (Sub-CU0) may be set the same as that of a sub-block at a bottom position (Sub-CU1). In an example, as in an example shown in FIG. 39 (a), when a horizontal transform type and a vertical transform type are determined based on tu_mts_idx signaled for a top sub-block, a determined transform type may be also applied to a bottom sub-block.

When a coding block is partitioned in a vertical direction, a transform type of a sub-block at a left position of a coding block (Sub-CU0) may be set the same as that of a sub-block at a right position (Sub-CU1). In an example, as in an example shown in FIG. 39 (b), when a horizontal transform type and a vertical transform type are determined based on tu_mts_idx signaled for a left sub-block, a determined transform type may be also applied to a right sub-block.

Whether index information is encoded or not may be determined based on at least one of a size or a shape of a current block, the number of non-zero coefficients, whether the second transform is performed or whether a sub-partition intra encoding method is applied. In an example, when a sub-partition intra encoding method is applied to a current block, or when the number of non-zero coefficients is equal to or smaller than a threshold value, signaling of index information may be omitted. When signaling of index information is omitted, a default transform type may be applied to a current block.

A default transform type may include at least one of DCT2 or DST7. When there are a plurality of default transform types, one of a plurality of default transform types may be selected by considering at least one of a size, a shape or an intra-prediction mode of a current block, whether the second transform is performed or whether a sub-partition intra encoding method is applied. In an example, one of a plurality of transform types may be determined as a horizontal directional transform type based on whether a width of a current block is in a preset range, and one of a plurality of transform types may be determined as a vertical directional transform type based on whether a height of a current block is in a preset range. Alternatively, a default mode may be determined differently according to a size, a shape or an intra-prediction mode of a current block or whether the second transform is performed.

Alternatively, when only a transform coefficient of a DC component exists in a current block, a horizontal directional transform type and a vertical directional transform type may be set as a default transform type. In an example, when only a transform coefficient of a DC component exists in a current block, a horizontal directional transform type and a vertical directional transform type may be set as DCT2.

A threshold value may be determined based on a size or a shape of a current block. In an example, when a size of a current block is equal to or smaller than 32×32, a threshold value may be set to be 2, and when a current block is greater than 32×32 (e.g., when a current block is a 32×64 or 64×32 sized coding block), a threshold value may be set to be 4.

A plurality of look-up tables may be prestored in an encoding device/a decoding device. At least one of an index value assigned to transform type combination candidates, a type of transform type combination candidates or the number of transform type combination candidates may be different for each of the plurality of look-up tables.

Based on at least one of a size, a shape or an intra-prediction mode of a current block, whether the second transform is applied or not, or whether transform skip is applied to a neighboring block, a look-up table for a current block may be selected.

In an example, when a size of a current block is equal to or less than 4×4, or when a current block is encoded by inter-prediction, a first look-up table may be used and when a size of a current block is greater than 4×4, or when a current block is encoded by intra-prediction, a second look-up table may be used.

Alternatively, information indicating one of a plurality of look-up tables may be signaled in a bitstream. A decoding device may select a look-up table for a current block based on the information.

In another example, an index assigned to a transform type combination candidate may be adaptively determined based on at least one of a size, a shape, a prediction encoding mode or an intra-prediction mode of a current block, whether the second transform is applied or not, or whether transform skip is applied to a neighboring block. In an example, an index assigned to transform skip when a size of a current block is 4×4 may be smaller than an index assigned to transform skip when a size of a current block is greater than 4×4. Concretely, when a size of a current block is 4×4, an index 0 may be assigned to transform skip and when a current block is greater than 4×4 and equal to or less than 16×16, an index greater than 0 (e.g., an index 1) may be assigned to transform skip. When a current block is greater than 16×16, the maximum value (e.g., 5) may be assigned to an index of transform skip.

Alternatively, when a current block is encoded by inter-prediction, an index 0 may be assigned to transform skip.

When a current block is encoded by intra-prediction, an index greater than 0 (e.g., an index 1) may be assigned to transform skip.

Alternatively, when a current block is a 4×4 sized block encoded by inter-prediction, an index 0 may be assigned to transform skip. On the other hand, when a current block is not encoded by inter-prediction, or when a current block is greater than 4×4, an index greater than 0 (e.g., an index 1) may be assigned to transform skip.

It is also possible to use transform type combination candidates different from transform type combination candidates enumerated in Table 3. In an example, a transform type combination candidate which is consisted of transform skip applied to one of a horizontal directional transform or a vertical directional transform and a transform core such as DCT2, DCT8 or DST7, etc. applied to the other can be used. In this case, whether transform skip will be used as a transform type candidate for a horizontal direction or a vertical direction may be determined based on at least one of a size (e.g., a width and/or a height), a shape, a prediction encoding mode or an intra-prediction mode of a current block.

Information representing whether index information for determining a transform type of a current block is explicitly signaled may be signaled in a bitstream. In an example, sps_explicit_intra_mts_flag, information representing whether an explicit transform type determination is allowed for a block encoded by intra-prediction, and/or sps_explicit_inter_mts_flag, information representing whether an explicit transform type determination is allowed for a block encoded by inter-prediction, may be signaled at a sequence level.

When an explicit transform type determination is allowed, a transform type of a current block may be determined based on index information, tu_mts_idx, signaled in a bitstream. On the other hand, when an explicit transform type determination is not allowed, a transform type may be determined based on at least one of a size or a shape of a current block, whether it is allowed to perform transform in a unit of a sub-block, a position of a sub-block including a non-zero transform coefficient, whether the second transform is performed or not, or whether a sub-partition intra encoding method is applied or not. In an example, a horizontal directional transform type of a current block may be determined based on a width of a current block and a vertical directional transform type of a current block may be determined based on a height of a current block. For example, when a width of a current block is smaller than 4 or greater than 16, a horizontal directional transform type may be determined as DCT2. Otherwise, a horizontal directional transform type may be determined as DST7. When a height of a current block is smaller than 4 or greater than 16, a vertical directional transform type may be determined as DCT2. Otherwise, a vertical directional transform type may be determined as DST7. In this case, a threshold value which is to be compared with a width and a height may be determined based on at least one of a size, a shape or an intra-prediction mode of a current block to determine a horizontal directional transform type and a vertical directional transform type.

Alternatively, when a current block has a square shape whose height and width are the same, a horizontal directional transform type and a vertical directional transform type may be set the same, but when a current block has a non-square shape whose height and width are different from each other, a horizontal directional transform type and a vertical directional transform type may be set differently. In an example, when a width of a current block is greater than a height, a horizontal directional transform type may be determined as DST7 and a vertical directional transform type may be determined as DCT2. When a height of a current block is greater than a width, a vertical directional transform type may be determined as DST7 and a horizontal directional transform type may be determined as DCT2.

The number and/or type of transform type candidates or the number and/or type of transform type combination candidates may be different according to whether an explicit transform type determination is allowed or not. In an example, when an explicit transform type determination is allowed, DCT2, DST7 and DCT8 may be used as transform type candidates. Accordingly, each of a horizontal directional transform type and a vertical directional transform type may be set as DCT2, DST8 or DCT8. When an explicit transform type determination is not allowed, only DCT2 and DST7 may be used as a transform type candidate. Accordingly, each of a horizontal directional transform type and a vertical directional transform type may be determined as DCT2 or DST7.

In a decoding device, inverse transform of second transform (second inverse transform) may be performed and inverse transform of first transform (first inverse transform) may be performed for a result therefrom. As a result of performing the second inverse transform and the first inverse transform, residual signals for a current block may be obtained.

When transform and quantization are performed in an encoding device, a decoding device may obtain a residual block through dequantization and inverse transform. A reconstructed block for a current block may be obtained by adding a prediction block and a residual block in a decoding device.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as the first reconstructed block and a reconstructed block after an in-loop filter is applied is referred to as the second reconstructed block.

The second reconstructed block may be obtained by applying at least one of a deblocking filter, SAO or ALF to the first reconstructed block. In this case, SAO or ALF may be applied after a deblocking filter is applied.

A deblocking filter is to alleviate blocking artifact on a boundary of a block which is generated as quantization is performed in a unit of a block. To apply a deblocking filter, a blocking strength between a first reconstructed block and a neighboring reconstructed block may be determined.

FIG. 40 is a flow chart showing a process in which a block strength is determined.

In an example shown in FIG. 40, P represents a first reconstructed block and Q represents a neighboring reconstructed block. In this case, a neighboring reconstructed block may neighbor a left or a top of a current block.

In an example shown in FIG. 40, it was shown that a block strength is determined by considering a prediction encoding mode of P and Q, whether a non-zero transform coefficient is included, whether inter prediction is performed by using the same reference picture or whether a difference value of motion vectors is equal to or greater than a threshold value.

Whether a deblocking filter is applied may be determined based on a block strength. In an example, when a block strength is 0, filtering may not be performed.

SAO is to alleviate ringing artifact which is generated as quantization is performed in a frequency domain. SAO may be performed by adding or subtracting an offset which is determined by considering a pattern of a first reconstructed image. A method of determining an offset includes an Edge Offset (EO) or a Band Offset. EO represents a method in which an offset of a current sample is determined according to a pattern of surrounding pixels. B0 represents a method in which a common offset is applied to a set of pixels with a similar brightness value in a region. Concretely, pixel brightness may be divided into 32 uniform sections and pixels with a similar brightness value may be set as one set. In an example, 4 adjacent bands of 32 bands may be set as one group and the same offset value may be applied to samples belonging to 4 bands.

ALF is a method in which a second reconstructed image is generated by applying a filter with a predefined size/shape to a first reconstructed image or a reconstructed image to which a deblocking filter is applied. The following Equation 23 represents an example in which ALF is applied.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 23]

Any one of predefined filter candidates may be selected in a unit of a picture, a coding tree unit, a coding block, a prediction block or a transform block. For each of filter candidates, any one of a size or a shape may be different.

FIG. 41 shows predefined filter candidates.

As in an example shown in FIG. 41, at least one of a 5×5, 7×7 or 9×9 sized diamond shape may be selected.

Only 5×5 sized diamond shape may be used for a chroma component.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A method of decoding a video, the method comprising:
   determining whether a merge mode with prediction unit (PU) partitioning is applied to a current block or not,
   wherein in response that the merge mode with PU partitioning is applied to the current block, the method further comprises:
   determining a partition type of the current block, the current block being divided into a first partition and a second partition;
   obtaining first motion information for the first partition based on a first merge candidate included in a merge candidate list of the current block; and
   obtaining second motion information for the second partition based on a second merge candidate included in the merge candidate list of the current block,
   wherein the first merge candidate is selected from the merge candidate list based on a first merge index decoded from a bitstream,
   wherein the second merge candidate is selected from the merge candidate list based on a second merge index decoded from the bitstream,
   wherein the merge mode with PU partitioning is allowed for the current block only when a width-height ratio of the current block and a height-width ratio of the current block are less than a threshold value,
   wherein the partition type of the current block is selected among a plurality of partition type candidates, and
   wherein the plurality of partition type candidates includes a first partition type candidate in which a size of the first partition and a size of the second partition are mutually the same and a second partition type candidate in which the size of the first partition and the size of the second partition are different from the each other.

2. The method of claim 1, wherein whether the second merge index is decoded from the bitstream or not is determined based on a maximum number of the merge candidates.

3. The method of claim 2, wherein the maximum number of the merge candidates is determined based on information indicating a maximum number difference between when the merge mode with PU partitioning is not applied and when the merge mode with PU partitioning is applied.

4. The method of claim 3, wherein when the maximum number of the merge candidates is less than a threshold value, decoding the second merge index from the bitstream is omitted.

5. The method of claim 4, wherein when decoding the second merge index from the bitstream is omitted, a value of the second merge index is inferred to the default value, the default value being 0.

6. The method of claim 1, wherein the partition type of the current block is selected among a plurality of partition type candidate and wherein one of the partition type candidates, in which directions of each of partitioning lines are the same but positions of each of the partitioning lines are different, is selected based on index information specifying one of the positions.

7. A method of encoding a video, the method comprising:
determining whether a merge mode with prediction unit (PU) partitioning is applied to a current block or not,
wherein in response that the merge mode with PU partitioning is applied to the current block, the method further comprises:
determining a partition type of the current block, the current block being divided into a first partition and a second partition;
obtaining first motion information for the first partition based on a first merge candidate included in a merge candidate list of the current block; and
obtaining second motion information for the second partition based on a second merge candidate included in the merge candidate list of the current block,
wherein a first merge index specifying the first merge candidate is encoded into a bitstream,
wherein a second merge index specifying the second merge candidate is encoded into the bitstream, and
wherein the merge mode with PU partitioning is allowed for the current block only when a width-height ratio of the current block and a height-width ratio of the current block are less than a threshold value,
wherein the partition type of the current block is selected among a plurality of partition type candidates, and
wherein the plurality of partition type candidates includes a first partition type candidate in which a size of the first partition and a size of the second partition are mutually the same and a second partition type candidate in which the size of the first partition and the size of the second partition are different from the each other.

8. A non-transitory computer readable recording medium for storing instructions which when executed by a processor cause the processor to transmit compressed video data, the compressed video data being generated by an encoding method which comprising:
determining whether a merge mode with prediction unit (PU) partitioning is applied to a current block or not,
wherein in response that the merge mode with PU partitioning is applied to the current block, the method further comprises:
determining a partition type of the current block, the current block being divided into a first partition and a second partition;
obtaining first motion information for the first partition based on a first merge candidate included in a merge candidate list of the current block; and
obtaining second motion information for the second partition based on a second merge candidate included in the merge candidate list of the current block,
wherein a first merge index specifying the first merge candidate is encoded into a bitstream,
wherein a second merge index specifying the second merge candidate is encoded into the bitstream, and
wherein the merge mode with PU partitioning is allowed for the current block only when a width-height ratio of the current block and a height-width ratio of the current block are less than a threshold value,
wherein the partition type of the current block is selected among a plurality of partition type candidates, and
wherein the plurality of partition type candidates includes a first partition type candidate in which a size of the first partition and a size of the second partition are mutually the same and a second partition type candidate in which the size of the first partition and the size of the second partition are different from the each other.

9. The method of claim 1, wherein the second merge candidate is determined by comparing the second merge index with the first merge index,
wherein in response to the second merge index is less than the first merge index, a merge candidate whose index is identical to the second merge index is determined as the second merge candidate, and
wherein in response to the second merge index is equal to or greater than the first merge index, a merge candidate whose index is identical to a value adding 1 to the second merge index is determined as the second merge candidate.

10. The method of claim 1, wherein when the first merge candidate has both L0 motion information and L1 motion information, one of the L0 motion information and the L1 motion information of the first merge candidate is derived as the first motion information.

11. The method of claim 10, wherein selection of one of the L0 motion information and the L1 motion information of the first merge candidate is based on whether an index of the first merge candidate is odd number or even number.

* * * * *